US012707146B2

(12) United States Patent
Park

(10) Patent No.: US 12,707,146 B2
(45) Date of Patent: Aug. 11, 2026

(54) CAMERA MODULE HAVING MAGENTIC SESORS TO DETECT A MOVING IMAGE SENSOR AND OPTICAL INSTRUMENT

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 146 days.

(21) Appl. No.: 18/286,629

(22) PCT Filed: Apr. 11, 2022

(86) PCT No.: PCT/KR2022/005201
§ 371 (c)(1),
(2) Date: Oct. 12, 2023

(87) PCT Pub. No.: WO2022/234970
PCT Pub. Date: Nov. 10, 2022

(65) Prior Publication Data
US 2024/0205544 A1 Jun. 20, 2024

(30) Foreign Application Priority Data
May 4, 2021 (KR) ........................ 10-2021-0057733

(51) Int. Cl.
*H04N 23/68* (2023.01)
*H04N 23/54* (2023.01)

(52) U.S. Cl.
CPC ......... *H04N 23/6812* (2023.01); *H04N 23/54* (2023.01); *H04N 23/687* (2023.01)

(58) Field of Classification Search
CPC .. H04N 23/6812; H04N 23/54; H04N 23/687; H04N 23/57; H04N 23/55; G03B 2205/0007
See application file for complete search history.

(56) References Cited

U.S. PATENT DOCUMENTS

2015/0350507 A1* 12/2015 Topliss ................. H04N 23/687 348/208.2
2016/0327806 A1* 11/2016 Kasamatsu .......... G02B 27/646
2018/0173080 A1* 6/2018 Enta ....................... H04N 23/57
2019/0020822 A1* 1/2019 Sharma ................ G02B 27/646
(Continued)

FOREIGN PATENT DOCUMENTS

JP 2011-095467 5/2011
KR 10-2010-0104383 9/2010
(Continued)

OTHER PUBLICATIONS

International Search Report dated Jul. 12, 2022 issued in Application No. PCT/KR2022/005201.
(Continued)

*Primary Examiner* — Padma Haliyur
(74) *Attorney, Agent, or Firm* — KED & ASSOCIATES, LLP

(57) ABSTRACT

An embodiment comprises: a fixing unit; a moving unit including a first substrate unit arranged to be spaced from the fixing unit and an image sensor arranged on the first substrate unit; a driving unit for moving the moving unit in the x-axis direction or the y-axis direction that is vertical to an optical axis, or rotates the moving unit around the optical axis within a preset range; a first sensor for sensing the movement of the moving unit in the y-axis direction; a second sensor for sensing the movement of the moving unit in the x-axis direction; and a third sensor for sensing the amount the moving unit rotates around the optical axis.

22 Claims, 33 Drawing Sheets

(56) References Cited

U.S. PATENT DOCUMENTS

| | | | | |
|---|---|---|---|---|
| 2019/0238736 | A1* | 8/2019 | Morimitsu | F16M 11/18 |
| 2019/0238753 | A1* | 8/2019 | Urakami | H04N 23/6812 |
| 2019/0354188 | A1* | 11/2019 | Ochi | G03B 17/02 |
| 2020/0225442 | A1* | 7/2020 | Weng | H04N 23/55 |
| 2020/0333558 | A1* | 10/2020 | Wu | G03B 5/02 |
| 2020/0358942 | A1* | 11/2020 | Kimura | H04N 23/667 |
| 2021/0215905 | A1* | 7/2021 | Kim | H04N 23/55 |
| 2021/0263260 | A1* | 8/2021 | Jang | G03B 13/34 |
| 2021/0294067 | A1* | 9/2021 | Park | G03B 13/36 |
| 2021/0396950 | A1* | 12/2021 | Park | H04N 23/57 |
| 2022/0035173 | A1* | 2/2022 | Min | G03B 3/10 |
| 2022/0196968 | A1* | 6/2022 | Lee | H04N 23/55 |
| 2022/0206364 | A1* | 6/2022 | Park | G03B 17/12 |
| 2022/0252961 | A1* | 8/2022 | Park | H02K 41/0354 |
| 2022/0345629 | A1* | 10/2022 | Park | H04N 23/687 |

FOREIGN PATENT DOCUMENTS

| | | | | |
|---|---|---|---|---|
| KR | 10-2017-0096124 | | 8/2017 | |
| KR | 10-2020-0114251 | | 10/2020 | |
| KR | 10-2220503 | | 2/2021 | |
| KR | 10-2021-0024511 | | 3/2021 | |
| KR | 10-2021-0034205 | | 3/2021 | |
| WO | WO-2018062809 | A1 * | 4/2018 | G02B 27/646 |
| WO | WO-2019216676 | A1 * | 11/2019 | G01D 5/145 |
| WO | WO-2020076029 | A1 * | 4/2020 | H04N 23/57 |

OTHER PUBLICATIONS

European Search Report dated Feb. 28, 2025 issued in Application No. 22799015.7.

* cited by examiner 44A
801
800C
800B1
800B2
512
820
803
802
800
216B
210A
216C
216D
21A
21B
210
216A
310B(310)
31B
8C
8D
8A
8B
31A
30B
310A(310)
810
600
500
61A
612
30A
610
830
240B
240C
240A
250
4B
41B
41C
70
4D
4C
41D
51B
51A
270
4A
41A
230-2(230)
230-3(230)
230-4(230)
230-1(230)
260
X
Y
Z X
Z
Y
810
500
61A
612
610
250
251
270
70
4A
4D
4C
4B
230-4(230)
230-1(230)
230-3(230)
230-2(230)
800
802
803
850
801
800C
210
216A
216D
210A
216C
216B
310A(310)
31A
8A
8B
8D
31B
8C
310B(310)
30A
260

CAMERA MODULE HAVING MAGENTIC SESORS TO DETECT A MOVING IMAGE SENSOR AND OPTICAL INSTRUMENT

CROSS-REFERENCE TO RELATED PATENT APPLICATIONS

This application is a U.S. National Stage Application under 35 U.S.C. § 371 of PCT Application No. PCT/KR2022/005201, filed Apr. 11, 2022, which claims priority to Korean Patent Application No. 10-2021-0057733, filed May 4, 2021, whose entire disclosures are hereby incorporated by reference.

TECHNICAL FIELD

Embodiments relate to a camera device and an optical instrument including the same.

BACKGROUND ART

Voice coil motor (VCM) technology, which is used in conventional general camera devices, is difficult to apply to a micro-scale camera device, which is intended to exhibit low power consumption, and study related thereto has been actively conducted.

There is increasing demand for, and production of, electronic products such as smartphones and cellular phones equipped with cameras. Cameras for cellular phones have been increasing in resolution and decreasing in size, and accordingly, actuators therefor are also becoming smaller, larger in diameter, and more multifunctional. In order to realize a high-resolution cellular phone camera, improvement in the performance of the cellular phone camera and additional functions, such as autofocus, shutter shaking prevention, and zooming in and out, are required.

DISCLOSURE

Technical Problem

Embodiments provide a camera device capable of simplifying a control algorithm for hand-tremor compensation, miniaturizing a controller or a memory, and reducing the size thereof and an optical instrument including the same.

Technical Solution

A camera device according to an embodiment includes a fixed unit, a moving unit including a first board unit disposed so as to be spaced apart from the fixed unit and an image sensor disposed on the first board unit, a driving unit configured to move the moving unit in an x-axis direction or a y-axis direction or to rotate the moving unit about an optical axis within a predetermined range, the x-axis direction and the y-axis direction being perpendicular to the optical axis, a first sensor configured to detect movement of the moving unit in the y-axis direction, a second sensor configured to detect movement of the moving unit in the x-axis direction, and a third sensor configured to detect the rotation amount of the moving unit about the optical axis.

Each of the first sensor and the second sensor may be a Hall sensor, and the third sensor may be a magnetic angle sensor.

The third sensor may be a sensor different from the first sensor and the second sensor.

A graph of an output of the third sensor with respect to the rotation amount of the moving unit about the optical axis may include a linear section.

A graph of an output of the first sensor with respect to the movement amount of the moving unit in the y-axis direction may include a linear section, and a graph of an output of the second sensor with respect to the movement amount of the moving unit in the x-axis direction may include a linear section.

A memory configured to store a data value about an output of the third sensor corresponding to the rotation amount of the moving unit may be included.

The driving unit may include a magnet disposed on the fixed unit and a coil disposed on the first board unit so as to face the magnet, and the driving unit may move or rotate the moving unit using interaction between the coil and the magnet.

A magnet disposed on the fixed unit may be included. The magnet may include a first magnet unit facing the first sensor, a second magnet unit facing the second sensor, and a third magnet unit facing the third sensor, and a magnetization direction of the first magnet unit is identical to the magnetization direction of the third magnet unit and perpendicular to the magnetization direction of the second magnet unit.

Each of the first to third sensors may include two input terminals and two output terminals, and any one of the two input terminals of each of the first to third sensors may be commonly connected.

The coil may include first to fourth coil units disposed on four corners of the first board unit, and the magnet may include first to fourth magnet units facing the first to fourth coil units.

The camera device may include a controller configured to supply a driving signal to at least one of the first to fourth coil units.

Two coil units among the first to fourth coil units may be connected to each other in series, and the controller may supply one driving signal to the two coil units connected to each other in series and may supply an independent driving signal to each of the two remaining coil units among the first to fourth coil units.

Alternatively, the controller may supply an independent driving signal to each of the first to fourth coil units.

The camera device may include a second board unit disposed in the fixed unit and a support member configured to connect the fixed unit to the moving unit and to conductively connect the first board unit to the second board unit. The support member may be a support board including a flexible substrate.

The rotation amount of the moving unit detected by the third sensor may be 0.5 degrees to 5 degrees.

A camera device according to another embodiment includes a fixed unit, a moving unit disposed so as to be spaced apart from the fixed unit and including an image sensor, a driving unit configured to move the moving unit in an x-axis direction or a y-axis direction or to rotate the moving unit about an optical axis within a predetermined range, the x-axis direction and the y-axis direction being perpendicular to the optical axis, a first Hall sensor configured to detect movement of the moving unit in the y-axis direction, a second Hall sensor configured to detect movement of the moving unit in the x-axis direction, and a rotation detection sensor configured to detect the rotation amount of the moving unit about the optical axis.

Advantageous Effects

According to embodiments, since movement of an OIS moving unit in a direction perpendicular to an optical axis may be detected using first and second sensors, which are Hall sensors, and movement (or rotation) of the OIS moving unit in a rolling direction (or a rotation direction) is detected using a third sensor, which is a magnetic angle sensor, a control algorithm for hand-tremor compensation may be simplified, and thus, a control speed may be increased. A controller or a memory may be reduced in capacity and thus may be miniaturized, and as a result, a camera device may be reduced in size.

BEST MODE

Figure 1:
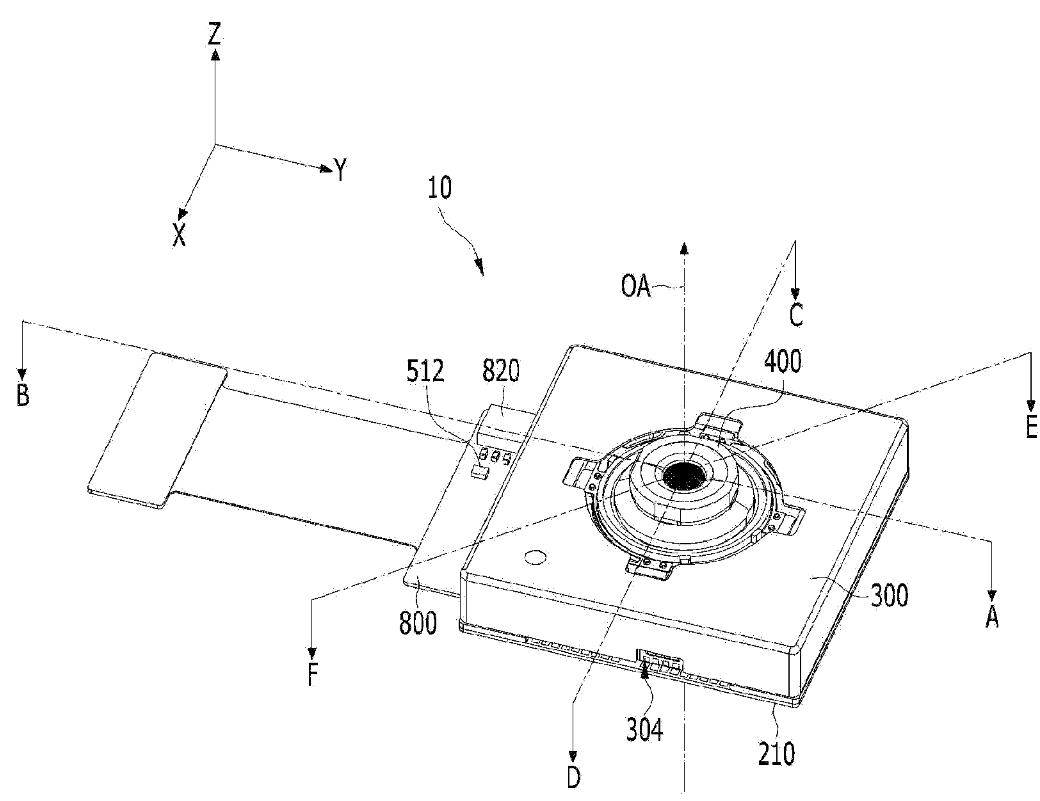
FIG. 1 is a perspective view of a camera device according to an embodiment.

Hereinafter, embodiments of the present disclosure will be described in detail with reference to the accompanying drawings.

The technical spirit of the disclosure is not limited to the embodiments to be described, and may be implemented in various other forms, and one or more of the components may be selectively combined and substituted for use without exceeding the scope of the technical spirit of the disclosure.

In addition, terms (including technical and scientific terms) used in the embodiments of the disclosure, unless specifically defined and described explicitly, are to be interpreted as having meanings that may be generally understood by those having ordinary skill in the art to which the disclosure pertains, and meanings of terms that are commonly used, such as terms defined in a dictionary, should be interpreted in consideration of the context of the relevant technology.

Further, the terms used in the embodiments of the disclosure are for explaining the embodiments and are not intended to limit the disclosure. In this specification, the singular forms may also include plural forms unless otherwise specifically stated in a phrase, and in the case in which "at least one (or one or more) of A, B, or C" is stated, it may include one or more of all possible combinations of A, B, and C.

In addition, in describing the components of the embodiments of the disclosure, terms such as "first", "second", "A", "B", "(a)", and "(b)" can be used. Such terms are only for distinguishing one component from another component, and do not determine the nature, sequence, or procedure of the corresponding constituent elements.

In addition, when it is described that a component is "connected", "coupled" or "joined" to another component, the description may include not only being directly "connected", "coupled" or "joined" to the other component but also being "connected", "coupled" or "joined" by another component between the component and the other component. In addition, in the case of being described as being formed or disposed "above (on)" or "below (under)" another component, the description includes not only the case where the two components are in direct contact with each other, but also the case where one or more other components are formed or disposed between the two components. In addition, when expressed as "above (on)" or "below (under)", it may refer to a downward direction as well as an upward direction with respect to one element.

Hereinafter, an AF moving unit may alternatively be referred to as a lens moving apparatus, a lens moving unit, a voice coil motor (VCM), an actuator, or a lens moving device. Hereinafter, a "coil" may alternatively be referred to as a coil unit, and an "elastic member" may alternatively be referred to as an elastic unit or a spring.

In addition, in the following description, a "terminal" may alternatively be referred to as a pad, an electrode, a conductive layer, or a bonding unit.

For convenience of description, a camera device according to an embodiment will be described using the Cartesian coordinate system (x,y,z), but the embodiments are not limited thereto, and may be described using other coordinate systems. In the respective drawings, the x-axis and the y-axis may be directions perpendicular to the z-axis, which is an optical-axis direction, the z-axis direction, which is the direction of the optical axis OA, may be referred to as a "first direction", the x-axis direction may be referred to as a "second direction", and the y-axis direction may be referred to as a "third direction". For example, the first direction may be a direction perpendicular to an image-capturing area of an image sensor.

The camera device according to the embodiment may perform an "autofocus function". Here, the autofocus function is a function of automatically focusing an image of a subject on the surface of an image sensor.

Hereinafter, the camera device may alternatively be referred to as a "camera module", a "camera", a "photographing device", or a "lens moving device".

In addition, the camera device according to the embodiment may perform a "hand-tremor compensation function". Here, the hand-tremor compensation function is a function of inhibiting the contour of a captured still image from being blurred due to vibration caused by shaking of a hand of a user when capturing the still image.

Figure 2:
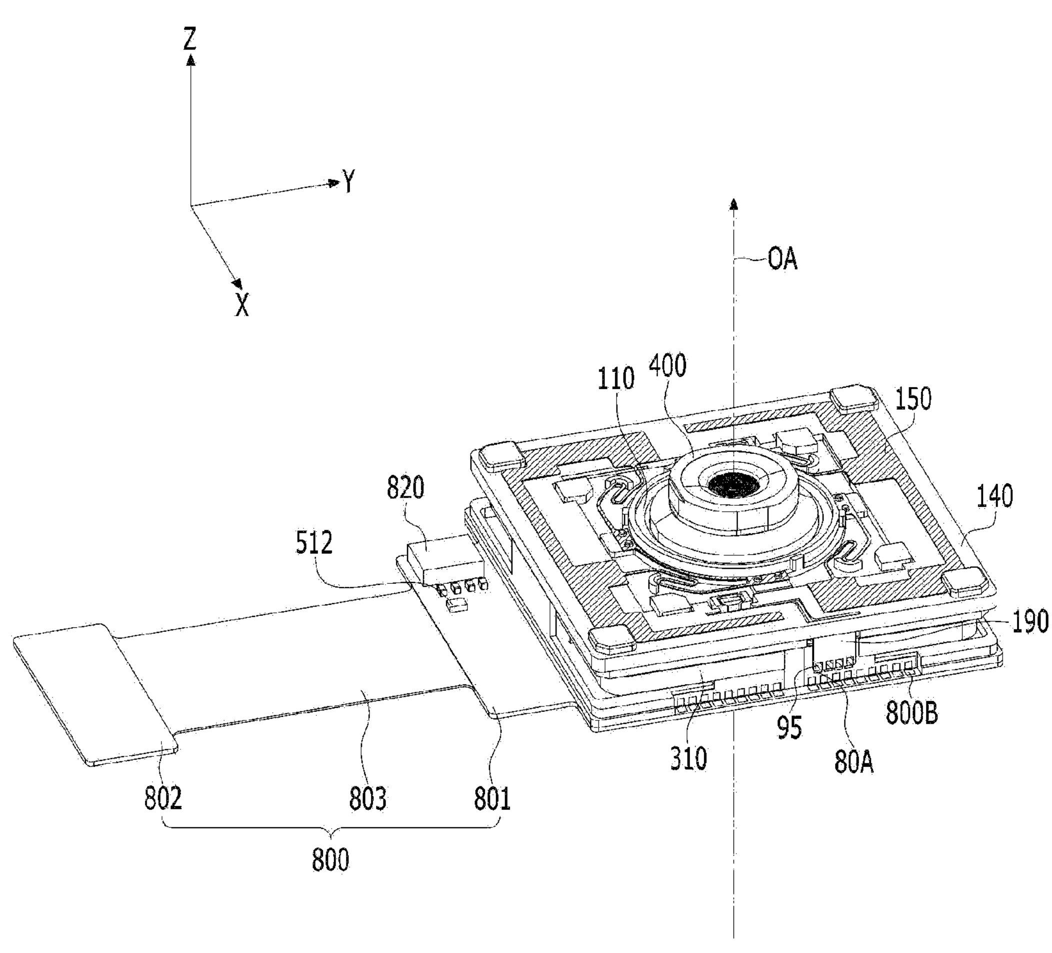
FIG. 2 is a perspective view of the camera device, with a cover member removed therefrom.
Figure 3:
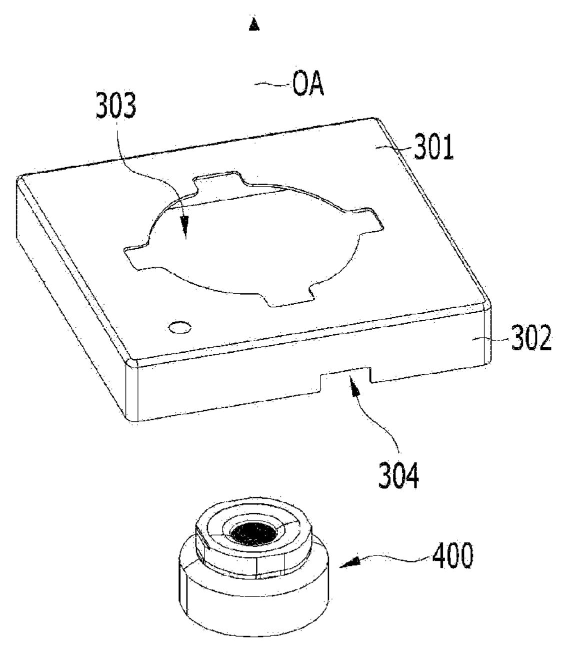
FIG. 3 is an exploded perspective view of the camera device in FIG. 1.
Figure 3:
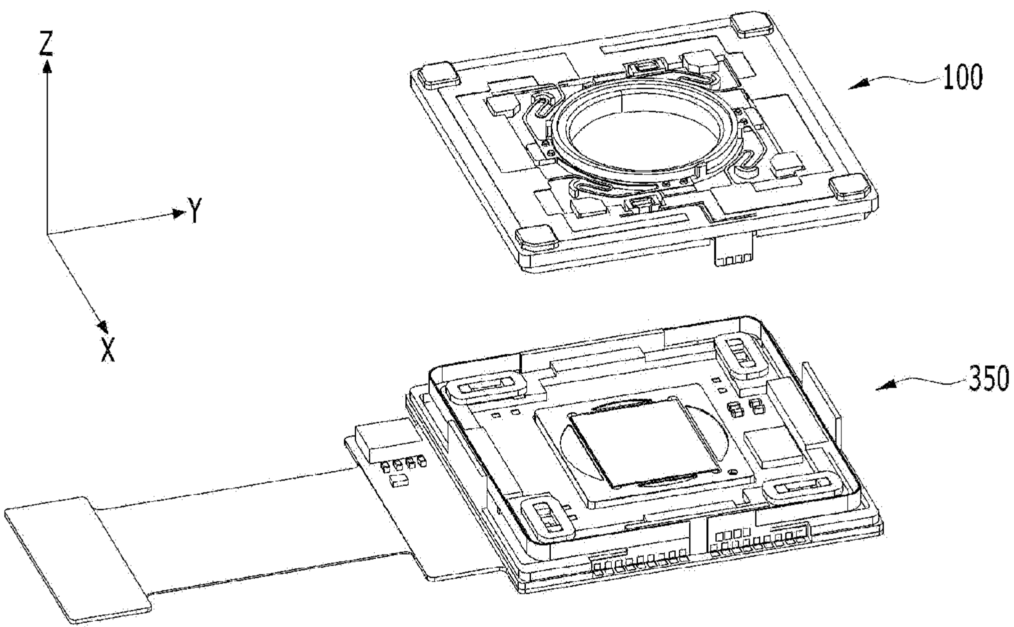
Figure 4A:
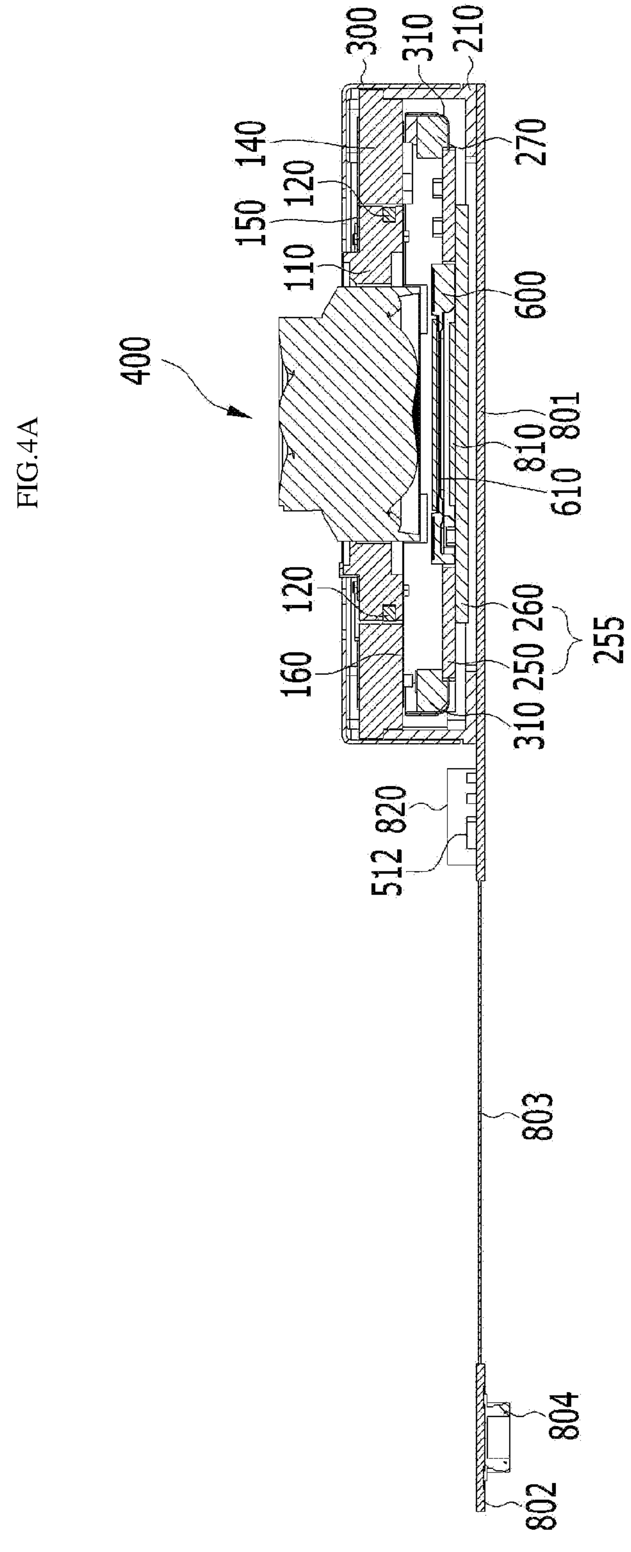
FIG. 4A is a cross-sectional view taken along line AB in the camera device in FIG. 1.
Figure 4B:
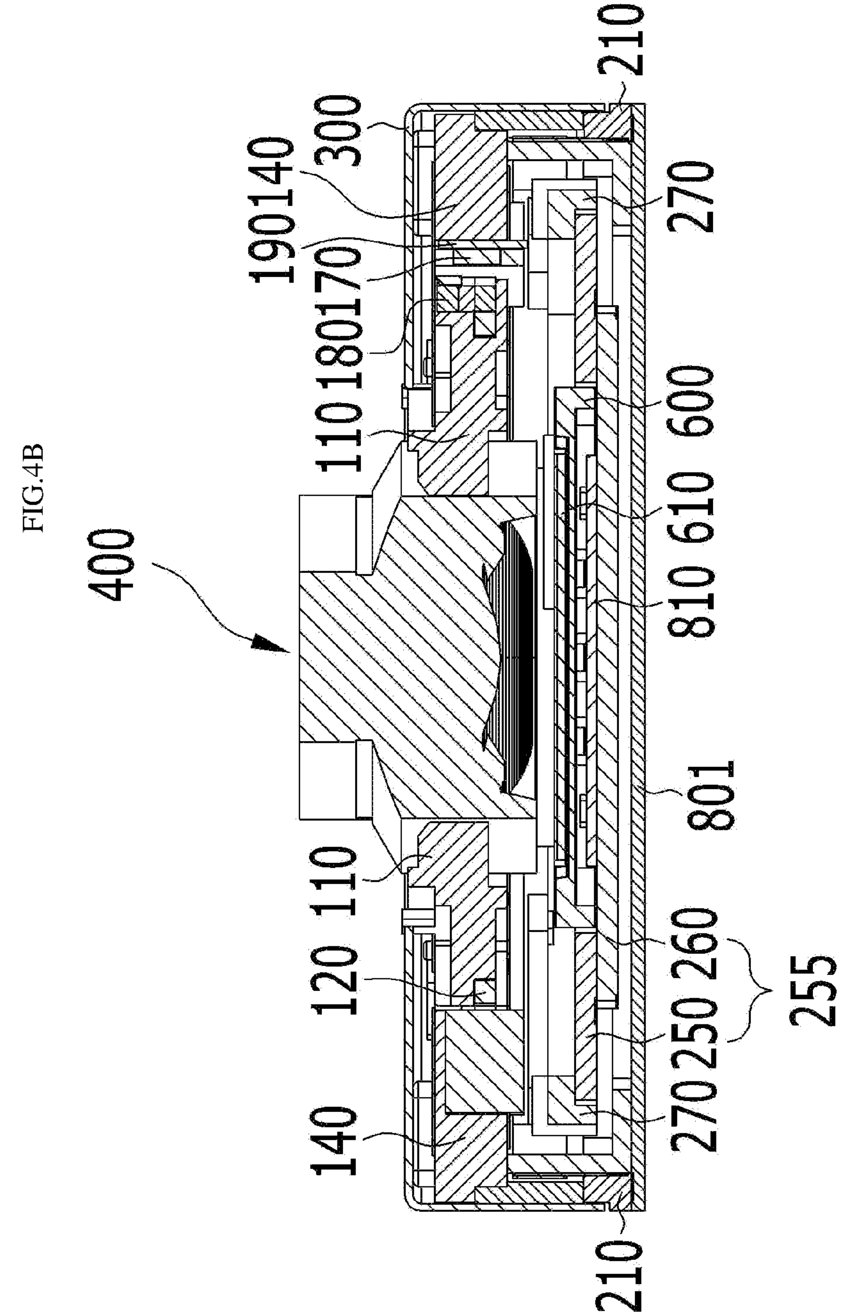
FIG. 4B is a cross-sectional view taken along line CD in the camera device in FIG. 1.
Figure 4C:
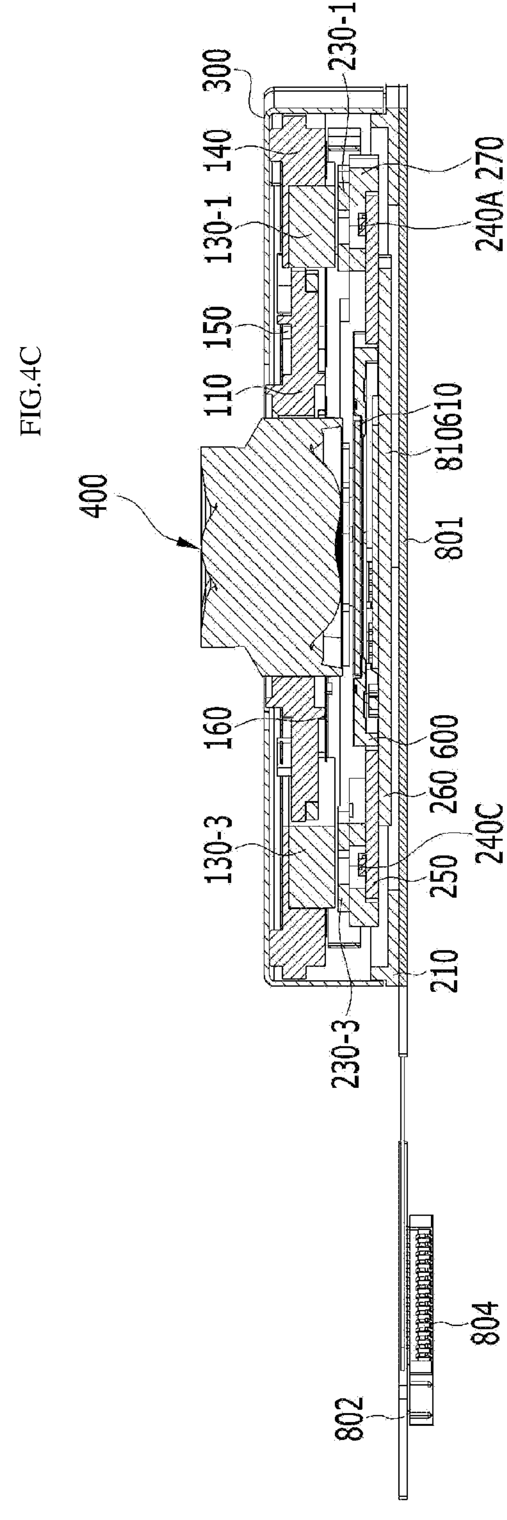
FIG. 4C is a cross-sectional view taken along line EF in the camera device in FIG. 1.
Figure 5:
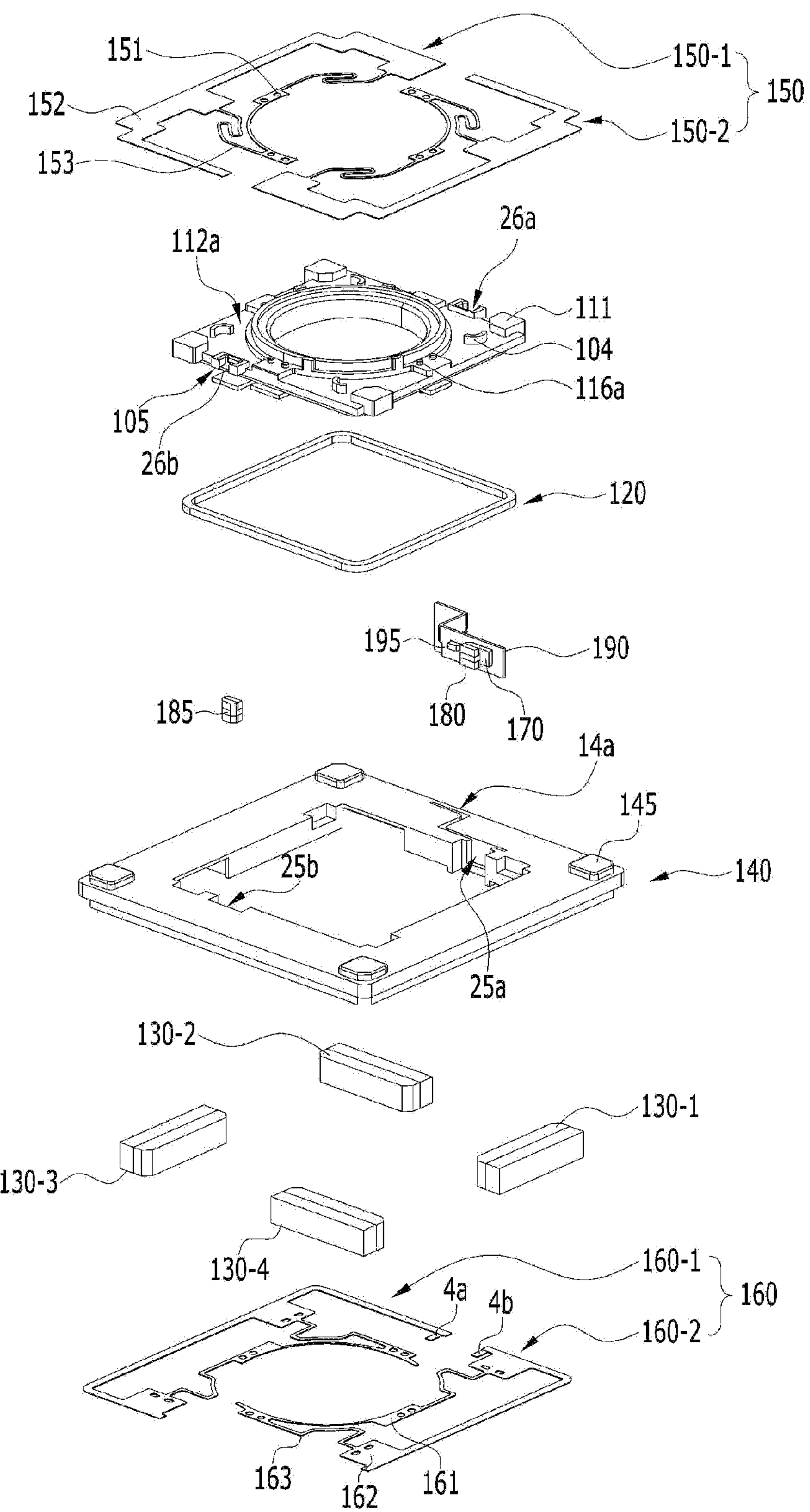
FIG. 5 is an exploded perspective view of the AF moving unit in FIG. 3.
Figure 6:
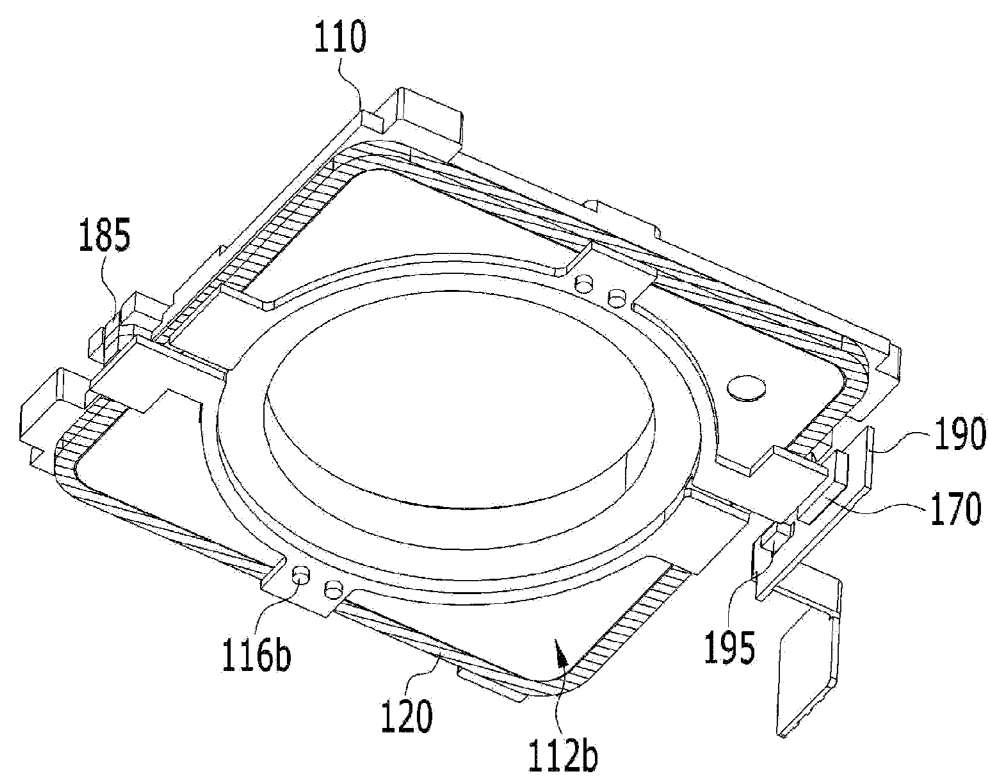
FIG. 6 is a perspective view of a bobbin, a sensing magnet, a balancing magnet, a first coil, a circuit board, a first position sensor, and a capacitor.
Figure 7:
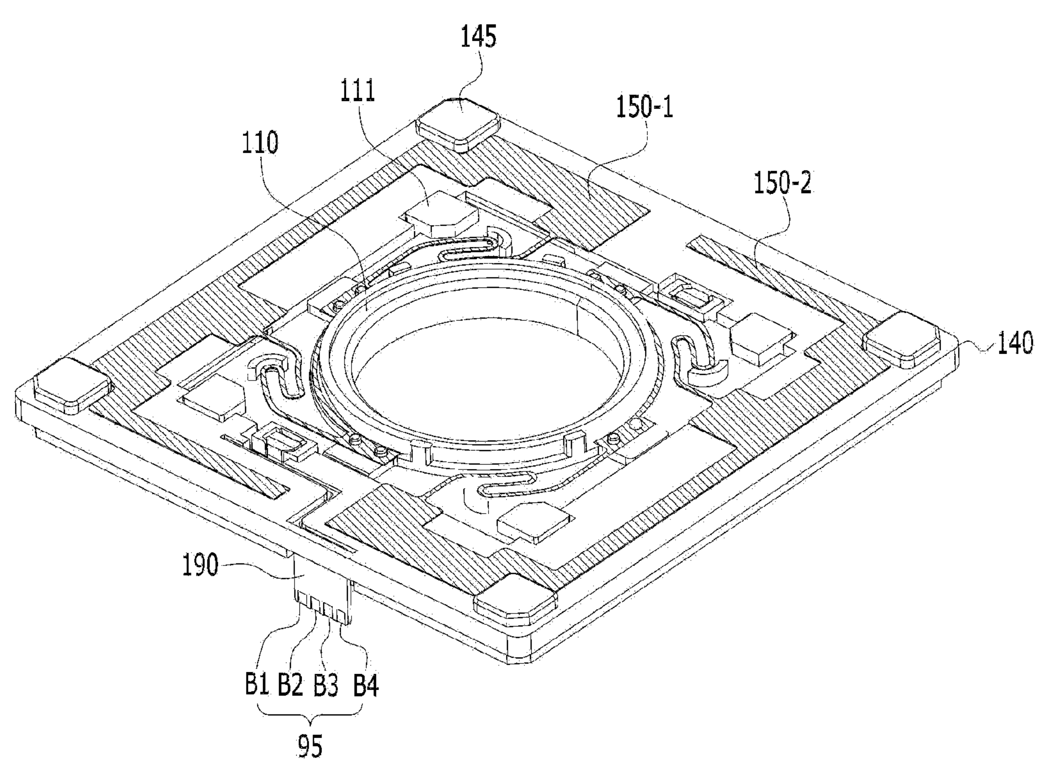
FIG. 7 is a perspective view of the bobbin, a housing, the circuit board, an upper elastic member, the sensing magnet, and the balancing magnet.
Figure 8:
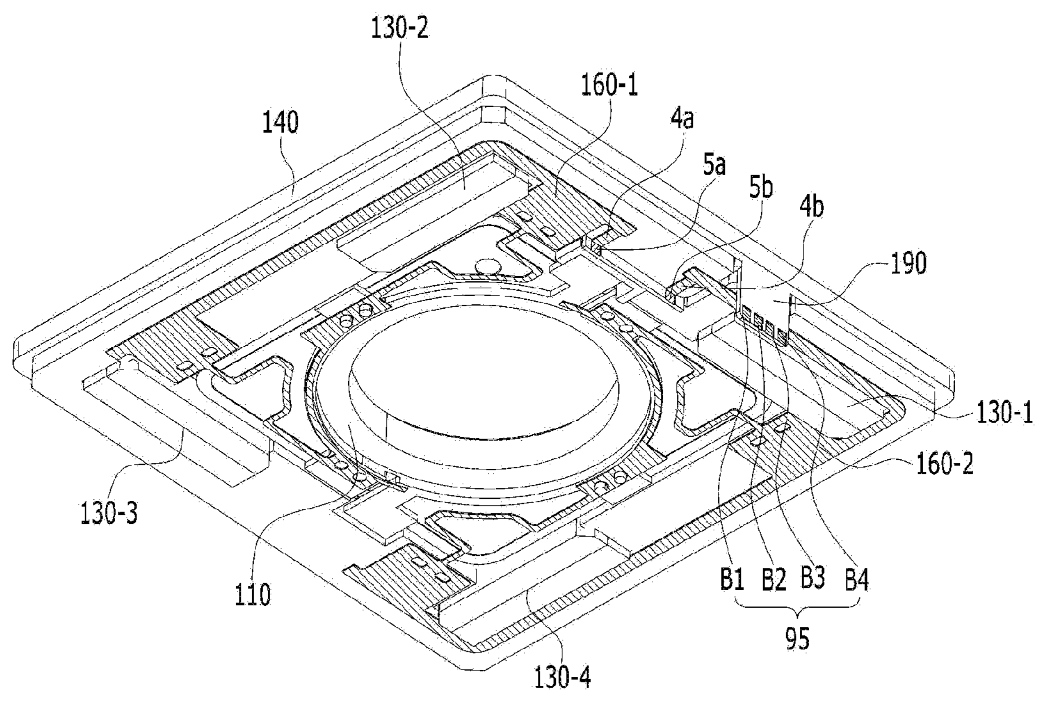
FIG. 8 is a bottom perspective view of the housing, the bobbin, a lower elastic member, a magnet, and the circuit board.

FIG. 1 is a perspective view of a camera device 10 according to an embodiment, FIG. 2 is a perspective view of the camera device 10, with a cover member 300 removed therefrom, FIG. 3 is an exploded perspective view of the camera device 10 in FIG. 1, FIG. 4A is a cross-sectional view taken along line AB in the camera device 10 in FIG. 1, FIG. 4B is a cross-sectional view taken along line CD in the camera device 10 in FIG. 1, FIG. 4C is a cross-sectional view taken along line EF in the camera device 10 in FIG. 1, FIG. 5 is an exploded perspective view of an AF moving unit 100 in FIG. 3, FIG. 6 is a perspective view of a bobbin 110, a sensing magnet 180, a balancing magnet 185, a first coil 120, a circuit board 190, a first position sensor 170, and a capacitor 195, FIG. 7 is a perspective view of the bobbin 110, a housing 140, the circuit board 190, an upper elastic member 150, the sensing magnet 180, and the balancing magnet 185, and FIG. 8 is a bottom perspective view of the housing 140, the bobbin 110, a lower elastic member 160, a magnet 130, and the circuit board 190.

Referring to FIGS. 1 to 8, the camera device 10 may include an AF moving unit 100 and an image sensor unit 350.

The camera device 10 may further include at least one of a cover member 300 or a lens module 400. The cover member 300 and a base 210 to be described later may constitute a case.

The AF moving unit 100 may be coupled to a lens module 400, and may move the lens module in the direction of the optical axis OA or a direction parallel to the optical axis, thereby performing the autofocus function of the camera device 10.

The image sensor unit 350 may include an image sensor 810. The image sensor unit 350 may move the image sensor 810 in a direction perpendicular to the optical axis. In addition, the image sensor unit 350 may tilt the image sensor 810 with respect to the optical axis or may rotate the image sensor 810 about the optical axis. The hand-tremor compensation function of the camera device 10 may be performed by the image sensor unit 350.

In an example, the image sensor 810 may include an image-capturing area for sensing of light that has passed through the lens module 400. Here, the image-capturing area may alternatively be referred to as an effective area, a light-receiving area, or an active area. For example, the image-capturing area of the image sensor 810 may be a portion into which light that has passed through a filter 610 is introduced so as to form an image contained in the light, and may include at least one pixel.

The AF moving unit 100 may alternatively be referred to as a "lens moving unit" or a "lens moving apparatus". Alternatively, the AF moving unit 100 may be referred to as a "first moving unit (or second moving unit)", a "first actuator (or second actuator)", or an "AF driving unit".

In addition, the image sensor unit 350 may alternatively be referred to as an "image sensor moving unit", an "image sensor shift unit", a "sensor moving unit", or a "sensor shift unit". Alternatively, the image sensor unit 350 may be referred to as a "second moving unit (or first moving unit)", a "second actuator (or first actuator)", or an "OIS driving unit".

Referring to FIG. 5, the AF moving unit 100 may include a bobbin 110, a first coil 120, a magnet 130, and a housing 140.

The AF moving unit 100 may further include an upper elastic member 150 and a lower elastic member 160.

In addition, the AF moving unit 100 may further include a first position sensor 170, a circuit board 190, and a sensing magnet 180 in order to implement AF feedback. In addition, the AF moving unit 100 may further include at least one of a balancing magnet 185 or a capacitor 195.

The bobbin 110 may be disposed in the housing 140, and may be moved in the direction of the optical axis OA or the first direction (e.g. the Z-axis direction) by electromagnetic interaction between the first coil 120 and the magnet 130.

The bobbin 110 may have a bore formed therein in order to be coupled to the lens module 400 or to mount the lens module 400 therein. In an example, the bore in the bobbin 110 may be a through-hole formed through the bobbin 110 in the optical-axis direction, and may have a circular shape, an elliptical shape, or a polygonal shape, without being limited thereto.

The lens module 400 may include at least one lens and/or a lens barrel.

For example, the lens module 400 may include one or more lenses and a lens barrel accommodating the one or more lenses. However, the disclosure is not limited thereto. Any of various holding structures may be used in place of the lens barrel, so long as the same is capable of supporting one or more lenses.

In an example, the lens module 400 may be screwed to the bobbin 110. Alternatively, in another example, the lens module 400 may be coupled to the bobbin 110 by means of an adhesive (not shown). Meanwhile, light that has passed through the lens module 400 may pass through the filter 610, and may be introduced into the image sensor 810.

The bobbin 110 may be provided on the outer surface thereof with a protruding portion 111. In an example, the protruding portion 111 may protrude in a direction parallel to a line perpendicular to the optical axis OA. However, the disclosure is not limited thereto.

The protruding portion 111 of the bobbin 110 may correspond to a recessed portion 25*a* in the housing 140, and may be inserted into or disposed in the recessed portion 25*a* in the housing 140. The protruding portion 111 may suppress or prevent the bobbin 110 from rotating beyond a predetermined range about the optical axis. In addition, the protruding portion 111 may serve as a stopper for preventing the bobbin 110 from moving beyond a predetermined range in the optical-axis direction (e.g. the direction from the upper elastic member 150 toward the lower elastic member 160) due to external impact or the like.

The bobbin 110 may have a first escape recess 112*a* formed in the upper surface thereof to avoid spatial interference with a first frame connection portion 153 of the upper elastic member 150. In addition, the bobbin 110 may have a second escape recess 112*b* formed in the lower surface thereof to avoid spatial interference with a second frame connection portion 163 of the lower elastic member 160.

The bobbin 110 may include a first coupling portion 116*a* in order to be coupled or secured to the upper elastic member 150. In an example, the first coupling portion of the bobbin 110 may take the form of a protrusion, but the disclosure is not limited thereto. In another embodiment, the first coupling portion of the bobbin may take the form of a flat surface or a recess.

In addition, the bobbin 110 may include a second coupling portion 116*b* in order to be coupled or secured to the lower elastic member 160. In an example, the second coupling portion 116*b* may take the form of a protrusion, but the disclosure is not limited thereto. In another embodiment, the second coupling portion may take the form of a flat surface or a recess.

Referring to FIG. 6, the bobbin 110 may have a recess formed in the outer surface thereof to allow the first coil 120 to be seated therein, inserted thereinto, or disposed therein. The recess in the bobbin 110 may have a closed curve shape (e.g. a ring shape), which coincides with the shape of the first coil 120.

In addition, the bobbin 110 may have a first seating recess 26*a* formed therein to allow the sensing magnet 180 to be seated therein, inserted thereinto, secured thereto, or disposed therein. In addition, the bobbin 110 may have a second seating recess 26*b* formed in the outer surface thereof to allow the balancing magnet 185 to be seated therein, inserted thereinto, secured thereto, or disposed therein. In an example, the first and second seating recesses 26*a* and 26*b* in the bobbin 110 may be formed in the outer surfaces of the bobbin 110 that face each other.

The bobbin 110 may be provided with a protrusion 104 protruding from the upper surface thereof so as to correspond to the first frame connection portion 153 of the upper elastic member 150. In an example, the protrusion 104 may protrude from the bottom surface of the first escape recess in the bobbin 110. A damper may be disposed between the protrusion 104 and the first frame connection portion 153 of the upper elastic member 150. The damper may be in contact with and attached to the protrusion 104 of the bobbin 110 and the first frame connection portion 153. The protrusion 104 may serve to guide the damper.

The first coil 120 may be disposed on or coupled to the bobbin 110. In an example, the first coil 120 may be disposed on the outer surface of the bobbin 110.

In an example, the first coil 120 may surround the outer surface of the bobbin 110 in the direction of rotation about the optical axis OA, but the disclosure is not limited thereto.

The first coil 120 may be directly wound around the outer surface of the bobbin 110, but the disclosure is not limited thereto. In another embodiment, the first coil 120 may be wound around the bobbin 110 using a coil ring, or may be embodied as a coil block having an angled ring shape.

Power or a driving signal may be supplied to the first coil 120. The power or the driving signal supplied to the first coil 120 may be a DC signal, an AC signal, or a signal containing both DC and AC components, and may be of a voltage type or a current type.

When a driving signal (e.g. driving current) is supplied to the first coil 120, electromagnetic force may be generated by electromagnetic interaction with the magnet 130, and the bobbin 110 may be moved in the direction of the optical axis OA by the generated electromagnetic force.

At the initial position of an AF operation unit, the bobbin 110 may be movable upward or downward, which is referred to as bidirectional driving of the AF operation unit. Alternatively, at the initial position of the AF operation unit, the bobbin 110 may be movable upward, which is referred to as unidirectional driving of the AF operation unit.

At the initial position of the AF operation unit, the first coil 120 may be disposed so as to correspond to or overlap the magnet 130, which is disposed in the housing 140, in a direction parallel to a line that is perpendicular to the optical axis OA and extends through the optical axis.

In an example, the AF operation unit may include the bobbin 110 and components coupled to the bobbin 110 (e.g. the first coil 120, the sensing magnet 180, and the balancing magnet 185). In addition, the AF operation unit may further include the lens module 400.

The initial position of the AF operation unit may be the original position of the AF operation unit in the state in which no power is supplied to the first coil 120 or a position at which the AF operation unit is located as the result of the upper and lower elastic members 150 and 160 being elastically deformed due only to the weight of the AF operation unit. In addition, the initial position of the bobbin 110 may be a position at which the AF operation unit is located when gravity acts in the direction from the bobbin 110 toward the base 210 or when gravity acts in the direction from the base 210 toward the bobbin 110.

The sensing magnet 180 may provide a magnetic field, which is to be detected by the first position sensor 170, and the balancing magnet 185 may cancel out the influence of the magnetic field of the sensing magnet 180 and may establish weight equilibrium with the sensing magnet 180.

The sensing magnet 180 may alternatively be referred to as a "sensor magnet" or a "second magnet". The sensing magnet 180 may be disposed on the bobbin 110, or may be coupled to the bobbin 110. The sensing magnet 180 may be disposed so as to face the first position sensor 170. The balancing magnet 185 may be disposed on the bobbin 110, or may be coupled to the bobbin 110. In an example, the balancing magnet 185 may be disposed opposite the sensing magnet 180.

In an example, each of the sensing magnet 180 and the balancing magnet 185 may be a monopolar-magnetized magnet, which has one N pole and one S pole, but the disclosure is not limited thereto. In another embodiment, each of the sensing magnet 180 and the balancing magnet

185 may be a bipolar-magnetized magnet or a 4-pole magnet, which includes two N poles and two S poles.

The sensing magnet 180 may be moved together with the bobbin 110 in the optical-axis direction, and the first position sensor 170 may detect the intensity of the magnetic field or the magnetic force of the sensing magnet 180, which is moved in the optical-axis direction, and may output an output signal corresponding to the result of the detection.

In an example, the intensity of the magnetic field or the magnetic force detected by the first position sensor 170 may vary depending on displacement of the bobbin 110 in the optical-axis direction. The first position sensor 170 may output an output signal proportional to the detected intensity of the magnetic field, and the displacement of the bobbin 110 in the optical-axis direction may be detected using the output signal from the first position sensor 170.

The housing 140 is disposed inside the cover member 300. The housing 140 may accommodate therein the bobbin 110, and may support the magnet 130, the first position sensor 170, and the circuit board 190.

Referring to FIGS. 5, 7, and 8, the housing 140 may be formed so as to take the overall shape of a hollow column. In an example, the housing 140 may have a polygonal (e.g. quadrangular or octagonal) or circular bore formed therein, and the bore in the housing 140 may take the form of a through-hole formed through the housing 140 in the optical-axis direction.

The housing 140 may include side portions, which correspond to or face side plates 302 of the cover member 300, and corners, which correspond to or face the corners of the cover member 300.

The housing 140 may be provided on the upper portion, the upper surface, or the upper end thereof with a stopper 145 in order to be prevented from directly colliding with the inner surface of the upper plate 301 of the cover member 300.

Referring to FIG. 5, the housing 140 may include a mounting groove (or a seating groove) **14*a* formed therein to accommodate the circuit board 190. The mounting groove 14*a* may have a shape coinciding with the shape of the circuit board 190**.

Referring to FIG. 7, the housing 140 may include an opening formed therein to expose terminals B1 to B4 of a terminal unit 95 of the circuit board 190 therethrough. The opening may be formed in the side portion of the housing 140.

The housing 140 may be provided on the upper portion, the upper end, or the upper surface thereof with at least one first coupling portion for coupling to a first outer frame 152 of the upper elastic member 150. The housing 140 may be provided on the lower portion, the lower end, or the lower surface thereof with a second coupling portion for coupling and securing to a second outer frame 162 of the lower elastic member 160. For example, each of the first and second coupling portions of the housing 140 may be formed in the shape of a flat surface, a protrusion, or a recess.

The magnet 130 may be disposed on the housing 140. In an example, the magnet 130 may be disposed on the side portion of the housing 140. The magnet 130 may be a driving magnet for AF operation.

For example, the magnet 130 may include a plurality of magnet units. In an example, the magnet 130 may include first to fourth magnet units 130-1 to 130-4 disposed on the housing 140. In another embodiment, the magnet 130 may include two or more magnet units.

The magnet 130 may be disposed on at least one of the side portion or the corner of the housing 140. In an example, at least a portion of the magnet 130 may be disposed on the side portion or the corner of the housing 140.

For example, each of the magnet units 130-1 to 130-4 may include a first portion disposed on a corresponding corner among the four corners of the housing 130. In addition, each of the magnet units 130-1 to 130-4 may include a second portion disposed on the side portion of the housing 140 that is adjacent to the corresponding corner of the housing 140.

At the initial position of the AF operation unit, the magnet 130 may be disposed on the housing 140 such that at least a portion thereof overlaps the first coil 120 in a direction parallel to a line that is perpendicular to the optical axis OA and extends through the optical axis OA.

The magnet 130 may be a monopolar-magnetized magnet, but the disclosure is not limited thereto. In another embodiment, the magnet 130 may be a bipolar-magnetized magnet or a 4-pole magnet, which includes two N poles and two S poles.

The circuit board 190 may be disposed in the housing 140. The first position sensor 170 may be disposed or mounted on the circuit board 190, and may be conductively connected to the circuit board 190. In an example, the circuit board 190 may be disposed in the mounting groove **14*a* in the housing 140, and the terminals B1 to B4 of the circuit board 190 may be exposed outside the housing 140**.

The circuit board 190 may be provided with a terminal unit (or terminal part) 95 including a plurality of terminals B1 to B4 for conductive connection to an external terminal or an external device. The plurality of terminals B1 to B4 of the circuit board 190 may be conductively connected to the first position sensor 170.

The first position sensor 170 may be disposed on a first surface of the circuit board 190, and the plurality of terminals B1 to B4 may be disposed on a second surface of the circuit board 190. Here, the second surface of the circuit board 190 may be a surface opposite the first surface of the circuit board 190. For example, the first surface of the circuit board 190 may be the surface of the circuit board 190 that faces the bobbin 110 or the sensing magnet 180.

For example, the circuit board 190 may be a printed circuit board or an FPCB.

The circuit board 190 may include a circuit pattern or wiring (not shown) for conductive connection of the first to fourth terminals B1 to B4 to the first position sensor 170.

In an example, at the initial position of the AF operation unit, at least a portion of the first position sensor 170 may face or overlap the sensing magnet 180 in a direction parallel to a line that is perpendicular to the optical axis OA and extends through the optical axis OA. In another embodiment, at the initial position of the AF operation unit, the first position sensor may not face or overlap the sensing magnet.

When the bobbin 110 is moved, the first position sensor 170 may detect the magnetic field or the intensity of the magnetic field of the sensing magnet 180 mounted to the bobbin 110, and may output an output signal corresponding to the result of the detection.

The first position sensor 170 may be a driver IC including a Hall sensor and a driver. The first position sensor 170 may include first to fourth terminals for transmitting and receiving data to and from the outside through data communication using a protocol, such as I2C communication, and fifth and sixth terminals for directly supplying a driving signal to the first coil 120.

The first position sensor 170 may be conductively connected to the first to fourth terminals B1 to B4 of the circuit board 190. In an example, each of the first to fourth terminals of the first position sensor 170 may be conductively connected to a corresponding one of the first to fourth terminals of the circuit board 190.

The fifth and sixth terminals of the first position sensor 170 may be conductively connected to the first coil 120 via at least one of the upper elastic member 150 or the lower elastic member 160, and may supply a driving signal to the first coil 120. In an example, a portion of the first lower elastic member 160-1 may be connected to one end of the first coil 120, and another portion of the first lower elastic member 160-1 may be conductively connected to the circuit board 190. A portion of the second lower elastic member 160-2 may be connected to the other end of the first coil 120, and another portion of the second lower elastic member 160-2 may be conductively connected to the circuit board 190.

For example, in an embodiment in which the first position sensor 170 is a driver IC, the first and second terminals B1 and B2 of the circuit board 190 may be a power terminal for supply of power, the third terminal may be a terminal for transmission and reception of a clock signal, and the fourth terminal may be a terminal for transmission and reception of a data signal.

In another embodiment, the first position sensor 170 may be a Hall sensor. The first position sensor 170 may include two input terminals for reception of a driving signal or power supplied thereto and two output terminals for output of a sensing voltage (or output voltage). In an example, a driving signal may be supplied to the first position sensor 170 through the first and second terminals B1 and B2 of the circuit board 190, and the output from the first position sensor 170 may be output to the outside through the third and fourth terminals B3 and B4. In addition, the first coil 120 may be conductively connected to the circuit board 190, and a driving signal may be supplied to the first coil 120 from outside through the circuit board 190. In an example, among the power terminals of the first position sensor 170, a ground terminal may be conductively connected to the cover member 300.

The capacitor 195 may be disposed or mounted on the first surface of the circuit board 190. The capacitor 195 may be of a chip type. In this case, the chip may include a first terminal, which corresponds to one end of the capacitor 195, and a second terminal, which corresponds to the other end of the capacitor 195. The capacitor 195 may alternatively be referred to as a “capacitive element” or a condenser.

The capacitor 195 may be conductively connected in parallel to the first and second terminals B1 and B2 of the circuit board 190, through which power (or a driving signal) is supplied to the first position sensor 170 from the outside. Alternatively, the capacitor 195 may be conductively connected in parallel to the terminals of the first position sensor 170, which are conductively connected to the first and second terminals B1 and B2 of the circuit board 190.

Since the capacitor 195 is conductively connected in parallel to the first and second terminals B1 and B2 of the circuit board 190, the capacitor 195 may serve as a smoothing circuit for removing ripple components included in power signals GND and VDD, which are supplied to the first position sensor 170 from the outside, and thus may supply stable and consistent power signals to the first position sensor 170.

The upper elastic member 150 may be coupled to the upper portion, the upper end, or the upper surface of the bobbin 110 and to the upper portion, the upper end, or the upper surface of the housing 140, and the lower elastic member 160 may be coupled to the lower portion, the lower end, or the lower surface of the bobbin 110 and to the lower portion, the lower end, or the lower surface of the housing 140.

The upper elastic member 150 and the lower elastic member 160 may elastically support the bobbin 110 with respect to the housing 140.

The upper elastic member 150 may include a plurality of upper elastic units (e.g. 150-1 and 150-2), which are conductively separated or isolated from each other, and the lower elastic member 160 may include a plurality of lower elastic units (e.g. 160-1 and 160-2), which are conductively separated or isolated from each other.

Each of the upper elastic member and the lower elastic member is described as including two elastic units. However, in another embodiment, at least one of the upper elastic member or the lower elastic member may be embodied as a single unit or a single construction.

The upper elastic member 150 may further include a first inner frame 151 coupled or secured to the upper portion, the upper surface, or the upper end of the bobbin 110, a second inner frame 152 coupled or secured to the upper portion, the upper surface, or the upper end of the housing 140, and a first frame connection portion 153 interconnecting the first inner frame 151 and the first outer frame 152.

The lower elastic member 160 may further include a second inner frame 161 coupled or secured to the lower portion, the lower surface, or the lower end of the bobbin 110, a second outer frame 162 coupled or secured to the lower portion, the lower surface, or the lower end of the housing 140, and a second frame connection portion 163 interconnecting the second inner frame 161 and the second outer frame 162. The inner frame may alternatively be referred to as an inner portion, the outer frame may alternatively be referred to as an outer portion, and the frame connection portion may alternatively be referred to as a connection portion.

Each of the first and second frame connection portions 153 and 163 may be formed so as to be bent or curved (or crooked) at least once to form a predetermined pattern.

Each of the upper elastic member 150 and the lower elastic member 160 may be formed of a conductive material.

Referring to FIG. 8, the circuit board 190 may be provided with two pads **5*a* and 5*b*. The two pads 5*a* and 5*b* may be conductively connected to the first position sensor 170. In addition, the first pad 5*a* of the circuit board 190 may be conductively connected to the first lower elastic unit 160-1, and the second pad 5*b* of the circuit board 190 may be conductively connected to the second lower elastic unit 160-2**.

In an example, the second outer frame 162 of the first lower elastic unit 160-1 may include a first bonding portion **4*a*, which is coupled or conductively connected to the first pad 5*a* of the circuit board 190, and the second outer frame 162 of the second lower elastic unit 160-2 may include a second bonding unit 4*b*, which is conductively connected to the second pad 5*b* of the circuit board 190**.

In another embodiment, at least one of the upper elastic member 150 or the lower elastic member 160 may include two elastic members. In an example, each of the two elastic members of any one of the upper elastic member 150 and the lower elastic member 160 may be coupled or conductively connected to a corresponding one of the first and second pads of the circuit board 190, and the first coil 120 may be conductively connected to the two elastic members.

Figure 9:
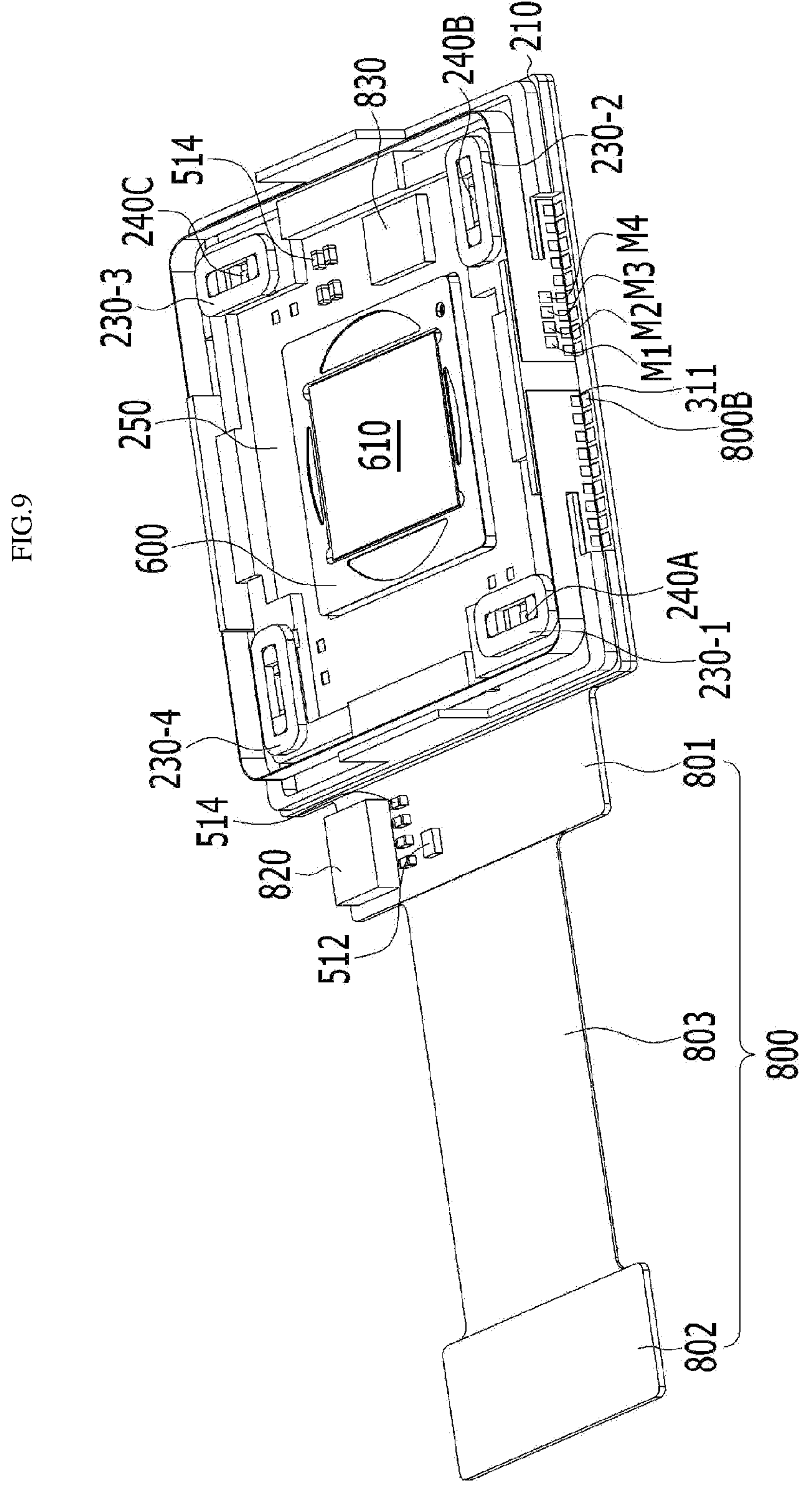
FIG. 9 is a perspective view of an image sensor unit.
Figure 10A:
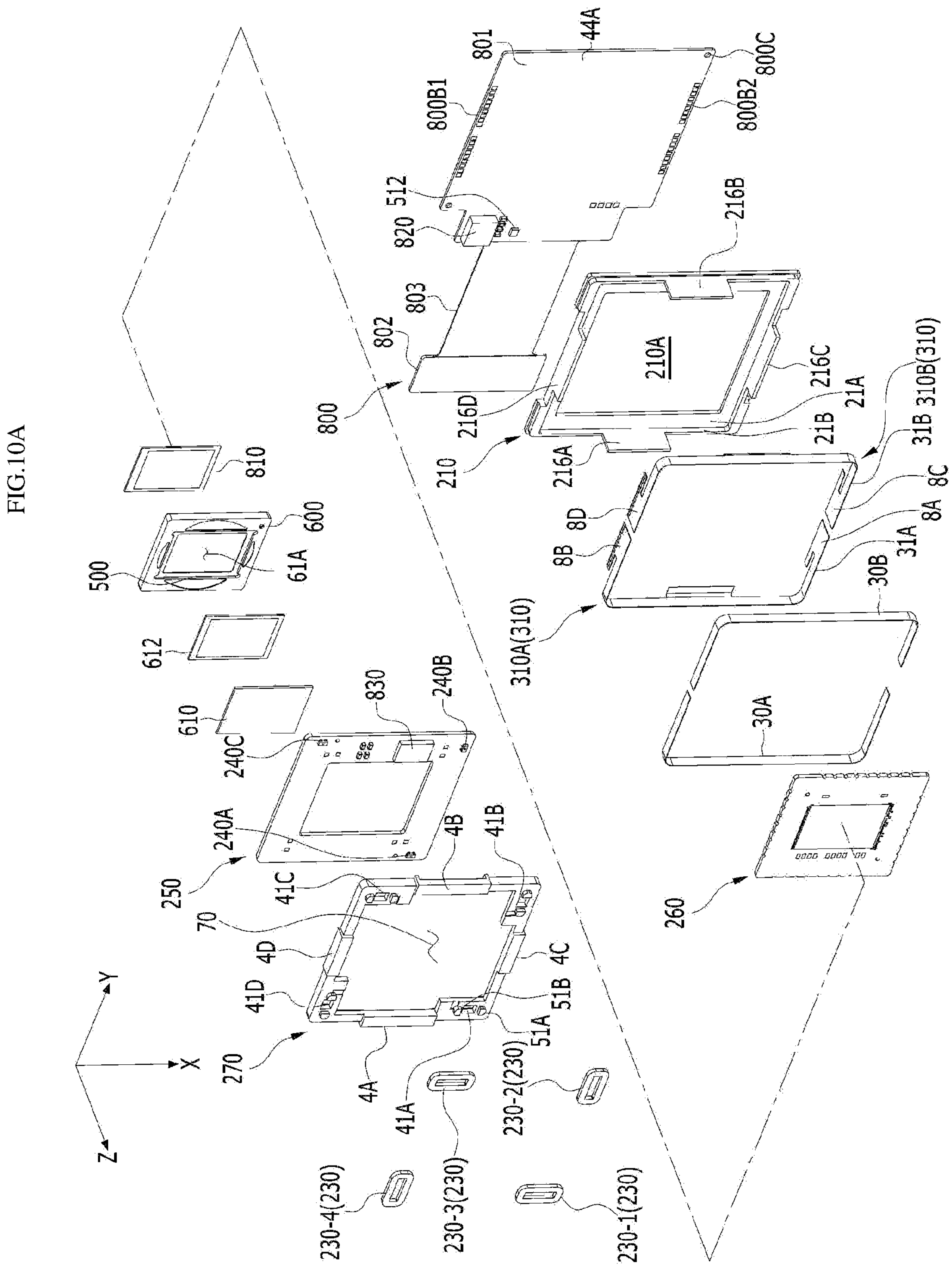
FIG. 10A is a first exploded perspective view of the image sensor unit in FIG. 9.
Figure 10B:
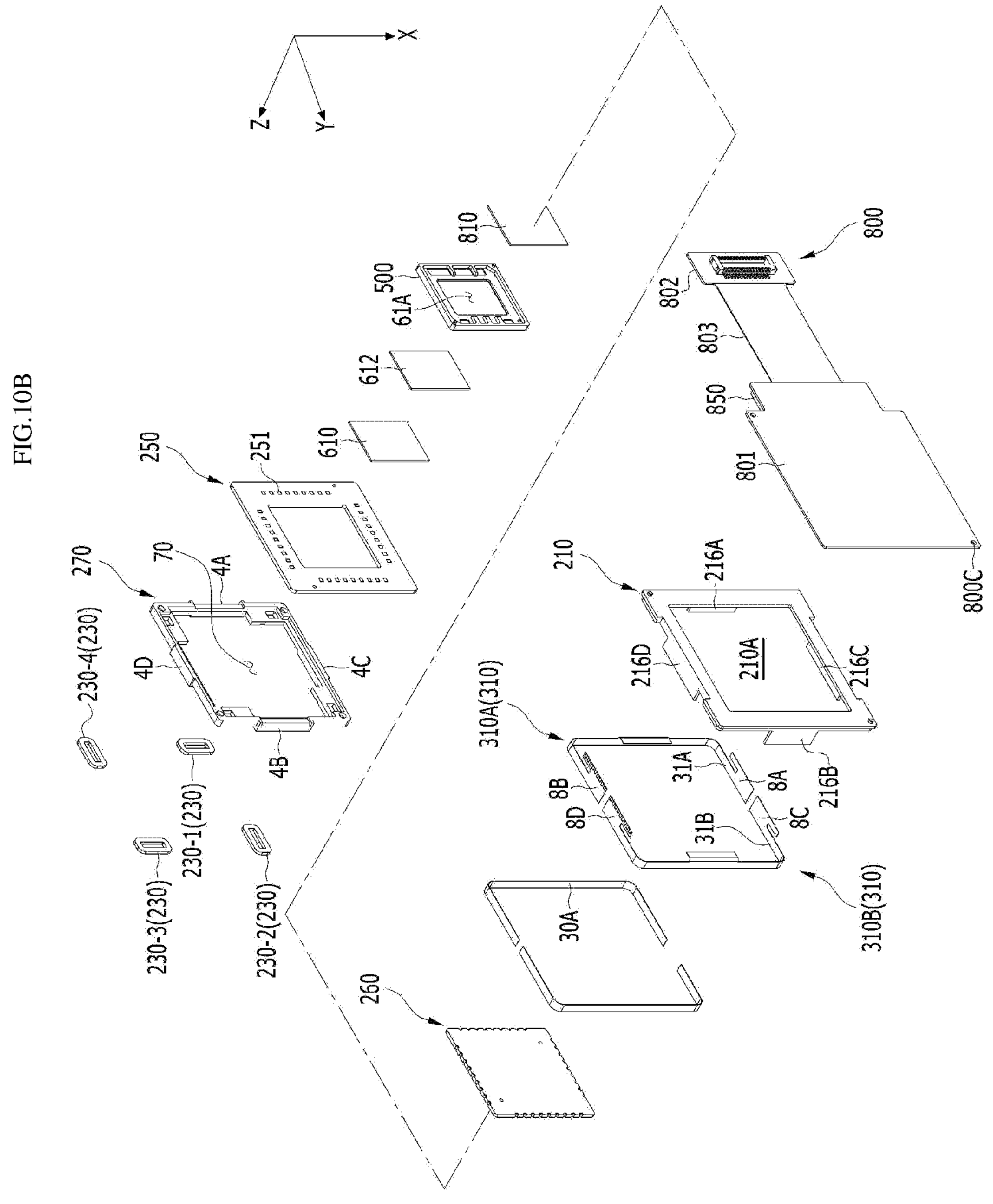
FIG. 10B is a second exploded perspective view of the image sensor unit in FIG. 9.
Figure 11:
FIG. 11 is a perspective view of the holder, the second coil, the image sensor, the OIS position sensor, and the first board unit in FIG. 10A.
Figure 11:
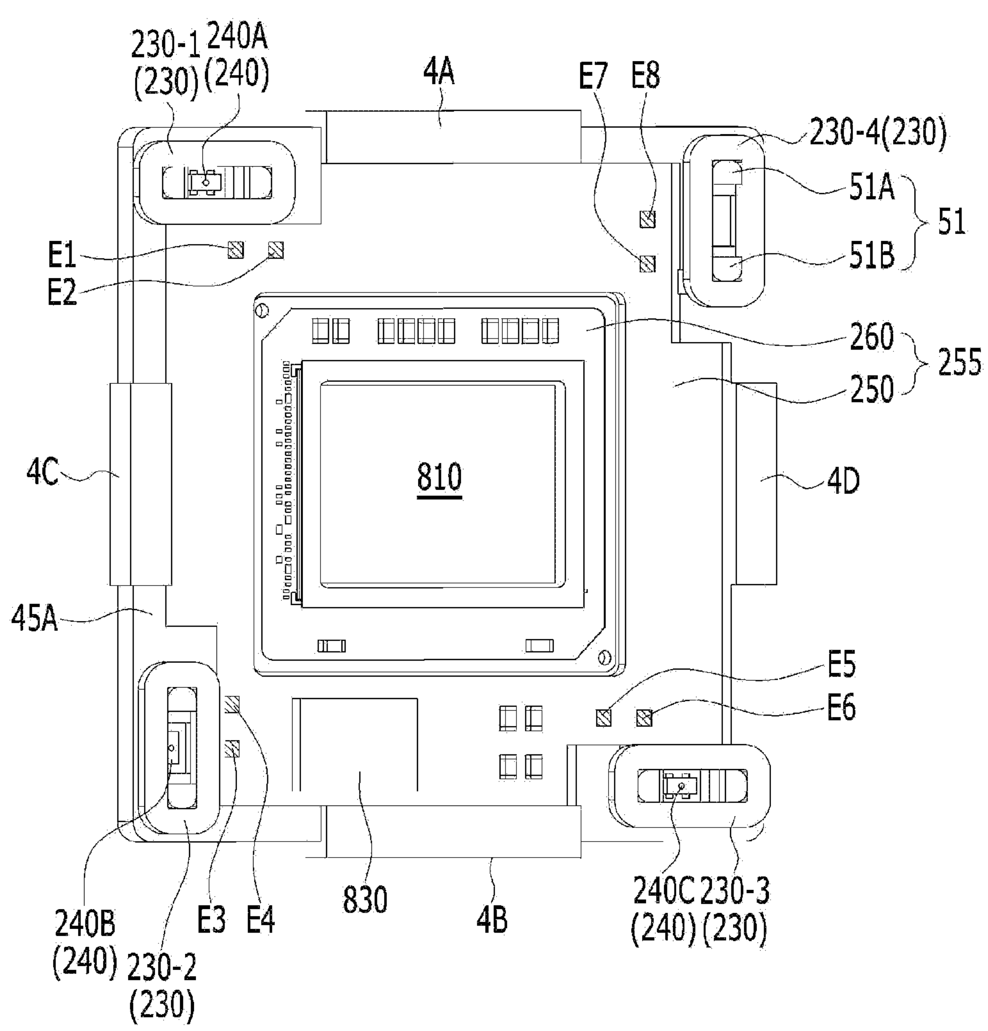
Figure 12:
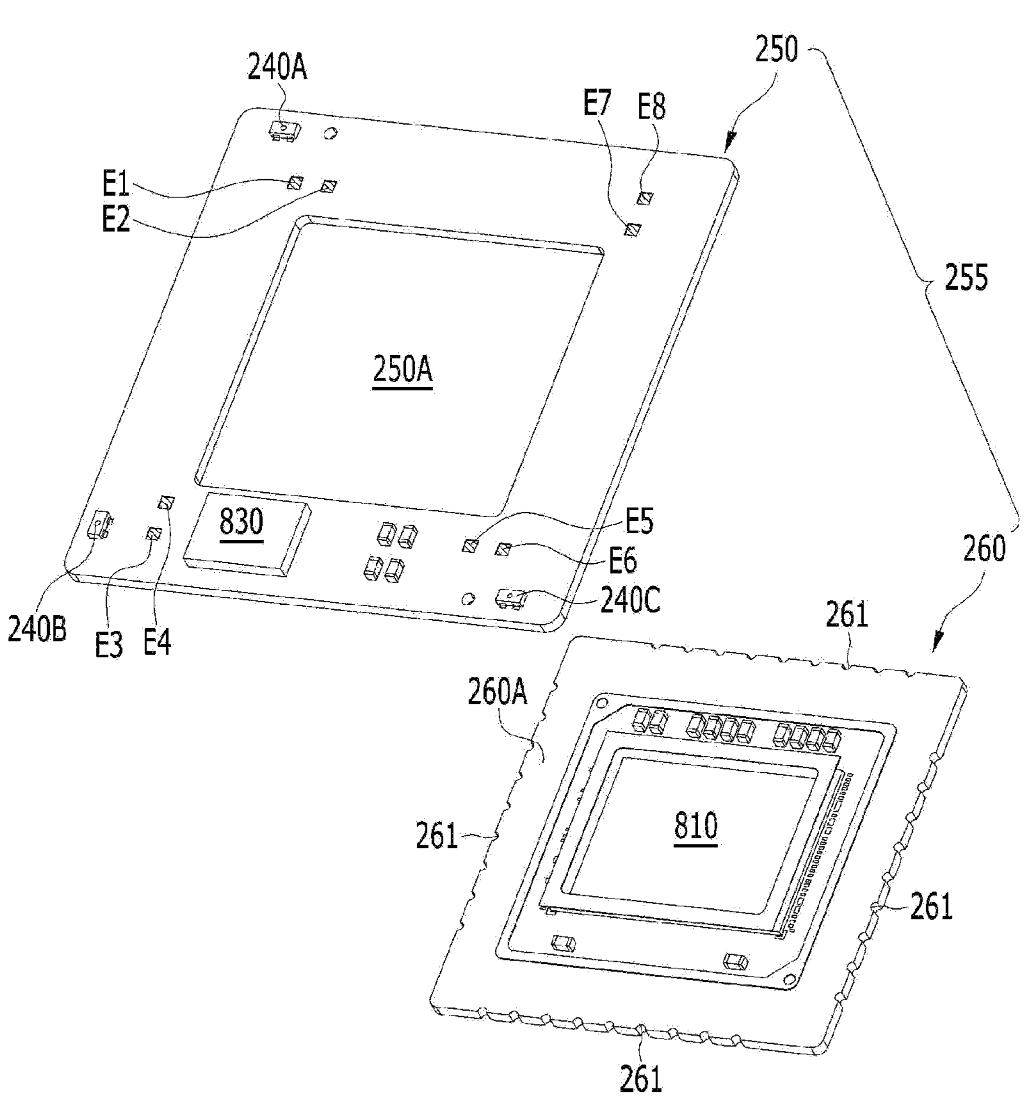
FIG. 12 is a first perspective view of a first circuit board and a second circuit board of the first board unit.
Figure 13:
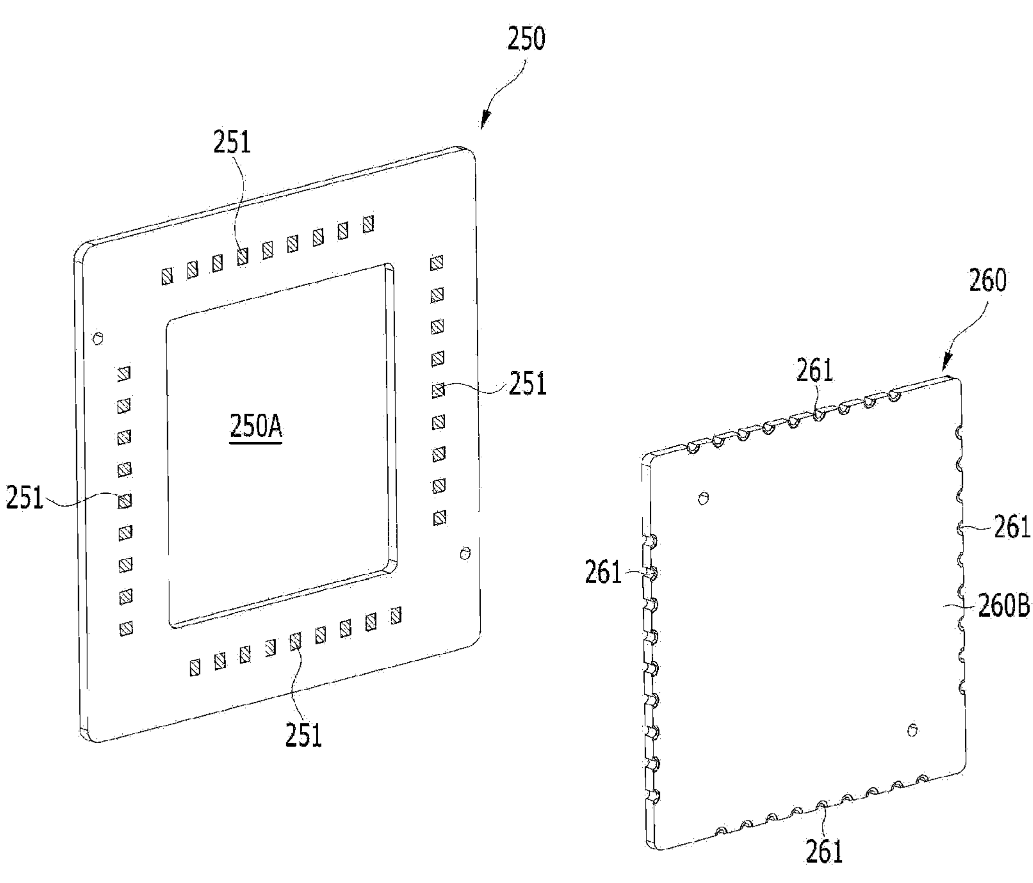
FIG. 13 is a second perspective view of the first circuit board and the second circuit board of the first board unit.
Figure 14A:
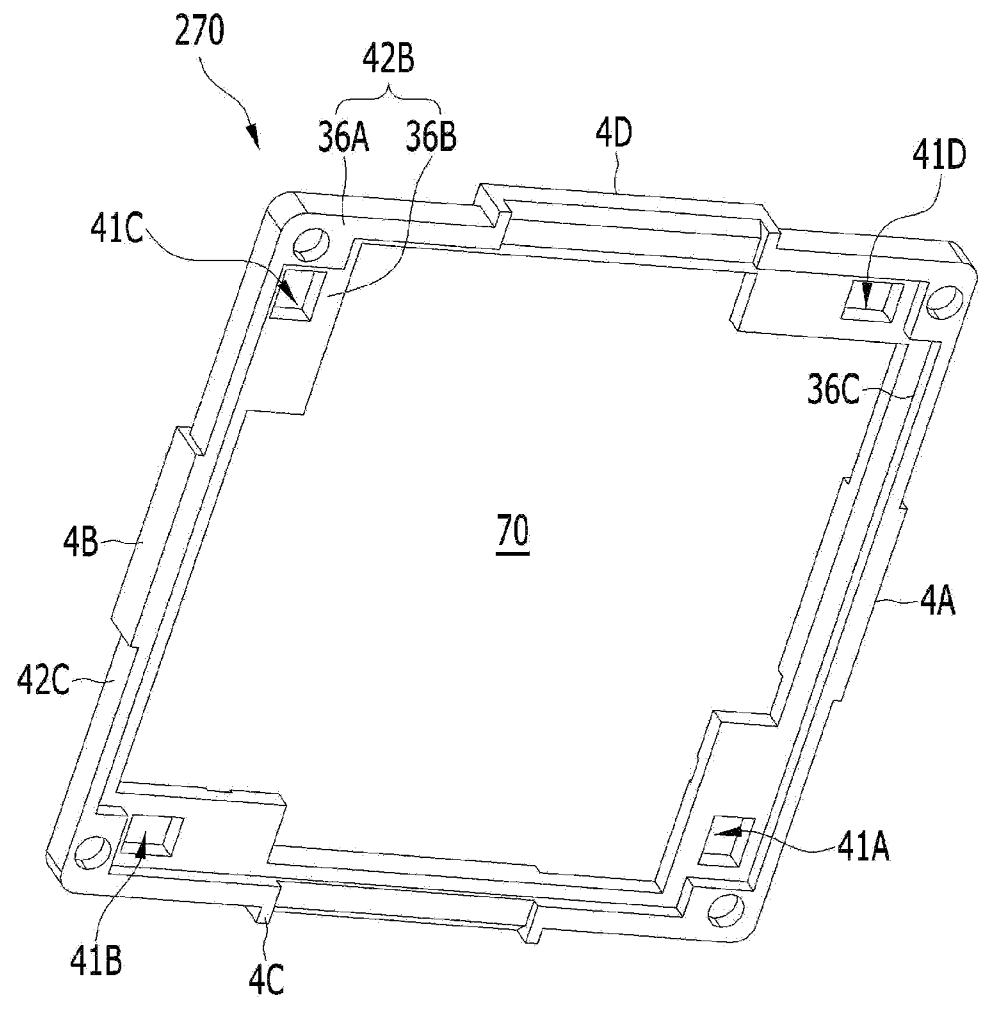
FIG. 14A is a bottom perspective view of the holder.
Figure 14B:
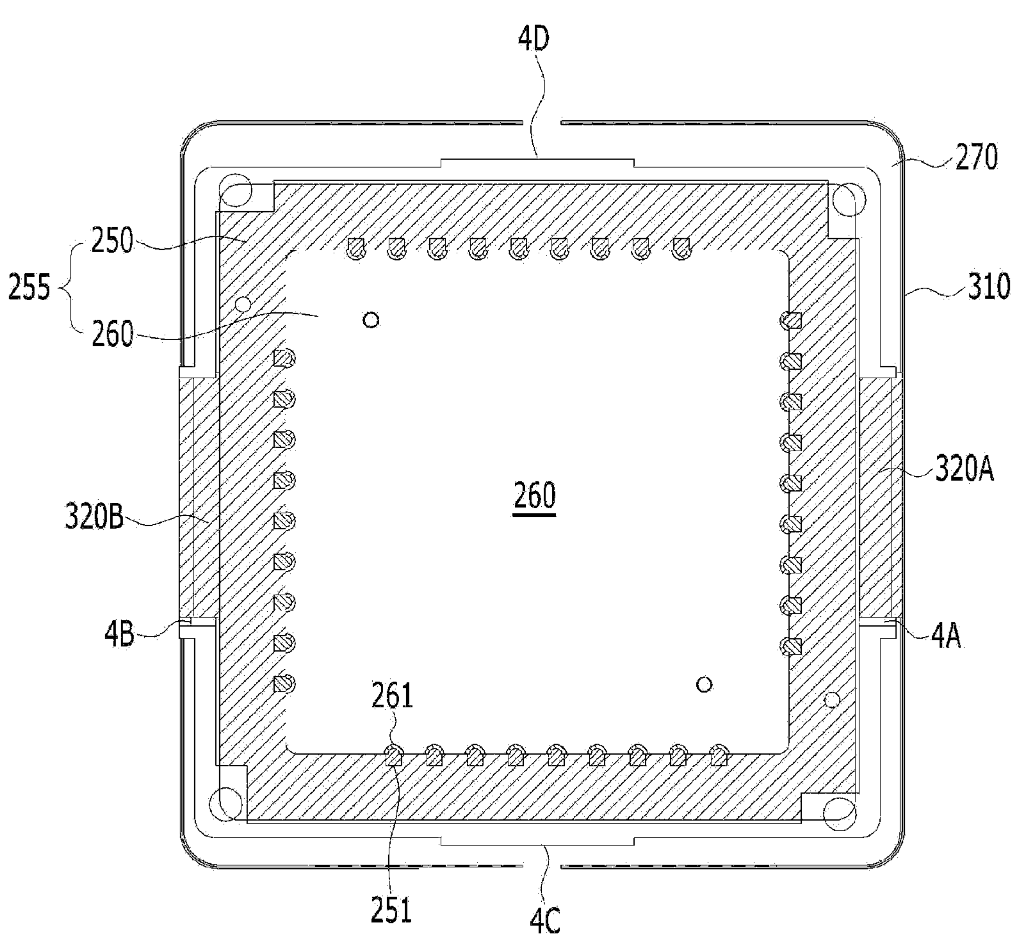
FIG. 14B is a view showing the first board unit disposed on the holder.
Figure 15A:
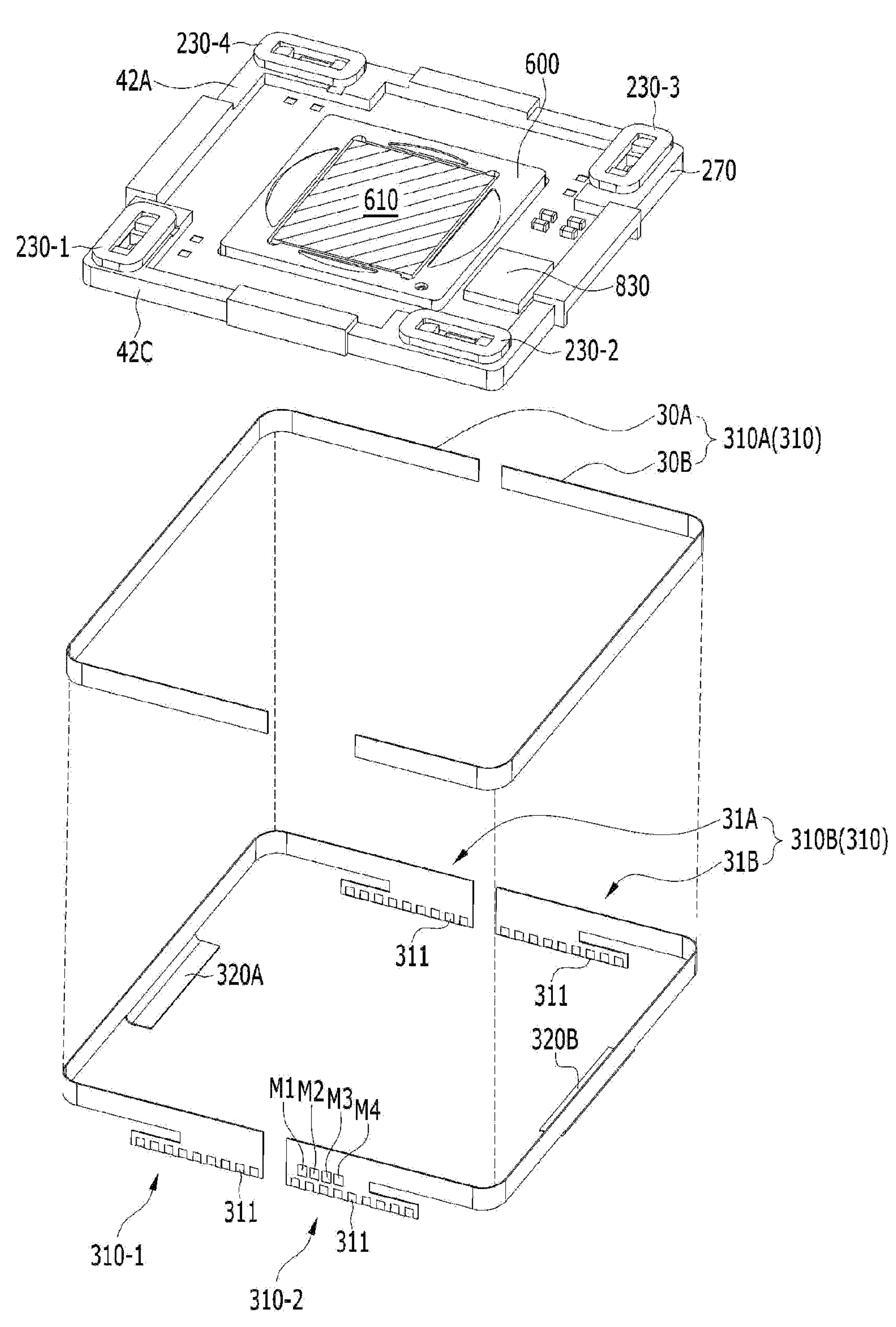
FIG. 15A is a perspective view of the holder, the second coil, a filter holder, a filter, and a support board.
Figure 15B:
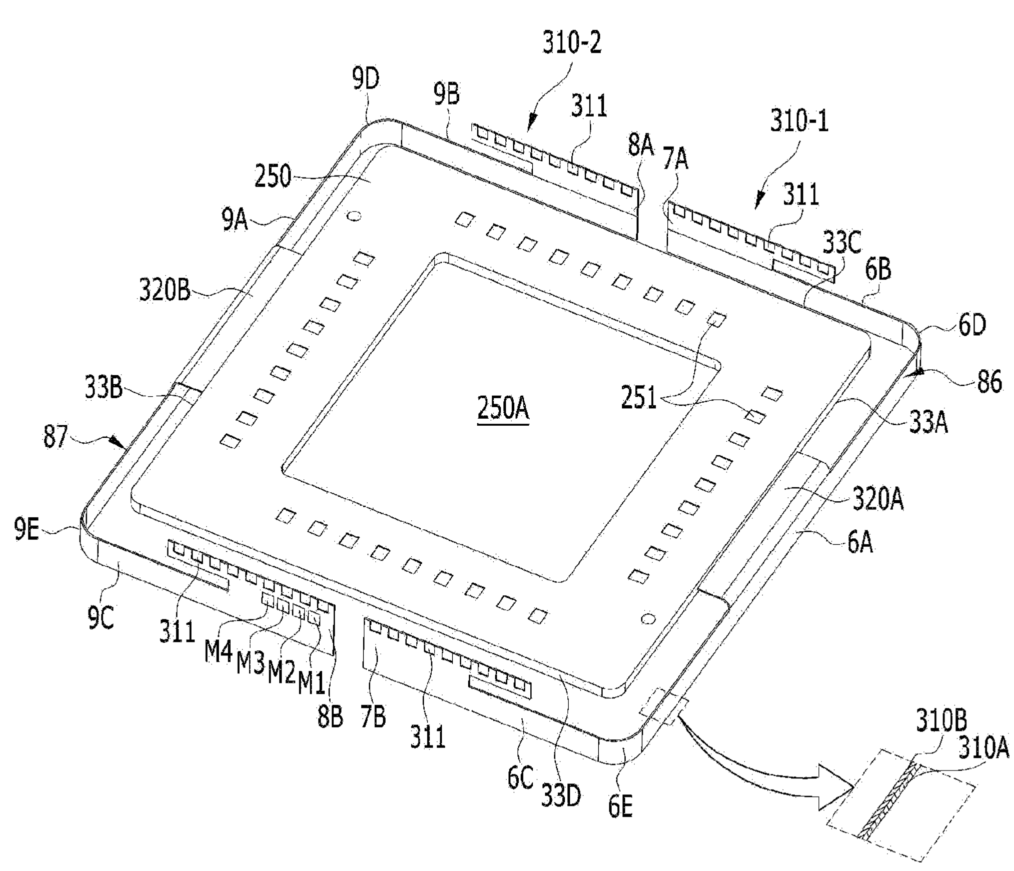
FIG. 15B is a bottom perspective view of the first circuit board and the support board.
Figure 16A:
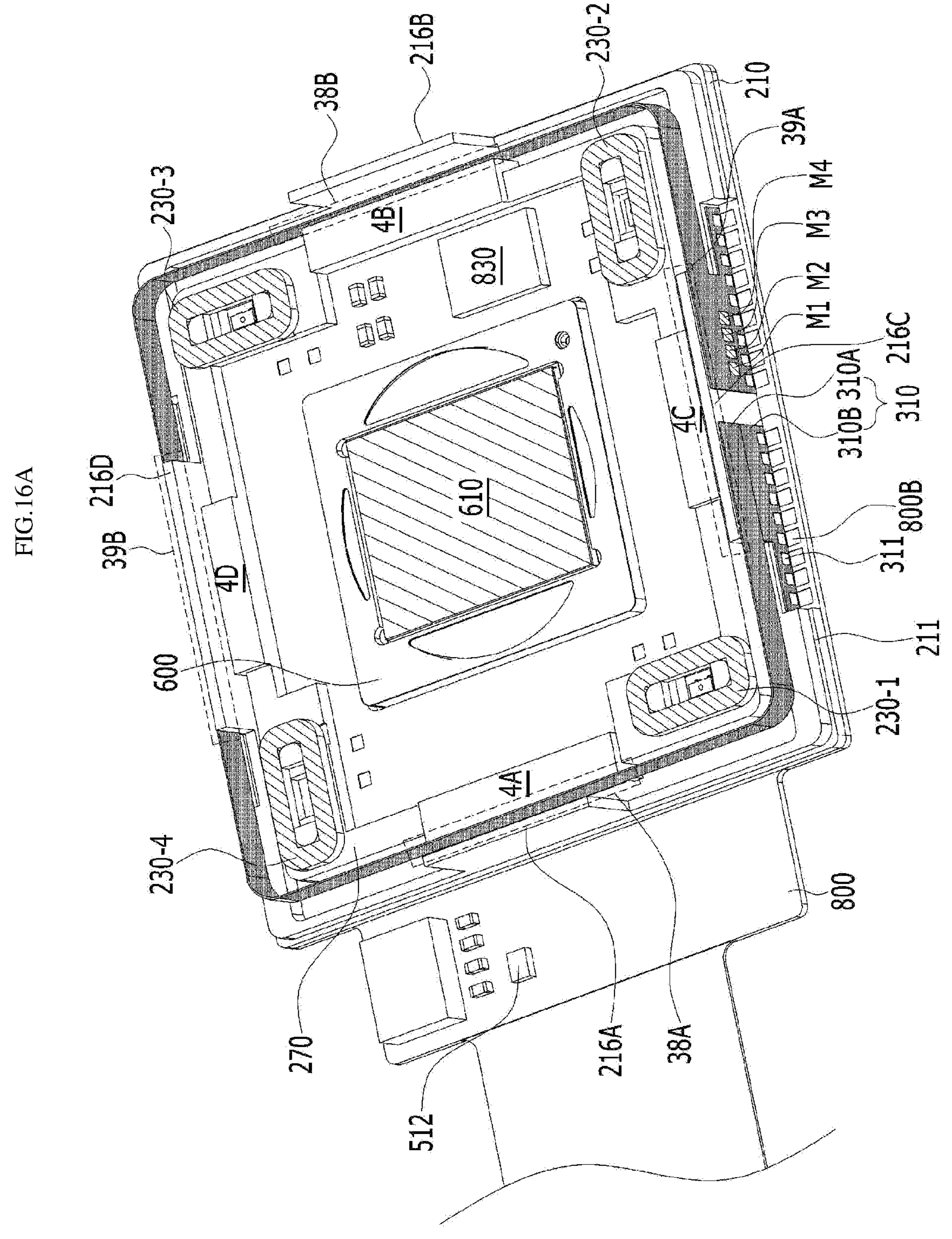
FIG. 16A is a first perspective view of the support board coupled to the holder and to the base.
Figure 16B:
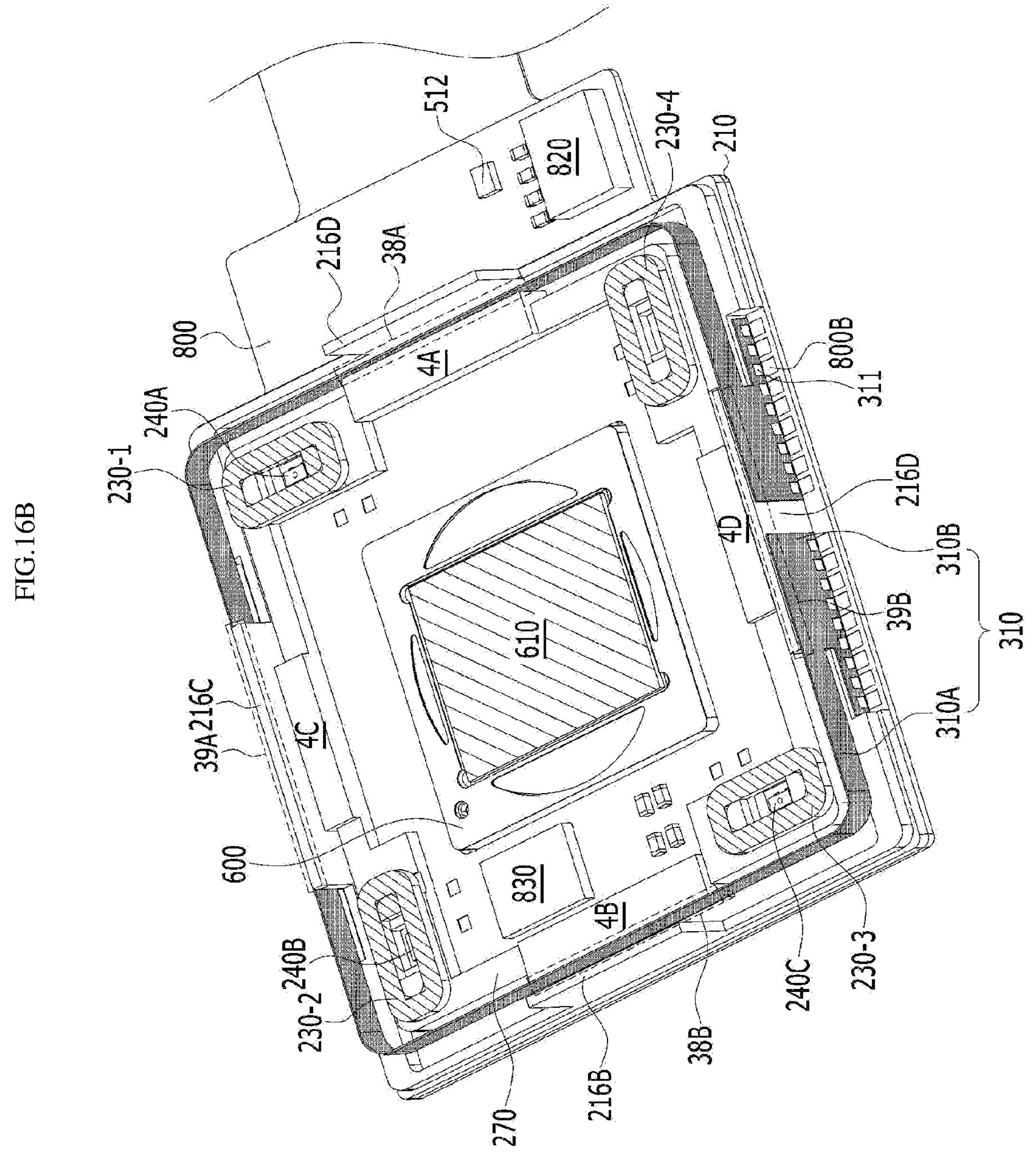
FIG. 16B is a second perspective view of the support board coupled to the holder and to the base.

FIG. 9 is a perspective view of the image sensor unit 350, FIG. 10A is a first exploded perspective view of the image sensor unit 350 in FIG. 9, FIG. 10B is a second exploded perspective view of the image sensor unit 350 in FIG. 9, FIG. 11 is a perspective view of the holder 270, the second coil 230, the image sensor 810, the OIS position sensor 240, and the first board unit 255 in FIG. 10A, FIG. 12 is a first perspective view of a first circuit board 250 and a second circuit board 260 of the first board unit 255, FIG. 13 is a second perspective view of the first circuit board 250 and the second circuit board 260 of the first board unit 255, FIG. 14A is a bottom perspective view of the holder 270, FIG. 14B is a view showing the first board unit 255 disposed on the holder 270, FIG. 15A is a perspective view of the holder 270, the second coil 230, a filter holder 600, the filter 610, and a support board 310, FIG. 15B is a bottom perspective view of the first circuit board 250 and the support board 310, FIG. 16A is a first perspective view of the support board 310 coupled to the holder 270 and to the base 210, and FIG. 16B is a second perspective view of the support board 310 coupled to the holder 270 and to the base 210.

Referring to FIGS. 9 to 16B, the image sensor unit 350 may include a fixed unit and an OIS moving unit spaced apart from the fixed unit. The image sensor unit 350 may include a support board 310 interconnecting the fixed unit and the OIS moving unit.

The support board 310 may support the OIS moving unit with respect to the fixed unit such that the OIS moving unit is capable of moving in a direction perpendicular to the optical axis or such that the OIS moving unit is capable of tilting or rotating within a predetermined range about the optical axis.

The OIS moving unit may include a first board unit 255, an image sensor 810 disposed on the first board unit 255, a second coil 230 disposed so as to face the magnet 130 in the optical-axis direction, and a second position sensor 240 disposed on the first board unit 255.

The OIS moving unit may further include a holder 270 disposed between the second coil 230 and the first board unit 255 and accommodating the first board unit 255. The holder 270 may alternatively be referred to as a “spacing member”.

The OIS moving unit may further include a filter 610. The OIS moving unit may further include a filter holder 600 configured to accommodate the filter 610.

The fixed unit may include a second board unit 800 spaced apart from the first board unit 255 and conductively connected to the first board unit 255. The fixed unit may further include a base 210 coupled to the second board unit 800. In addition, the fixed unit may include a cover member 300 coupled to the base 210. In addition, the fixed unit may include the housing 140 of the AF moving unit and the magnet 130 disposed in the housing 140.

The fixed unit may further include a base 210 accommodating the second board unit 800 and coupled to the cover member 300.

The holder 270 may be disposed under the AF moving unit. In an example, the holder 270 may be embodied as a non-conductive member. In an example, the holder 270 may be made of an injection-molded material, which is easily embodied through an injection-molding process. In addition, the holder 27 may be formed of an insulating material. In addition, for example, the holder 270 may be formed of a resin or plastic material.

Referring to FIGS. 11, 14A, 14B, and 15, the holder 270 may include an upper surface 42A facing the fixed unit (e.g. the second circuit board 800), a lower surface 42B formed opposite the upper surface 42A, and a side surface 42C interconnecting the upper surface 42A and the lower surface 42B.

The holder 270 may support the first board unit 255, and may be coupled to the first board unit 255. In an example, the first board unit 255 may be disposed under the holder 270. In an example, the lower portion, the lower surface, or the lower end of the holder 270 may be coupled to the upper portion, the upper surface, or the upper end of the first board unit 255.

Referring to FIG. 14A, the lower surface 42B of the holder 270 may include a first surface 36A and a second surface 36B. The second surface 36B may have a height difference with respect to the first surface 36A in the optical-axis direction. In an example, the second surface 36B may be located above (or at a higher position than) the first surface 36A. In an example, the second surface 36B may be located closer to the upper surface 42A of the holder 270 than the first surface 36A. In an example, a distance between the upper surface 42A of the holder 270 and the second surface 36B may be shorter than a distance between the upper surface 42A of the holder 270 and the first surface 36A.

The holder 270 may include a third surface 36C interconnecting the first surface 36A and the second surface 36B. In an example, the first surface 36A and the second surface 36B may be parallel to each other, and the third surface 36C may be perpendicular to the first surface 36A and/or the second surface 36B, but the disclosure is not limited thereto. In another embodiment, the included angle between the third surface 36C and the first surface 36A (or the second surface 36B) may be an acute angle or an obtuse angle.

The first surface 36A may be located on the edge of the lower surface 42B of the holder 270, and the second surface 36B may be located on the center region of the holder 270.

The holder 270 may accommodate or support the second coil 230. The holder 270 may support the second coil 230 such that the second coil 230 is spaced apart from the first board unit 255.

The holder 270 may include a bore 70 formed therein so as to correspond to one region of the first board unit 255. In an example, the bore 70 in the holder 270 may be a through-hole formed through the holder 270 in the optical-axis direction. In an example, the bore 70 in the holder 270 may correspond to, face, or overlap the image sensor 810 in the optical-axis direction.

The shape of the bore 70 in the holder 270 viewed from above may be a polygonal shape such as a quadrangular shape, a circular shape, or an elliptical shape, but the disclosure is not limited thereto. The bore may be formed in any of various shapes.

In an example, the bore 70 in the holder 270 may have a shape or a size suitable for exposing the image sensor 810, a portion of the upper surface of the first circuit board 250, a portion of the upper surface of the second circuit board 260, and elements. In an example, the area of the bore 70 in the holder 270 may be larger than the area of the image sensor 810, and may be smaller than the area of the first surface of the first circuit board 250. In an example, the bore 70 may be formed in the second surface 36B of the lower surface 42B of the holder 270.

The holder 270 may have holes 41A, 41B, and 41C formed therein so as to correspond to the second position sensor 240. In an example, the holder 270 may have holes 41A, 41B, and 41C formed therein at positions corresponding to first to third sensors 240A, 240B, and 240C of the second position sensor 240.

In an example, the holes 41A, 41B, and 41C may be disposed adjacent to the corners of the holder 270. The holder 270 may have a dummy hole 41D formed therein at a position that does not correspond to the second position sensor 240 and is adjacent to the corner of the holder 270 that does not correspond to the second position sensor 240. The dummy hole 41D may be formed in order to enable weight balancing of the OIS moving unit during OIS operation. In another embodiment, the dummy hole 41D may not be formed.

The holes 41A, 41B, and 41C may be through-holes formed through the holder 270 in the optical-axis direction. In an example, the holes 41A, 41B, and 41C may be formed in the second surface 36B of the lower surface 42B of the holder 270, but the disclosure is not limited thereto. In another embodiment, the holes may be formed in the first surface of the lower surface of the holder 270. In still another embodiment, the holes 41A, 41B, and 41C in the holder 270 may be omitted.

The holder 270 may be provided on the upper surface 42A thereof with at least one coupling protrusion 51 for coupling to the second coil 230. The coupling protrusion 51 may protrude from the upper surface 42A of the holder 270 toward the AF moving unit. In an example, the coupling protrusion 51 may be formed adjacent to each of the holes 41A to 41D in the holder 270.

In an example, two coupling protrusions 51A and 51B may be disposed or arranged so as to correspond to respective holes 41A, 41B, 41C, and 41D in the holder 270. In an example, each of the holes 41A, 41B, 41C, and 41D in the holder 270 may be located between the two coupling protrusions 51A and 51B.

The first board unit 255 may include a first circuit board 250 and a second circuit board 260, which are conductively connected to each other. The second circuit board 260 may alternatively be referred to as a "sensor board".

The first board unit 255 may be disposed on the lower surface 42B of the holder 270. In an example, the first board unit 255 may be disposed on the second surface 36B of the lower surface 42B of the holder 270. In an example, the first circuit board 250 may be disposed on the second surface 36B of the lower surface 42B of the holder 270. In an example, the first surface 60A (refer to FIG. 12) of the first circuit board 250 may be coupled or attached to the second surface 36B of the lower surface 42B of the holder 270 by means of an adhesive member.

In this case, the first surface 60A of the first circuit board 250 may be a surface that faces the AF moving unit and on which the second position sensor 240 is disposed. In addition, the second surface 60B of the first circuit board 250 may be a surface formed opposite the first surface 60A of the first circuit board 250.

The first circuit board 250 may alternatively be referred to as a sensor board, a main board, a main circuit board, a sensor circuit board, or a moving circuit board. In all of the embodiments, the first circuit board 250 may alternatively be referred to as a "second board" or a "second circuit board", and the second circuit board 260 may alternatively be referred to as a "first board" or a "first circuit board".

The position sensors 240A, 240B, and 240C may be disposed on the first circuit board 250. In addition, a controller 830 and/or a circuit element (e.g. a capacitor) may be disposed on the first circuit board 250. The image sensor 810 may be disposed on the second circuit board 260.

The first circuit board 250 may include first terminals E1 to E8 to be conductively connected to the second coil 230. Here, the first terminals E1 to E8 may alternatively be referred to as "first pads" or "first bonding parts". The first terminals E1 to E8 of the first circuit board 250 may be disposed or arranged on the first surface 60A of the first circuit board 250. For example, the first circuit board 250 may be a printed circuit board or a flexible printed circuit board (FPCB).

The first circuit board 250 may include a bore 250A formed therein so as to correspond to or face the lens module 400 and the bore in the bobbin 110. In an example, the bore 250A in the first circuit board 250 may be a through-hole formed through the first circuit board 250 in the optical-axis direction, and may be formed in the center of the first circuit board 250.

When viewed from above, the shape of the first circuit board 250, e.g. the outer circumferential shape thereof, may be a shape coinciding with or corresponding to the shape of the holder 270, for example, a quadrangular shape. In addition, when viewed from above, the shape of the bore 250A in the first circuit board 250 may be a polygonal shape such as a quadrangular shape, a circular shape, or an elliptical shape.

In addition, the first circuit board 250 may include at least one second terminal 251 to be conductively connected to the second circuit board 260. Here, the second terminal 251 may alternatively be referred to as a "second pad" or a "second bonding part". The second terminal 251 of the first circuit board 250 may be disposed or arranged on the second surface 60B of the first circuit board 250.

In an example, the at least one second terminal 251 may be provided in a plural number, and the plurality of second terminals 251 may be disposed or arranged in a region between the bore 250A in the first circuit board 250 and any one side of the first circuit board 250 in a direction parallel to the side of the first circuit board 250. In an example, the plurality of second terminals 251 may be arranged around the bore 250A.

The second circuit board 260 may be disposed under the first circuit board 250.

When viewed from above, the shape of the second circuit board 260 may be a polygonal shape (e.g. a quadrangular shape, a square shape, or a rectangular shape), but the disclosure is not limited thereto. In another embodiment, the shape of the second circuit board may be a circular shape or an elliptical shape.

In an example, when the shape of the second circuit board 260 is a quadrangular shape, the area of the front surface of the second circuit board 260 may be larger than the area of the bore 250A in the first circuit board 250. In an example, the lower side of the bore 250A in the first circuit board 250 may be shielded or blocked by the second circuit board 260.

In an example, when viewed from above or below, the outer side surface (or the side) of the second circuit board 260 may be located between the outer side surface (or the side) of the first circuit board 250 and the bore 250A in the first circuit board 250.

The image sensor 810 may be disposed on or coupled to a first surface 260A (e.g. the upper surface) of the second circuit board 260. Referring to FIGS. 12 and 13, the second circuit board 260 may include at least one terminal 261 conductively connected to the at least one second terminal 251 of the first circuit board 250. In an example, the terminal 261 of the second circuit board 260 may be provided in a plural number.

In an example, the at least one terminal 261 of the second circuit board 260 may be formed on the side surface or the outer side surface of the second circuit board 260 that connects the first surface 260A of the second circuit board 260 to a second surface 260B thereof. The first surface 260A may be a surface facing the first circuit board 250, and the second surface 260B may be a surface formed opposite the first surface 260A. In an example, the terminal 261 may take the form of a recess depressed into the side surface of the second circuit board 260. Alternatively, in an example, the terminal 261 may take the form of a semicircular-shaped or a semi-elliptical-shaped via formed in the side surface of the second circuit board 260. In another embodiment, the at least one terminal of the second circuit board 260 that is conductively connected to the second terminal 251 of the first circuit board 250 may be formed on the first surface 260A of the second circuit board 260.

In an example, the terminal 261 of the second circuit board 260 may be coupled to the terminal 251 of the first circuit board 250 by means of solder or a conductive adhesive member. The first and second circuit boards 250 and 260 may be printed circuit boards or FPCBs.

The second coil 230 may be disposed on the holder 270. The second coil 230 may be disposed on the upper surface 42A of the holder 270. The second coil 230 may be disposed under the magnet 130.

The second coil 230 may be coupled to the holder 270. In an example, the second coil 230 may be coupled to the upper surface 42A of the holder 270. In an example, the second coil 230 may be coupled to the coupling protrusion 51 of the holder 270.

In an example, the second coil 230 may correspond to, face, or overlap the magnet 130 disposed on the fixed unit in the direction of the optical axis OA. In another embodiment, the fixed unit may include an OIS-dedicated magnet, which is provided separately from the magnet of the AF moving unit, and the second coil may correspond to, face, or overlap the OIS-dedicated magnet. In this case, the number of OIS-dedicated magnets may be identical to the number of coil units included in the second coil 230.

In an example, the second coil 230 may include a plurality of coil units 230-1 to 230-4. In an example, the second coil 230 may include four coil units 230-1 to 230-4 disposed on the four corners of the holder 270.

Each of the coil units 230-1 to 230-4 may take the form of a coil block having a closed curve shape or a ring shape. In an example, the coil unit may have a cavity or a hole formed therein. In an example, the coil units may be embodied as fine pattern (FP) coils.

In another embodiment, the second coil 230 may be disposed on the first circuit board 250, or may be coupled to the first circuit board 250.

The second coil 230 may be conductively connected to the first circuit board 250. In an example, the first coil unit 230-1 may be conductively connected to the two first terminals E1 and E2 of the first circuit board 250, the second coil unit 230-2 may be conductively connected to two other first terminals E3 and E4 of the first circuit board 250, the third coil unit 230-3 may be conductively connected to two other first terminals E5 and E6 of the first circuit board 250, and the fourth coil unit 230-4 may be conductively connected to two other first terminals E7 and E8 of the first circuit board 250.

Power or a driving signal may be supplied to the first to fourth coil units 230-1 to 230-4 through the first circuit board 250. The power or the driving signal supplied to the second coil 230 may be a DC signal, an AC signal, or a signal containing both DC and AC components, and may be of a current type or a voltage type.

Currents may be independently applied to at least three coil units among the four coil units 230-1 to 230-4.

The second position sensor 240 may be disposed on, coupled to, or mounted on the first surface 60A (e.g. the upper surface) of the first circuit board 250. The second position sensor 240 may detect displacement of the OIS moving unit in a direction perpendicular to the optical axis OA, for example, shift or movement of the OIS moving unit in a direction perpendicular to the optical axis. In addition, the second position sensor 240 may detect rotation, rolling, or tilting of the OIS moving unit within a predetermined range with respect to the optical axis or about the optical axis. The first position sensor 170 may alternatively be referred to as an “AF position sensor”, and the second position sensor 240 may alternatively be referred to as an “OIS position sensor”.

In an example, the second position sensor 240 may be disposed below the second coil 230.

In an example, the second position sensor 240 may not overlap the second coil 230 in a direction perpendicular to the optical axis. In an example, the sensing element of the second position sensor 240 may not overlap the second coil 230 in a direction perpendicular to the optical axis. The sensing element may be a part that detects a magnetic field.

In an example, the center of the second position sensor 240 may not overlap the second coil 230 in a direction perpendicular to the optical axis. In an example, the center of the second position sensor 240 may be a spatial center in the x-axis direction and the y-axis direction in an xy-coordinate plane perpendicular to the optical axis. Alternatively, the center of the second position sensor 240 may be a spatial center in the x-axis, y-axis, and z-axis directions.

In another embodiment, at least a portion of the second position sensor 240 may overlap the second coil 230 in a direction perpendicular to the optical axis.

In an example, the second position sensor 240 may overlap the holes 41A to 41C in the holder 270 in the optical-axis direction. In addition, in an example, the second position sensor 240 may overlap the cavity in the second coil 230 in the optical-axis direction. In addition, in an example, at least some of the holes 41A to 41C in the holder 270 may overlap the cavity in the second coil 230 in the optical-axis direction.

In an example, the second position sensor 240 may include a first sensor 240A, a second sensor 240B, and a third sensor 240C, which are spaced apart from each other.

The third sensor 240C may be a sensor that is different from or is of a different type from the first sensor 240A and/or the second sensor 240B. For example, each of the first sensor 240A and the second sensor 240B may be a displacement detection sensor, and the third sensor 240C may be an angle sensor configured to detect rotation, tilting, or rolling.

For example, each of the first and second sensors 240A and 240B may be a Hall sensor. In another embodiment, each of the first and second sensors 240A and 240B may be a driver IC including a Hall sensor and a driver. The description of the first position sensor 170 may be equally or similarly applied to the first and second sensors 240A and 240B. The third sensor 240C may be a rotation (rolling) detection sensor configured to detect rotation, tilting, or rolling of the OIS moving unit about the optical axis. For example, the third sensor 240C may be a magnetic angle sensor. For example, the third sensor 240C may be a tunnel magnetoresistance (TMR) sensor. For example, the TMR sensor may be a TMR magnetic angle sensor.

In another embodiment, each of the first to third sensors 240A to 240C may be a magnetic sensor. In still another embodiment, each of the first and second sensors 240A and 240B may be a tunnel magnetoresistance (TMR) sensor. In addition, in a further embodiment, the third sensor 240C may be a Hall sensor.

Each of the first to third sensors 240A, 240B, and 240C may be conductively connected to the first circuit board 250.

In an example, each of the first to third sensors 240A, 240B, and 240C may be disposed below the cavity in a corresponding one of the coil units 230-1 to 230-3. In an example, each of the first to third sensors 240A, 240B, and 240C may be disposed in a corresponding one of the holes 41A to 41C in the holder 270.

In an example, each of the first to third sensors 240A, 240B, and 240C may not overlap a corresponding one of the coil units 230-1 to 230-3 in a direction perpendicular to the optical axis. The first to third sensors 240A, 240B, and 240C may overlap the holder 270 in a direction perpendicular to the optical axis.

Since the first to third sensors 240A, 240B, and 240C are disposed so as not to overlap the OIS coil 230 in a direction perpendicular to the optical axis, the influence of the magnetic field of the OIS coil 230 on the output of the OIS position sensor 240 may be reduced, and accordingly, it is possible to accurately perform OIS feedback operation and to ensure the reliability of OIS operation.

In an example, at least a portion of the first sensor 240A may overlap the first magnet unit 130-1 in the optical-axis direction, at least a portion of the second sensor 240B may overlap the second magnet unit 130-2 in the optical-axis direction, and at least a portion of the third sensor 240C may overlap the third magnet unit 130-3 in the optical-axis direction.

In an example, at the initial position of the OIS moving unit, the center of the first sensor 240A may correspond to, face, or overlap the center of the first magnet unit 130-1 in the optical-axis direction, the center of the second sensor 240B may correspond to, face, or overlap the center of the second magnet unit 130-2 in the optical-axis direction, and the center of the third sensor 240C may correspond to, face, or overlap the center of the third magnet unit 130-3 in the optical-axis direction.

In an example, the center of each of the first to third sensors 240A to 240C may be the center of the magnetic detection area of each of the first to third sensors 240A to 240C. Alternatively, in an example, the center of each of the first to third magnet units 130-1 to 130-4 may be the center of the boundary area between the N pole and the S pole. In another embodiment, the center of the third sensor 240C may not overlap the center of the third magnet unit 130-3 in the optical-axis direction.

The base 210 may be disposed under the first board unit 255. The base 210 may have a polygonal shape, for example, a quadrangular shape, which coincides with or corresponds to the shape of the cover member 300 or the first board unit 255.

In an example, the base 210 may include a lower plate 21A and a side plate 21B protruding from the edge of the lower plate 21A. The lower plate 21A may correspond to or face a first region 801 of the second board unit 800, and the side plate 21B may protrude or extend from the lower plate 21A toward the side plate 302 of the cover member 300. In an example, the base 210 may include a bore 210A formed in the lower plate 21A thereof. The bore 210A in the base 210 may be a through-hole formed through the base 210 in the optical-axis direction. In another embodiment, the base may not have a bore.

In an example, the side plate 21B of the base 210 may be coupled to the side plate 302 of the cover member 300. The base 210 may include a stair 211 (refer to FIG. 16A), to which an adhesive is applied in order to be bonded to the side plate 302 of the cover member 300. In this case, the stair 211 may guide the side plate 302 of the cover member 300 to be coupled to the upper side thereof. The stair 211 of the base 210 and the lower end of the side plate 302 of the cover member 300 may be bonded and fixed to each other by means of an adhesive or the like.

The base 210 may include at least one protruding portion 216A to 216D, which protrudes from the lower plate 21A. In an example, the at least one protruding portion 216A to 216D may protrude from the side plate 21B of the base 210.

In an example, the side plate 21B of the base 210 may include four side plates, and each of the protruding portions 216A to 216D may be formed on a respective one of the four side plates. In an example, each of the protruding portions 216A to 216D may be disposed or located on the center of a respective one of the four side plates.

The second board unit 800 may be disposed under the base 210. In an example, the second board unit 800 may be disposed under the lower plate 21A of the base 210. The second board unit 800 may be coupled to the base 210. In an example, the second board unit 800 may be coupled to the lower plate 21A of the base 210. In an example, the second board unit 800 may be coupled to the lower surface of the lower plate 21A of the base 210.

The second board unit 800 may serve to supply a signal from the outside to the image sensor unit 350 or to output a signal from the image sensor unit 350 to the outside.

The second board unit 800 may include a first region (or a first board) 801 corresponding to the AF moving unit 100 or the image sensor 810, a second region (or a second board) 802 in which the connector 804 is disposed, and a third region (or a third board) 803 interconnecting the first region 801 and the second region 802. The connector 804 may be provided with ports in order to be conductively connected to the second region 802 of the second board unit 800 and to be conductively connected to an external device (e.g. the optical instrument 200A). The bore 210A in the base 210 may be closed or blocked by the first region 801 of the second board unit 800.

Each of the first region 801 and the second region 802 of the second board unit 800 may include a rigid substrate, and the third region 803 may include a flexible substrate. In addition, each of the first region 801 and the second region 802 may further include a flexible substrate.

In another embodiment, at least one of the first to third regions 801 to 803 of the second board unit 800 may include at least one of a rigid substrate or a flexible substrate.

The second board unit 800 may be disposed behind the first board unit 255. In an example, the first board unit 255 may be disposed between the AF moving unit 100 and the second board unit 800.

When viewed from above, the first region 801 of the second board unit 800 may have a polygonal shape (e.g. a quadrangular shape, a square shape, or a rectangular shape), but the disclosure is not limited thereto. In another embodiment, the first region of the second board unit may have a circular shape.

The second board unit 800 may include a plurality of pads 800B corresponding to the terminals 311 of the support board 220. Here, the pad 800B may alternatively be referred to as a "terminal".

Referring to FIG. 10A, the plurality of pads 800B may be formed in the first region 801 of the second board unit 800. In an example, the second board unit 800 may include first pads 800B1, which are disposed or arranged on one side of the first region 801 so as to be spaced apart from each other in the third direction (e.g. the y-axis direction), and second pads 800B2, which are disposed or arranged on the opposite side of the first region 801 so as to be spaced apart from each other in the third direction (e.g. the y-axis direction).

In an example, the plurality of pads 800B may be formed on a first surface of the second board unit 800 (e.g. the first region 801), which faces the first board unit 255.

The second board unit 800 may include at least one coupling hole 800C formed therein for coupling to a coupling protrusion 45B of the base 210. The coupling hole 800C may be a through-hole formed through the second board unit 800 in the optical-axis direction. In another embodiment, the coupling hole may take the form of a recess.

In an example, the coupling hole 800C may be formed in each of the corners of the second board unit 800, which face each other in an oblique direction. In another embodiment, the coupling hole in the second board unit 800 may be disposed adjacent to at least one of the sides or the corners of the first region 801.

The support board 310 may conductively connect the first board unit 255 to the second board unit 800. The support board 310 may alternatively be referred to as a "support member", a "connection board", or a "connection part". Alternatively, the support board 310 may be referred to as an "interposer". Alternatively, the "interposer" may include the first circuit board 250 and the support board 310, which are integrally formed with each other.

The support board 310 may include a flexible substrate, or may be embodied as a flexible substrate. In an example, the support board 310 may be embodied as a flexible printed circuit board (FPCB). At least a portion of the support board 310 may be flexible. The first circuit board 250 and the support board 310 may be connected to each other.

In an example, the first circuit board 250 and the support board 310 may be integrally formed with each other. In addition, the support board 310 may be conductively connected to the first circuit board 250. The support board 310 may be conductively connected to the second board unit 800. The support board 310 may guide movement of the OIS moving unit.

The support board 310 may guide the OIS moving unit to move in a direction perpendicular to the optical-axis direction. The support board 310 may guide the OIS moving unit to rotate about the optical axis. The support board 310 may restrict movement of the OIS moving unit in the optical-axis direction.

A portion of the support board 310 may be connected to the first circuit board 250, which is the OIS moving unit, and another portion of the support board 310 may be coupled to the base 210, which is the fixed unit.

Referring to FIGS. 15A and 15B, the support board 310 may include an elastic member 310A and a circuit member 310B. The elastic member 310A serves to elastically support the OIS moving unit, and may be embodied as an elastic body, e.g. a spring. The elastic member 310A may include metal, or may be made of an elastic material.

The circuit member 310B serves to conductively connect the first circuit board 250 to the second board unit 800, and may be embodied as a flexible substrate or may include at least one of a flexible substrate or a rigid substrate. The circuit member 310B may be, for example, an FPCB.

The elastic member 310A may be coupled to the circuit member 310B, and may serve to increase the strength of the circuit member 310B. Referring to FIG. 15B, the elastic member 310A may be disposed outside the circuit member 310B, and the outer side surface of the circuit member 310B may be coupled to the inner side surface of the elastic member 310A.

The support board 310 may be connected to the first board unit 255 (e.g. the first circuit board 250), and may include at least one connection portion 320A and 320B, which is conductively connected to the first board unit 255 (e.g. the first circuit board 250). In addition, the support board 310 may be connected to the second board unit 800, and may include at least one terminal unit 7A, 7B, 8A, and 8B, which is conductively connected to the second board unit 800. The at least one terminal unit 7A, 7B, 8A, and 8B may include a plurality of terminals 311.

The support board 310 may include a first support board 310-1 and a second support board 310-2, which are spaced apart from each other. The first and second support boards 310-1 and 310-2 may be formed to be bilaterally symmetrical with each other.

As shown in FIG. 15B, the first and second support boards 310-1 and 310-2 may be disposed on respective sides of the first circuit board 250. In an example, the first support board 310-1 may include a first body 86 and at least one terminal unit 7A and 7B extending from the first body 86. The at least one terminal unit 7A and 7B of the first support board 310-1 may include a plurality of terminals 311.

The second support board 310-2 may include a second body 87 and at least one terminal unit 8A and 8B extending from the second body 87. The at least one terminal unit 8A and 8B of the second support board 310-2 may include a plurality of terminals 311.

The first circuit board 250 may include a first side portion 33A and a second side portion 33B, which are located opposite each other, and may include a third side portion 33C and a fourth side portion 33D, which are located between the first side portion 33A and the second side portion 33B and are located opposite each other.

The first body 86 may include a first portion 6A, which corresponds to or faces the first side portion 33A of the first circuit board 250, a second portion 6B, which corresponds to a portion (or one side) of the third side portion 33C of the first circuit board 250, and a third portion 6C, which corresponds to a portion (or one side) of the fourth side portion 33D of the first circuit board 250. In addition, the first body 86 may include a first bent portion 6D, which interconnects the first portion 6A and the second portion 6B and is bent from one end of the first portion 6A, and a second bent portion 6E, which interconnects the first portion 6A and the third portion 6C and is bent from the other end of the first portion 6A.

The first support board 310-1 may include a first terminal unit 7A, which extends or protrudes from the second portion 6B of the first body 86 toward the second board unit 800, and a second terminal unit 7B, which extends or protrudes from the third portion 6C of the first body 86 toward the second board unit 800. The second terminal unit 7B may be located opposite the first terminal unit 7A.

The first support board 310-1 may include a first connection portion 320A, which interconnects the first portion 6A of the first body 86 and the first side portion 33A of the first circuit board 250. The first connection portion 320A may include a bent portion.

The second body 87 may include a first portion 9A, which corresponds to or faces the second side portion 33B of the first circuit board 250, a second portion 9B, which corresponds to another portion (or opposite side) of the third side portion 33C of the first circuit board 250, and a third portion 9C, which corresponds to another portion (or opposite side) of the fourth side portion 33D of the first circuit board 250. In addition, the second body 87 may include a first bent portion 9D, which interconnects the first portion 9A and the second portion 9B and is bent from one end of the first portion 9A, and a second bent portion 9E, which interconnects the first portion 9A and the third portion 9C and is bent from the other end of the first portion 9A.

The second support board 310-2 may include a third terminal unit 8A, which extends or protrudes from the second portion 9B of the second body 87 toward the second board unit 800, and a fourth terminal unit 8B, which extends or protrudes from the third portion 9C of the second body 87 toward the second board unit 800. The fourth terminal unit 8B may be located opposite the third terminal unit 8A.

The second support board 310-2 may include a second connection portion 320B, which interconnects the first portion 9A of the second body 87 and the second side portion 33B of the first circuit board 250. The second connection portion 320B may include a bent portion.

In addition, the first support board 310-1 may include a first flexible board 31A, which conductively connects the first board unit 255 (e.g. the first circuit board 250) to the second board unit 800, and a first elastic member 30A, which is coupled to the first flexible board 31A.

The second support board 310-2 may include a second flexible board 31B, which conductively connects the first board unit 255 (e.g. the first circuit board 250) to the second board unit 800, and a second elastic member 30B, which is coupled to the second flexible board 31B.

The terminal unit (e.g. 8B) of the support board 310 may be provided with terminals M1 to M4 in order to be conductively connected to the terminals B1 to B4 of the terminal unit 95 of the circuit board 190 of the AF moving unit 100. The terminals B1 to B4 of the terminal unit 95 of the circuit board 190 and the terminals M1 to M4 of the terminal unit 8B of the support board 310 may be conductively connected to each other by means of solder or a conductive adhesive. That is, the circuit board 190 of the AF moving unit 100 may be conductively connected to the second board unit 800 via the support board 310.

Referring to FIGS. 14B, 15, 16A, and 16B, the holder 270 may include first to fourth side portions corresponding to the first to fourth side portions 33A to 33D of the first circuit board 250. The at least one connection portion 320A and 320B of the support board 310 may be coupled to at least one of the first to fourth side portions of the holder 270 by means of an adhesive. In an example, the first connection portion 320A may be coupled to the first side portion of the holder 270 by means of an adhesive, and the second connection portion 320B may be coupled to the second side portion of the holder 270 by means of an adhesive.

The first to fourth side portions of the holder 270 may be provided with protruding portions 4A to 4D. In an example, the first connection portion 320A and the first protruding portion 4A formed on the first side portion of the holder 270 may form a first coupling region (38A in FIG. 16A), in which the first connection portion 320A and the first protruding portion 4A are coupled to each other. The second connection portion 320B and the second protruding portion 4B formed on the second side portion of the holder 270 may form a second coupling region (38B in FIG. 16A), in which the second connection portion 320B and the second protruding portion 4B are coupled to each other.

In addition, the base 210 may include first to fourth side portions corresponding to the first to fourth side portions 33A to 33D of the first circuit board 250. In an example, the side plate 21B of the base 210 may include the first to fourth side portions of the base 210. The first to fourth side portions of the base 210 may be provided with protruding portions 216A to 216D.

At least a portion of the support board 310 may be coupled to the base 210. In an example, the bodies 86 and 87 of the support board 310 may be coupled to the base 210 by means of an adhesive. In an example, a portion of each of the bodies 86 and 87 of the support board 310, which are connected to the terminal units 7A, 7B, 8A, and 8B, may be coupled to the base 210.

In an example, the first terminal unit 7A and the second portion 6B of the first support board 310-1 may be coupled to one region of the third side portion (or the third protruding portion 216C) of the base 210, and the second terminal unit 7B and the third portion 6C of the first support board 310-1 may be coupled to one region of the fourth side portion (or the fourth protruding portion 216D) of the base 210.

In an example, the third terminal unit 8A and the second portion 9B of the second support board 310-2 may be coupled to another region of the third side portion (or the third protruding portion 216C) of the base 210, and the fourth terminal unit 8B and the third portion 9C of the second support board 310-2 may be coupled to another region of the fourth side portion (or the fourth protruding portion 216D) of the base 210.

A third coupling region (39A in FIG. 16A) may be formed between the first and third terminal units 7A and 8A of the support board 310 and the third side portion (or the third protruding portion 216C) of the base 210, and a fourth coupling region (39B in FIG. 16A) may be formed between the second and fourth terminal units 7B and 8B and the fourth side portion (or the fourth protruding portion 216D) of the base 210. The OIS moving unit may be elastically supported with respect to the fixed unit by the support board 310 and the first to fourth coupling regions 38A, 38B, 39A, and 39B. The terminals 311 of the support board 310 may be coupled and conductively connected to the terminals of the second board unit 800 by means of solder or a conductive adhesive.

In another embodiment, the support member may be an elastic member including no substrate, for example, a spring, a wire, a shape memory alloy, or a ball member.

The image sensor unit 350 may include at least one of a motion sensor 820, a controller 830, a memory 512, or a capacitor 514.

The motion sensor 820, the controller 830, and the memory 512 may be disposed on any one of the first board unit 255 and the second board unit 800. The capacitor 514 may be disposed on at least one of the first board unit 255 or the second board unit 800.

In an example, the motion sensor 820 and the memory 512 may be disposed on the second board unit 800 (e.g. the first region 801). In an example, the controller 830 may be disposed or mounted on the first circuit board 250 of the first board unit 255. In another embodiment, the controller 830 may be disposed on the second board unit 800.

The motion sensor 820 may be conductively connected to the controller 830 via wirings or circuit patterns formed on the first board unit 255 and the second board unit 800. The motion sensor 820 outputs rotational angular speed information about movement of the camera device 10. The motion sensor 820 may be embodied as a two-axis or three-axis gyro sensor or an angular speed sensor. In an example, the motion sensor 820 may output information about the movement amount in the X-axis direction, the movement amount in the y-axis direction, and the rotation amount in response to movement of the camera device 10.

The memory 512 may store a first data value (or a first code value) corresponding to the output from the first sensor 240A of the second position sensor 240 according to displacement (or stroke) of the OIS moving unit in the second direction (e.g. the X-axis direction) perpendicular to the optical axis in order to implement OIS feedback operation. In addition, the memory 512 may store a second data value (or a second code value) corresponding to the output from the second sensor 240B of the second position sensor 240 according to displacement (or stroke) of the OIS moving unit in the third direction (e.g. the y-axis direction) perpendicular to the optical axis.

The memory 512 may store a third data value (or a third code value) corresponding to the output from the third sensor 240C of the second position sensor 240 according to rotation, tilting, or rolling of the OIS moving unit within a predetermined range with respect to the optical axis or about the optical axis.

In addition, the memory 512 may store a fourth data value (or a fourth code value) corresponding to the output from the first position sensor 170 according to displacement (or stroke) of the bobbin 110 in the first direction (e.g. the optical-axis direction or the Z-axis direction) in order to implement AF feedback operation. In this case, the first data value may be a value obtained through analog-to-digital conversion of the output from the first position sensor 170 corresponding to displacement of the bobbin 110 through calibration.

In an example, each of the first to fourth data values may be stored in the memory 512 in the form of a look-up table. Alternatively, each of the first to fourth data values may be stored in the memory 512 in the form of an equation or an algorithm. In addition, the memory 512 may store an equation, an algorithm, or a program for operation of the controller 830.

In an example, the memory 512 may be a non-volatile memory, for example, an electrically erasable programmable read-only memory (EEPROM).

The controller 830 may be conductively connected to the first position sensor 170 and the second position sensor 240.

The controller 830 may control a driving signal that is supplied to the second coil 230 using the output signal received from the second position sensor 240 and the first to third data values stored in the memory 512, and may perform feedback OIS operation.

In addition, the controller 830 may control a driving signal that is supplied to the first coil 120 using the output signal from the first position sensor 170 and the fourth data value stored in the memory 512, and may perform feedback autofocus operation.

The controller 830 may be embodied as a driver IC, but the disclosure is not limited thereto. In an example, the controller 830 may be conductively connected to the terminals 251 of the first circuit board 250 of the first board unit 255.

The image sensor unit 350 may further include a filter 610. In addition, the image sensor unit 350 may further include a filter holder 600, in which the filter 610 is disposed, seated, or accommodated. The filter holder 600 may alternatively be referred to as a "sensor base".

The filter 610 may serve to block or allow introduction of light within a specific wavelength range, among the light that has passed through the lens barrel 400, into the image sensor 810.

The filter 610 may be, for example, an infrared cut filter. In an example, the filter 610 may be disposed parallel to the xy-plane, which is perpendicular to the optical axis OA. The filter 610 may be disposed below the lens module 400.

The filter holder 600 may be disposed below the AF moving unit 100. In an example, the filter holder 600 may be disposed on the first board unit 255. In an example, the filter holder 600 may be disposed on the first surface 260A of the second circuit board 260 of the first board unit 255.

The filter holder 600 may be coupled to one region of the second circuit board 260 around the image sensor 810 by means of an adhesive, and may be exposed through the bore 250A in the first circuit board 250. In an example, the filter holder 600 may be visible through the bore 250A in the first circuit board 250 of the first board unit 255. In an example, the bore 250A in the first circuit board 250 may expose the filter holder 600 disposed on the second circuit board 260 and the filter 610 disposed on the filter holder 600.

In another embodiment, the filter holder may be coupled to the holder 270 or to the AF moving unit 100.

The filter holder 600 may have a bore 61A formed in a portion thereof, on which the filter 610 is mounted or disposed, in order to allow the light passing through the filter 610 to be introduced into the image sensor 810. The bore 61A in the filter holder 600 may be a through-hole formed through the filter holder 600 in the optical-axis direction. In an example, the bore 61A in the filter holder 600 may be formed through the center of the filter holder 600, and may be disposed so as to correspond to or face the image sensor 810.

The filter holder 600 may include a seating portion 500, which is depressed in the upper surface thereof to allow the filter 610 to be seated therein. The filter 610 may be disposed, seated, or mounted in the seating portion 500. The seating portion 500 may be formed so as to surround the bore 61A. In another embodiment, the seating portion of the filter holder may take the form of a protruding portion protruding from the upper surface of the filter.

The image sensor unit 350 may further include an adhesive 612 disposed between the filter 610 and the seating portion 500, and the filter 610 may be coupled or attached to the filter holder 600 by means of the adhesive 612.

The cover member 300 may take the form of a box that has an open lower portion and includes an upper plate 301 and side plates 302. The lower portions of the side plates 302 of the cover member 300 may be coupled to the base 210. The shape of the upper plate 301 of the cover member 300 may be a polygonal shape, for example, a quadrangular shape or an octagonal shape.

The cover member 300 may have a bore 303 formed in the upper plate 301 thereof to expose the lens of the lens module 400 coupled to the bobbin 110 to external light.

The cover member 300 and the base 210 may accommodate the AF moving unit 100 and the image sensor unit 350, may protect the AF moving unit 100 and the image sensor unit 350 from external impact, and may prevent introduction of external foreign substances thereinto.

The OIS moving unit is movable relative to the fixed unit in a direction perpendicular to the optical axis OA. The fixed unit and the OIS moving unit are spaced apart from each other by a predetermined distance. That is, the OIS moving unit may be suspended (flown) from the fixed unit by the support board 310. The OIS moving unit may be moved relative to the fixed unit by the electromagnetic force generated by the magnet 130 and the second coil 230.

In an example, at the initial position of the OIS moving unit, the outer surface of the holder 270 may be spaced apart from the inner surface of the base 210 by a predetermined distance. In addition, in an example, at the initial position of the OIS moving unit, the lower surfaces of the holder 270 and the first board unit 255 may be spaced apart from the base 210 by a predetermined distance.

The initial position of the OIS moving unit may be the original position of the OIS moving unit in the state in which no power is applied to the second coil 230 or a position at which the OIS moving unit is located as the result of the support board being elastically deformed due only to the weight of the OIS moving unit.

In addition, the initial position of the OIS moving unit may be a position at which the OIS moving unit is located when gravity acts in the direction from the first board unit 255 toward the second board unit 800 or when gravity acts in the opposite direction.

The first to fourth coil units 230-1 to 230-4 of the second coil 230 may be controlled by three channels in order to implement OIS operation.

In an example, the first to third coil units 230-1 to 230-3 may be conductively separated from each other, and the fourth coil unit 230-4 may be conductively connected to any one of the first to third coil units in series. In this case, three pairs of lead wires, i.e. a total of six lead wires, may be led out from the second coil 230.

In an example, the second coil unit 230-2 and the fourth coil unit 230-4 may be connected to each other in series. The magnetization direction of the second magnet unit 130-2, which corresponds to or faces the second coil unit 230-2, and the magnetization direction of the fourth magnet unit 130-4, which corresponds to or faces the fourth coil unit 230-4, may be identical to each other. In an example, the magnetization direction of the first magnet unit 130-1 and the magnetization direction of the third magnet unit 130-3 may be identical to each other. In addition, in an example, the magnetization direction of the second magnet unit 130-2 may be different from the magnetization direction of the first magnet unit 130-1. In an example, the magnetization direction of the second magnet unit 130-2 may be perpendicular to the magnetization direction of the first magnet unit 130-1.

In addition, in another embodiment, the first to fourth coil units 230-1 to 230-4 of the second coil 230 may controlled by four channels. In this case, the four coil units 230-1 to 230-4 may be controlled in the state of being conductively separated from each other. In an example, any one of a forward direction current and a reverse direction current may be selectively applied to each of the coil units 230-1 to 230-4. In this case, four pairs of lead wires, i.e. a total of eight lead wires, may be led out from the second coil 230.

The controller 830 may supply at least one driving signal to at least one of the first to fourth coil units 230-1 to 230-4, and may control the at least one driving signal to move the OIS moving unit in the X-axis direction and/or the Y-axis direction or rotate the OIS moving unit within a predetermined angular range about the optical axis.

Figure 17A:
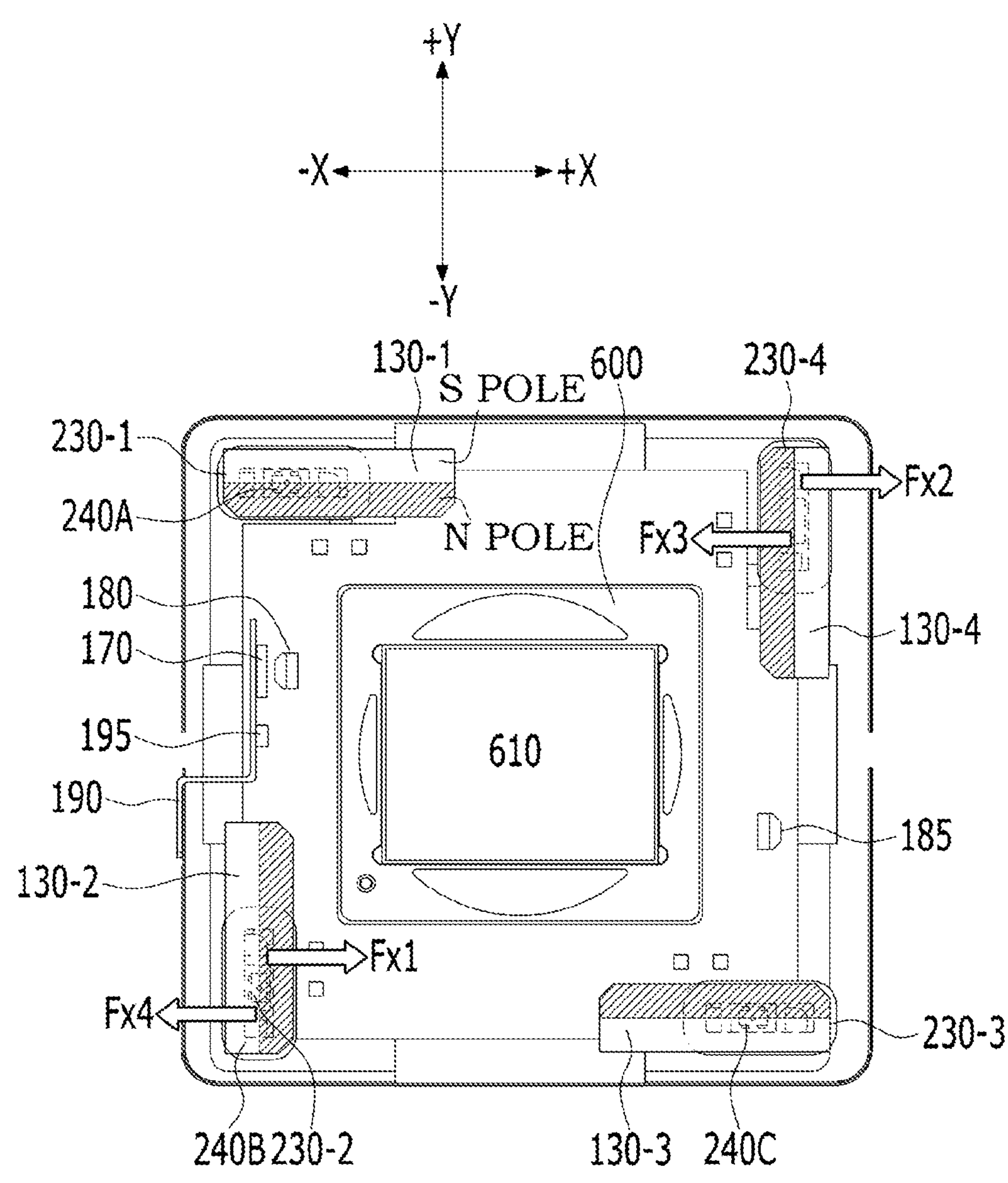
FIG. 17A is a view for explaining movement of an OIS moving unit in an X-axis direction.
Figure 17B:
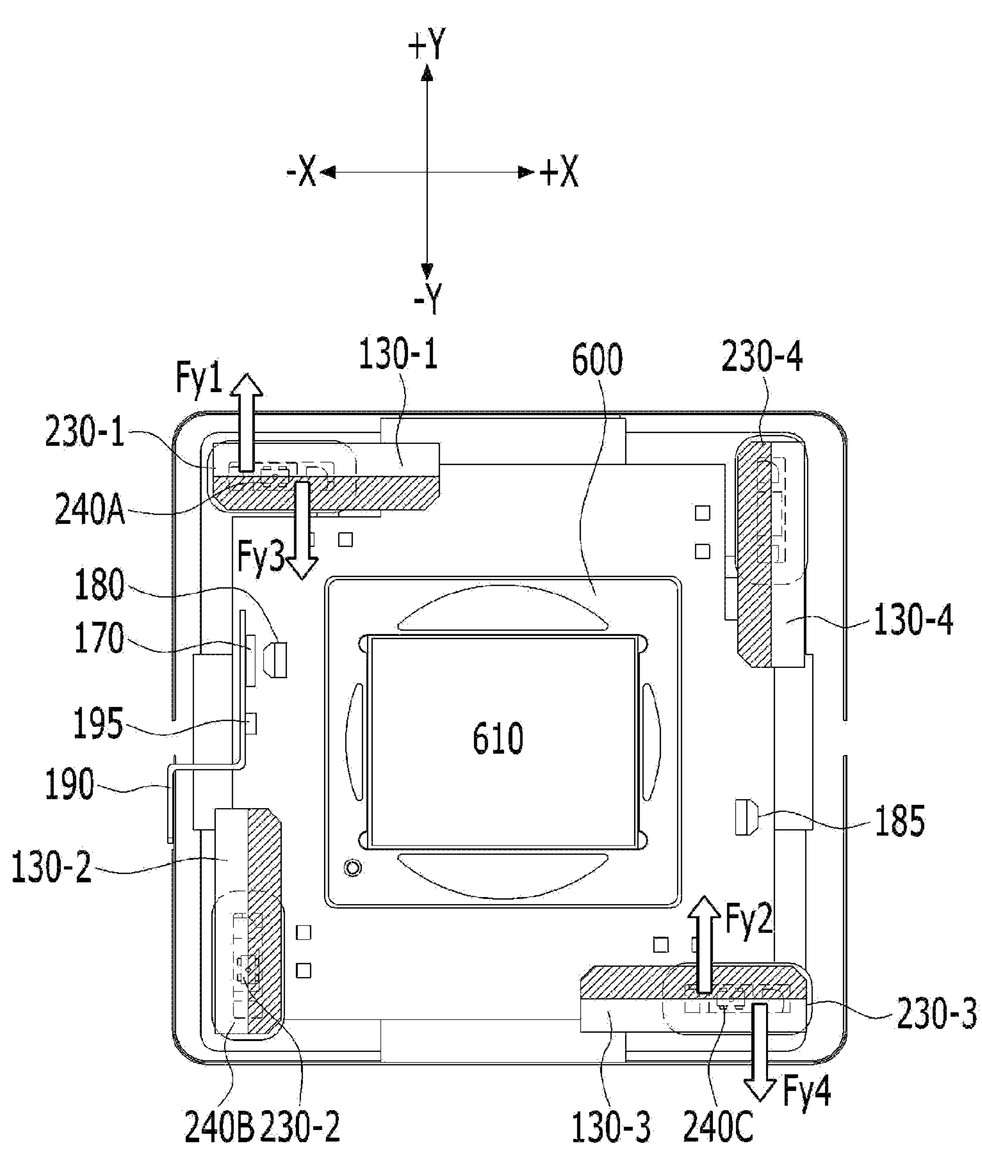
FIG. 17B is a view for explaining movement of the OIS moving unit in a y-axis direction.

FIG. 17A is a view for explaining movement of the OIS moving unit in the X-axis direction, and FIG. 17B is a view for explaining movement of the OIS moving unit in the y-axis direction.

The N pole and the S pole of each of the first and third magnet units 130-1 and 130-3, which face each other in a first oblique direction, may be disposed so as to face each other in the third direction (e.g. the y-axis direction). In addition, the N pole and the S pole of each of the second and fourth magnet units 130-2 and 130-4, which face each other in a second oblique direction, which is perpendicular to the first oblique direction, may be disposed so as to face each other in the second direction (e.g. the X-axis direction). Referring to FIG. 17A, based on the interface between the N pole and the S pole of each of the first to fourth magnet units 130-1 to 130-4, the N pole may be located at a farther inward position, and the S pole may be located at a farther outward position. In another embodiment, based on the interface between the N pole and the S pole, the S pole may be located at a farther inward position, and the N pole may be located at a farther outward position.

Referring to FIG. 17A, the OIS moving unit may be moved or shifted in the X-axis direction by first electromagnetic force Fx1 or Fx3, which is generated by interaction between the second coil unit 230-2 and the second magnet unit 130-2, and second electromagnetic force Fx2 or Fx4, which is generated by interaction between the fourth coil unit 230-4 and the fourth magnet unit 130-4. In an example, the direction of the first electromagnetic force Fx1 or Fx3 and the direction of the second electromagnetic force Fx2 or Fx4 may be identical to each other.

In a three-channel drive mode, one driving signal may be supplied to the second coil unit 230-2 and the fourth coil unit 230-4, which are connected to each other in series. In addition, in a four-channel drive mode, an independent driving signal may be supplied to each of the second coil unit 230-2 and the fourth coil unit 230-4, which are separated from each other.

Referring to FIG. 17B, the OIS moving unit may be moved or shifted in the y-axis direction by third electromagnetic force Fy1 or Fy3, which is generated by interaction between the first coil unit 230-1 and the first magnet unit 130-1, and fourth electromagnetic force Fy2 or Fy4, which is generated by interaction between the third coil unit 230-3 and the third magnet unit 130-3. In an example, the direction of the third electromagnetic force Fy1 or Fy3 and the direction of the fourth electromagnetic force Fy2 or Fy4 may be identical to each other. In each of the three-channel drive mode and the four-channel drive mode, an independent driving signal may be supplied to each of the first coil unit 130-1 and the third coil unit 130-3.

Figure 17C:
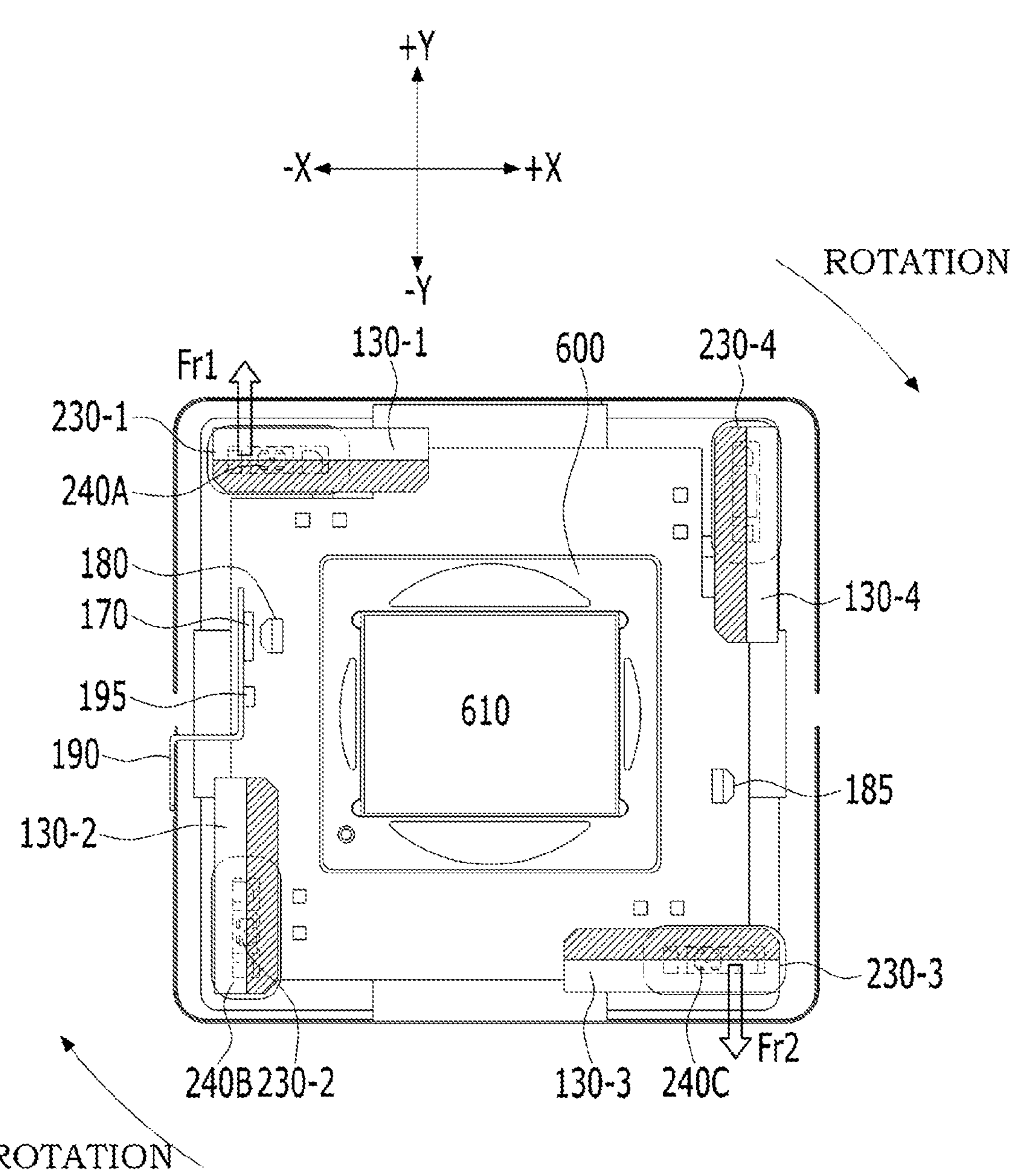
FIG. 17C is a view for explaining rotation of the OIS moving unit in the clockwise direction in a three-channel drive mode.
Figure 17D:
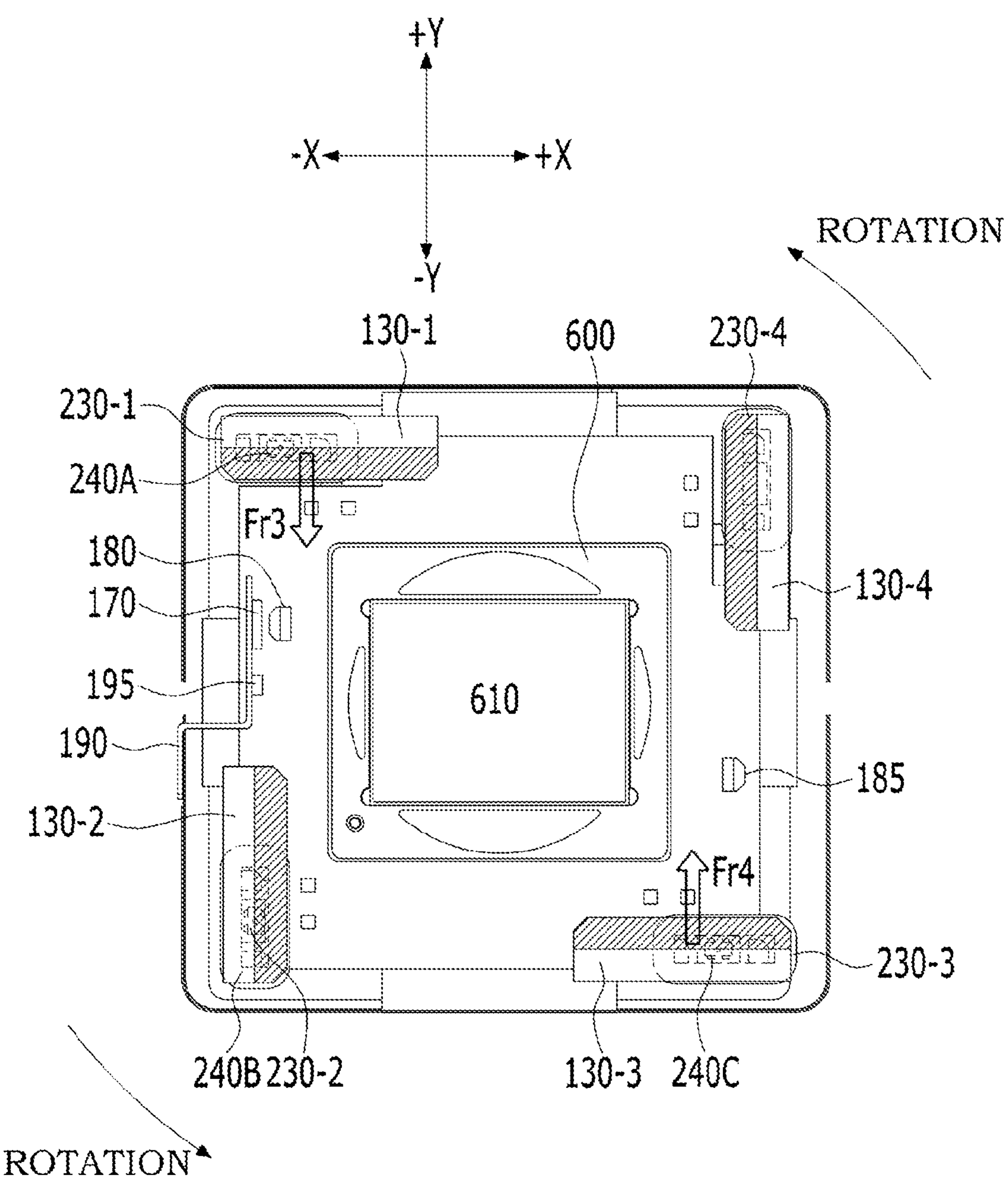
FIG. 17D is a view for explaining rotation of the OIS moving unit in the counterclockwise direction in the three-channel drive mode.

FIG. 17C is a view for explaining rotation of the OIS moving unit in the clockwise direction in the three-channel drive mode, and FIG. 17D is a view for explaining rotation of the OIS moving unit in the counterclockwise direction in the three-channel drive mode.

Referring to FIGS. 17C and 17D, the OIS moving unit may be rotated, tilted, or rolled with respect to the optical axis or about the optical axis by fifth electromagnetic force Fr1 or Fr3, which is generated by interaction between the first coil unit 230-1 and the first magnet unit 130-1, and sixth electromagnetic force Fr2 or Fr4, which is generated by interaction between the third coil unit 230-3 and the third magnet unit 130-3. In an example, the direction of the fifth electromagnetic force Fr1 and the direction of the sixth electromagnetic force Fr2 may be opposite each other.

In an example, when the direction of the fifth electromagnetic force Fr1 is the (+) Y-axis direction and the direction of the sixth electromagnetic force Fr2 is the (–) Y-axis direction, the OIS moving unit may be rotated, tilted, or rolled in the clockwise direction with respect to the optical axis or about the optical axis.

On the other hand, when the direction of the fifth electromagnetic force Fr1 is the (–) Y-axis direction and the direction of the sixth electromagnetic force Fr2 is the (+) Y-axis direction, the OIS moving unit may be rotated, tilted, or rolled in the counterclockwise direction with respect to the optical axis or about the optical axis.

Figure 17E:
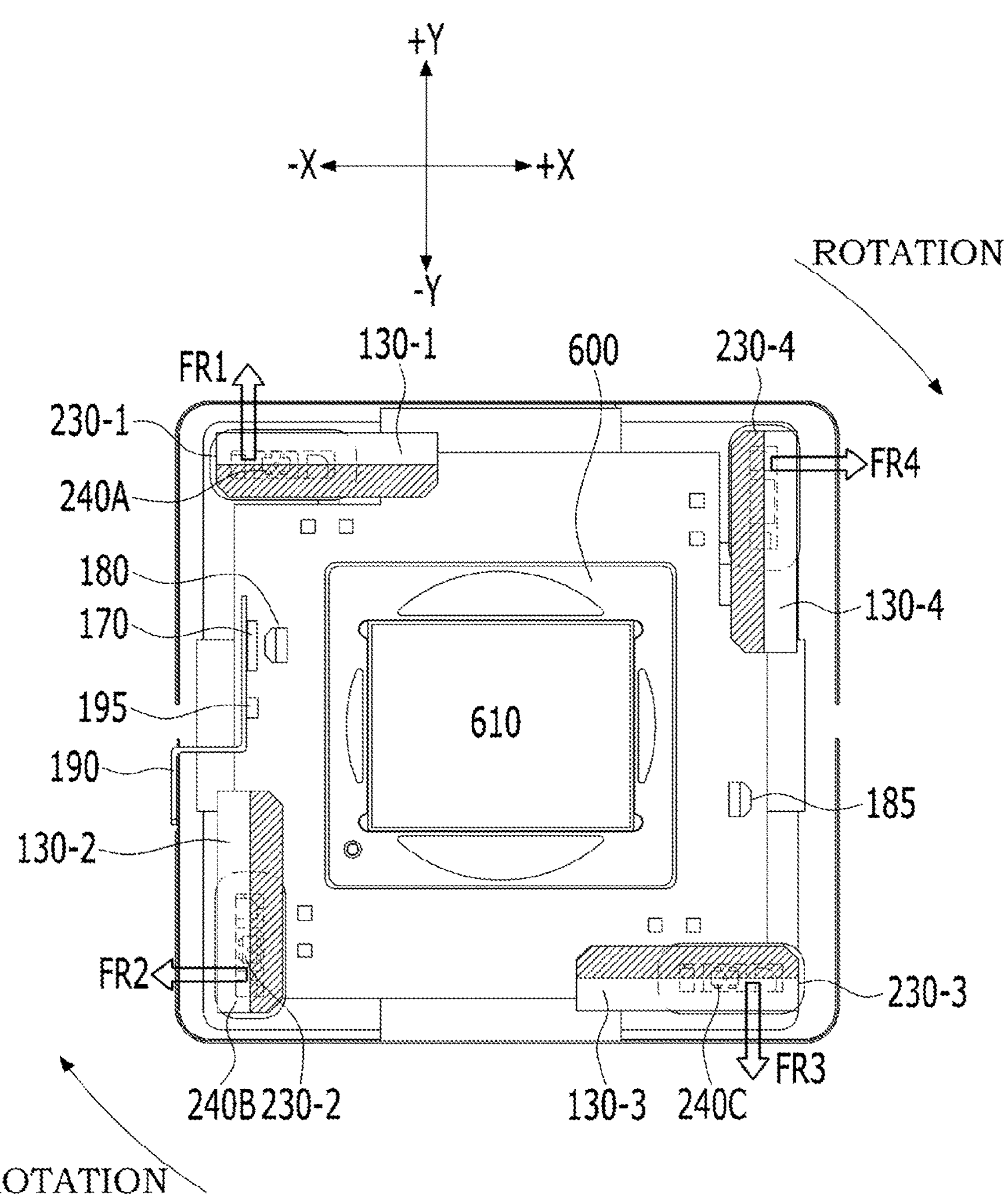
FIG. 17E is a view for explaining rotation of the OIS moving unit in the clockwise direction in a four-channel drive mode.
Figure 17F:
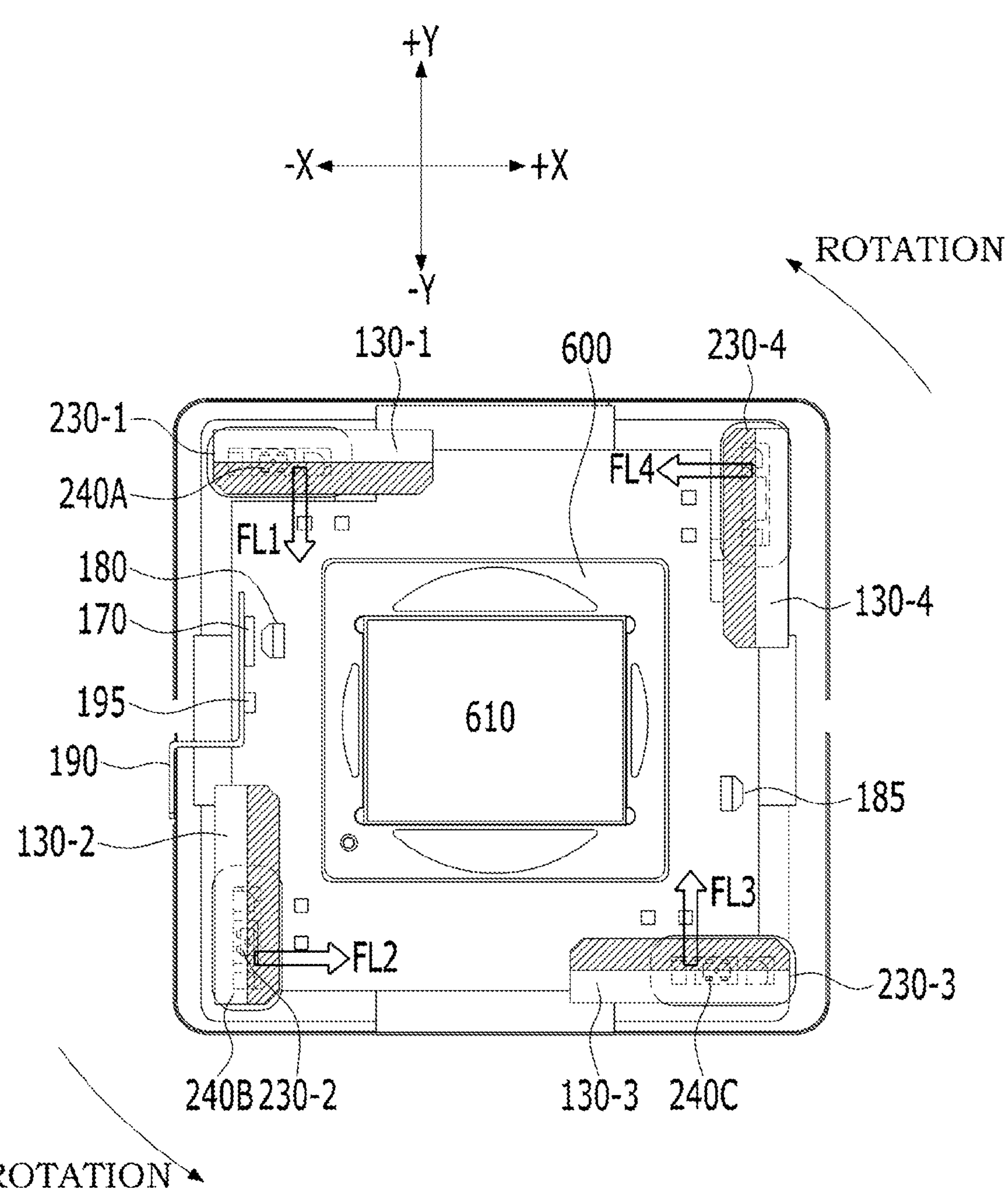
FIG. 17F is a view for explaining rotation of the OIS moving unit in the counterclockwise direction in the four-channel drive mode.

FIG. 17E is a view for explaining rotation of the OIS moving unit in the clockwise direction in the four-channel drive mode, and FIG. 17F is a view for explaining rotation of the OIS moving unit in the counterclockwise direction in the four-channel drive mode.

Referring to FIGS. 17E and 17F, the OIS moving unit may be rotated, tilted, or rolled with respect to the optical axis or about the optical axis by first electromagnetic force FR1 or FL1, which is generated by interaction between the first coil unit 230-1 and the first magnet unit 130-1, second electromagnetic force FR2 or FL2, which is generated by interaction between the second coil unit 230-2 and the second magnet unit 130-2, third electromagnetic force FR3 or FL3, which is generated by interaction between the third coil unit 230-3 and the third magnet unit 130-3, and fourth electromagnetic force FR4 or FL4, which is generated by interaction between the fourth coil unit 230-4 and the fourth magnet unit 130-4. In an example, the direction of the first electromagnetic force FR1 or FL1 and the direction of the third electromagnetic force FR3 or FL3 may be opposite each other. In addition, in an example, the direction of the second electromagnetic force FR2 or FL2 and the direction of the fourth electromagnetic force FR4 or FL4 may be opposite each other. In addition, in an example, the direction of the first electromagnetic force FR1 or FL1 and the direction of the second electromagnetic force FR2 or FL2 may be perpendicular to each other.

In an example, referring to FIG. 17E, when the direction of the first electromagnetic force FR1 is the (+) Y-axis direction, the direction of the third electromagnetic force FR3 is the (−) Y-axis direction, the direction of the second electromagnetic force FR2 is the (−) X-axis direction, and the direction of the fourth electromagnetic force FR4 is the (+) X-axis direction, the OIS moving unit may be rotated, tilted, or rolled in the clockwise direction with respect to the optical axis or about the optical axis.

In an example, referring to FIG. 17F, when the direction of the first electromagnetic force FL1 is the (−) Y-axis direction, the direction of the third electromagnetic force FL3 is the (+) Y-axis direction, the direction of the second electromagnetic force FL2 is the (+) X-axis direction, and the direction of the fourth electromagnetic force FL4 is the (−) X-axis direction, the OIS moving unit may be rotated, tilted, or rolled in the counterclockwise direction with respect to the optical axis or about the optical axis.

Compared to the three-channel drive mode shown in FIGS. 17C and 17D, according to the four-channel drive mode shown in FIGS. 17E and 17F, the electromagnetic force for rotation of the OIS moving unit may be increased, whereby the amount of driving current required to drive the first to fourth coil units 230-1 to 230-4 may be reduced, and accordingly, the amount of power that is consumed may be reduced.

Figure 18A:
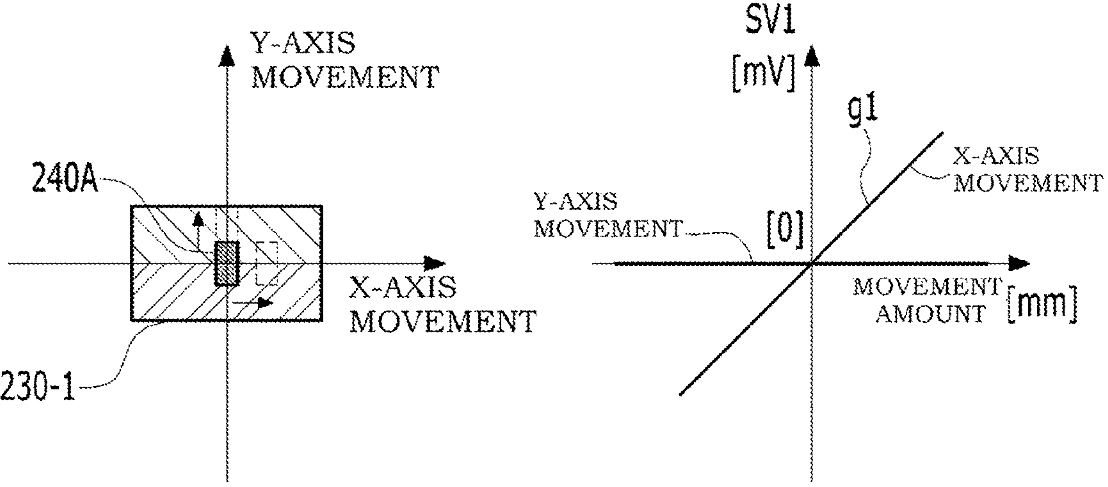
FIG. 18A shows change in the output of a first sensor according to movement of the OIS moving unit in a second direction and a third direction.

FIG. 18A shows change in the output of the first sensor 240A according to movement of the OIS moving unit in the second direction and the third direction.

Each of the first to fourth magnets 130-1 to 130-4 may be fixed in the fixed unit, and the first sensor 240A may be moved together with the OIS moving unit by movement of the OIS moving unit.

Referring to FIG. 18A, the first sensor 240A may detect displacement (or position) or the movement amount of the OIS moving unit in the Y-axis direction. When the first sensor 240A moves in the second direction (the X-axis direction), a first sensing voltage SV1 as an output of the first sensor 240A changes little. On the other hand, when the first sensor 240A moves in the third direction (the Y-axis direction), the first sensing voltage SV1 of the first sensor 240A may increase or decrease. For example, a linear relationship (e.g. graph g1) may be formed between the displacement (movement amount or stroke) of the OIS moving unit in the third direction (the Y-axis direction) and the first sensing voltage SV1 of the first sensor 240A. The slope of the graph g1 of the output of the first sensor 240A with respect to the movement amount of the OIS moving unit in the third direction may include a linear section. Therefore, the displacement (or position) or the movement amount of the OIS moving unit in the Y-axis direction may be detected using the first sensing voltage SV1 of the first sensor 240A.

Figure 18B:
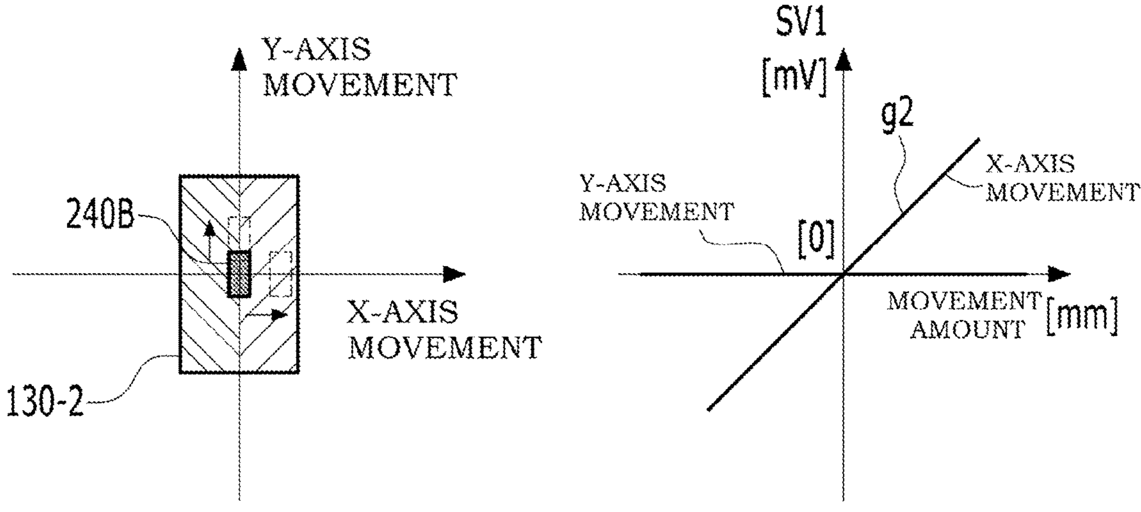
FIG. 18B shows change in the output of a second sensor according to movement of the OIS moving unit in the second direction and the third direction.

FIG. 18B shows change in the output of the second sensor 240B according to movement of the OIS moving unit in the second direction and the third direction.

Referring to FIG. 18B, the second sensor 240B may detect displacement (or position) or the movement amount of the OIS moving unit in the X-axis direction. When the second sensor 240B moves in the third direction (the Y-axis direction), a second sensing voltage SV2 as an output of the second sensor 240B changes little. On the other hand, when the second sensor 240B moves in the second direction (the X-axis direction), the second sensing voltage SV2 of the second sensor 240B may increase or decrease. For example, a linear relationship (graph g2) may be formed between the displacement (movement amount or stroke) of the OIS moving unit in the second direction (the X-axis direction) and the second sensing voltage SV2 of the second sensor 240B. The slope of the graph g2 of the output of the second sensor 240B with respect to the movement amount of the OIS moving unit in the x-axis direction may include a linear section. Therefore, the displacement (or position) or the movement amount of the OIS moving unit in the X-axis direction may be detected using the second sensing voltage SV2 of the second sensor 240B.

For example, the movement amount of the OIS moving unit in each of the third direction and the second direction may be 200 micrometers to 600 micrometers. Alternatively, for example, the movement amount of the OIS moving unit in each of the third direction and the second direction may be 350 micrometers to 450 micrometers.

Figure 18C:
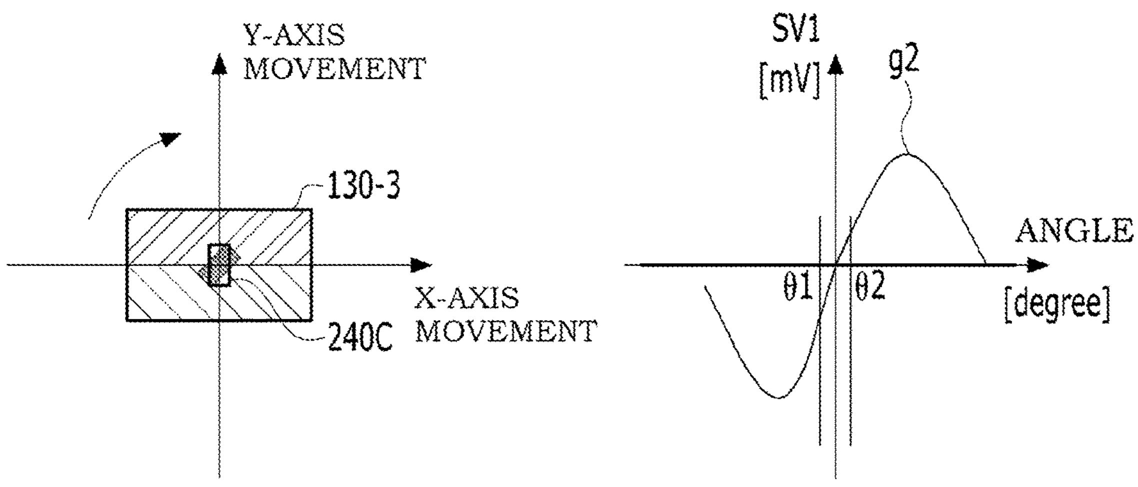
FIG. 18C shows change in the output of a third sensor according to rotation of the OIS moving unit.

FIG. 18C shows change in the output of the third sensor 240C according to rotation of the OIS moving unit.

Referring to FIG. 18C, the third sensor 240C may detect the rotation amount of the OIS moving unit. The third sensor 240C may detect the magnetic field of the third magnet unit 130-3. As the OIS moving unit rotates, the magnetic field of the third magnet unit 130-3 detected by the third sensor 240C may be changed, and accordingly, a third sensing voltage SV3 as an output of the third sensor 240C may be changed.

For example, the rotation direction of the OIS moving unit may be detected based on the polarity of the third sensing voltage SV3 of the third sensor 240C, and the rotation amount or rotational angle of the OIS moving unit may be detected based on the magnitude of the third sensing voltage SV3.

A correlation between the third sensing voltage SV3 of the third sensor 240C and the rotation direction and rotational angle of the OIS moving unit may be shown using a graph g3 in FIG. 18C. "g3" may include a linear section and a non-linear section.

In an example, at the initial position of the OIS moving unit, the third sensor 240C may not rotate. In this case, the output of the third sensor 240C may be zero, and the rotational angle of the OIS moving unit may be 0 degrees. In an example, when the third sensor 240C rotates in the clockwise direction, the output of the third sensor 240C may have a positive value (or a negative value), and the rotational angle (or the absolute value of the rotational angle) of the OIS moving unit may increase in proportion to the rotation amount thereof. On the other hand, when the third sensor 240C rotates in the counterclockwise direction, the output of the third sensor 240C may have a negative value (or a positive value), and the rotational angle (or the absolute value of the rotational angle) of the OIS moving unit may increase in proportion to the rotation amount thereof.

The maximum rotatable range of the OIS moving unit may be about 0.5 degrees to about 15 degrees. The maximum rotatable range of the OIS moving unit may be about 0.5 degrees to about 5 degrees. For example, the maximum rotatable range of the OIS moving unit may be set within the linear section of "g3".

For example, the rotation amount of the OIS moving unit detected by the third sensor 240C may be 0.5 degrees to 15 degrees. Alternatively, for example, the rotation amount of the OIS moving unit detected by the third sensor 240C may be 0.5 degrees to 5 degrees.

In an example, in the graph g3, the initial position of the OIS moving unit may be the origin, the maximum rotation amount of the OIS moving unit in the clockwise direction may be θ1, and the maximum rotation amount of the OIS moving unit in the counterclockwise direction may be θ2. For example, a sum of the absolute value of θ1 and the absolute value of θ2 may be 0.5 degrees to 15 degrees.

The third data value (or the third code value) about the output (the third sensing voltage) of the third sensor 240C corresponding to the rotation amount (or the rotational angle) of the OIS moving unit may be stored in the memory through calibration. Accordingly, the rotation amount (the tilting angle, the rotational angle, or the rolling angle) of the OIS moving unit may be detected using the third sensing voltage SV3 of the third sensor 240C.

The third sensor 240C in FIG. 18C overlaps the third magnet unit 130-3 in the first direction (e.g. the optical-axis direction). However, in another embodiment, the third sensor may overlap the sensing magnet 180 or the balancing magnet 185 in the first direction (e.g. the optical-axis direction). The third sensor according to the other embodiment may detect the magnetic field of the sensing magnet 180 or the balancing magnet 184, and may output a third sensing voltage corresponding to the result of the detection. Since the position of the sensing magnet 180 or the balancing magnet 185 does not change in a direction perpendicular to the optical axis, a linear section may be included in a graph of a correlation between the third sensing voltage of the third sensor, which changes with rotation of the OIS moving unit, and the rotation amount of the OIS moving unit. The rotation of the OIS moving unit may be detected using the third sensing voltage detected in this way.

The controller 830 (or the controller 780 of the optical instrument 200A) may receive, from the motion sensor 820, position information about the X-axis movement amount, the Y-axis movement amount, and the rotation amount of the camera device 200 caused by shaking of a user's hand. In addition, the controller 830 (or the controller 780 of the optical instrument 200A) may generate an X-axis target movement amount, a Y-axis target movement amount, and a target rotation amount for compensation of the position information in order to implement hand-tremor compensation. In addition, the controller 830 may control the Y-axis movement of the OIS moving unit using the first sensing voltage SV1 of the first sensor 240A and the Y-axis target movement amount, may control the X-axis movement of the OIS moving unit using the second sensing voltage SV2 of the second sensor 240B and the X-axis target movement amount, and may control the rotation of the OIS moving unit about the optical axis using the third sensing voltage SV3 of the third sensor 240C and the target rotation amount.

In FIGS. 18A to 18C, the first to third sensors are disposed in the OIS moving unit, and the magnet units 130-1 to 130-4 are disposed in the fixed unit. However, in another embodiment, the first to third sensors 240A to 240C may be located in the fixed unit, and separate magnet units other than the magnet units 130-1 to 130-4 may be disposed in the OIS moving unit (e.g. the holder 270) so as to correspond to or face the first to third sensors 240A to 240C.

Figure 19:
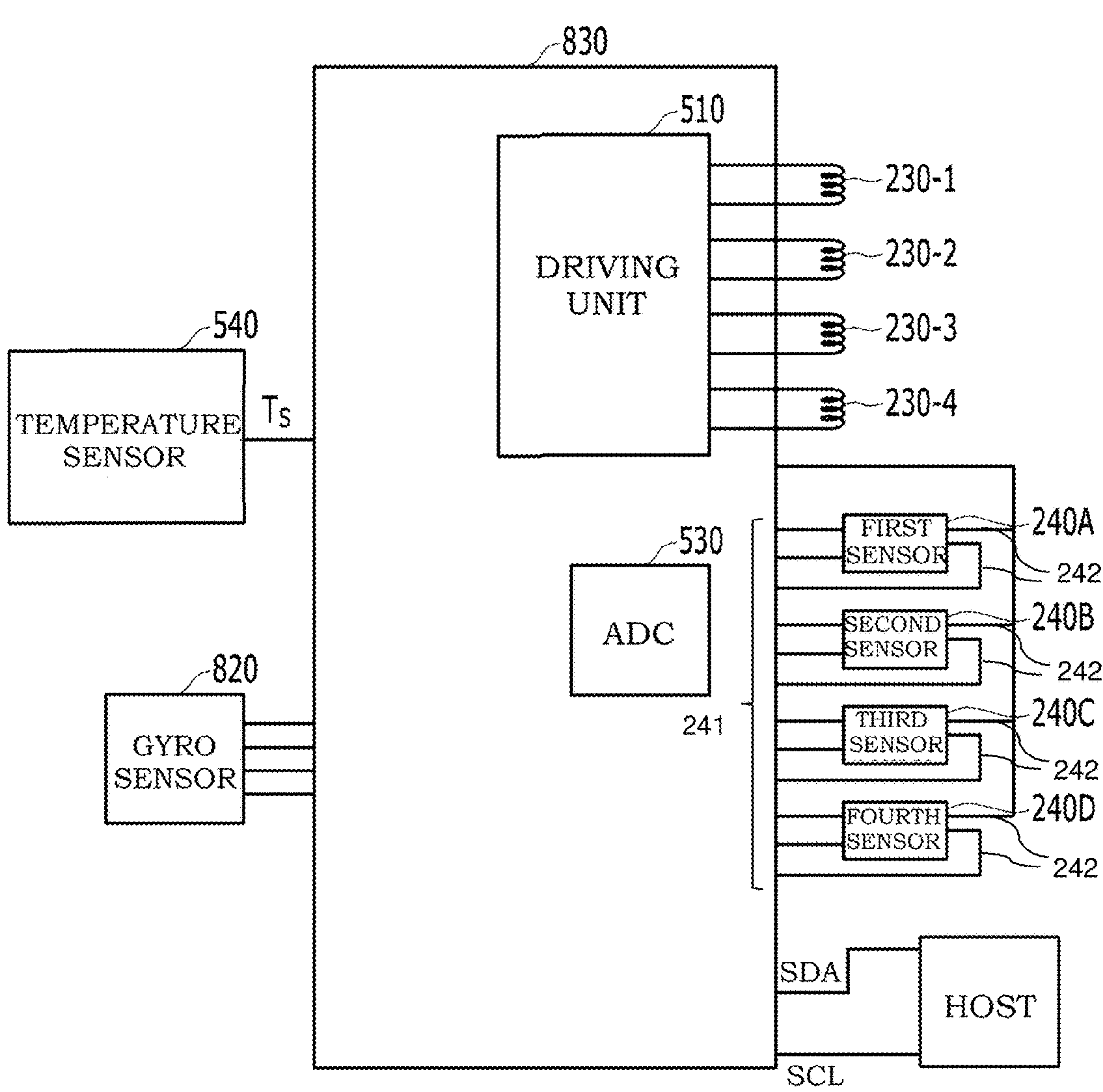
FIG. 19 is a block diagram of a controller and the first to third sensors.

FIG. 19 is a block diagram of the controller 830 and the first to third sensors 240A, 240B, and 240C. The controller 830 may perform communication, for example I2C communication, of transmitting and receiving data to and from a host using a clock signal SCL and a data signal SDA. In an example, the host may be the controller 780 of the optical instrument 200A.

The controller 830 may be conductively connected to the second coil 230. The controller 830 may include a driving unit 510 configured to supply a driving signal required to drive the first to fourth coil units 230-1 to 230-4. In an example, the driving unit 510 may include an H bridge circuit or an H bridge driver capable of changing the polarity of the driving signal. In this case, the driving signal may be a PWM signal in order to reduce consumption of current, and the driving frequency of the PWM signal may be 20 kHz or more, which is outside of the audible frequency band. In another embodiment, the driving signal may be a DC signal.

Each of the first to third sensors 240A to 240C may include two input terminals 241 and two output terminals 242. The controller 830 may supply power or a driving signal to the two input terminals 241 of each of the first to third sensors 240A to 240C. In an example, any one of the two input terminals 241 (a (+) input terminal and a (−) input terminal) of each of the first to third sensors 240A to 240C (e.g., a ground terminal or the (−) input terminal) may be commonly connected.

The controller 830 may detect displacement or position of the OIS moving unit in the third direction (e.g. the Y-axis direction) using the first sensing voltage SV1 of the first sensor 240A, and may detect displacement or position of the OIS moving unit in the second direction (e.g. the X-axis direction) using the second sensing voltage SV2 of the second sensor 240B.

In addition, the controller 830 may detect the rotation amount, rotational angle, rolling angle, or tilting angle of the OIS moving unit using the third sensing voltage SV3 of the third sensor 240C.

The controller 830 may include an analog-to-digital converter 530, which receives the sensing voltages SV1, SV2, and SV3 output from the two output terminals of each of the first to third sensors 240A to 240C and outputs a data value, a digital value, or a code value corresponding to the result of analog-to-digital conversion of the received sensing voltages SV1, SV2, and SV3.

The controller 830 may detect displacement (or position) of the OIS moving unit in the X-axis direction, displacement (or position) of the OIS moving unit in the Y-axis direction, and a rotational angle (a tilting angle or a rolling angle) of the OIS moving unit using data values output from the analog-to-digital converter 530.

In an example, the controller 830 may detect displacement or position of the OIS moving unit in the third direction based on a data value about the first sensing voltage SV1 of the first sensor 240A, may detect displacement or position of the OIS moving unit in the second direction based on a data value about the second sensing voltage SV2 of the second sensor 240B, and may detect a rotational angle (a tilting angle or a rolling angle) of the OIS moving unit based on a data value about the third sensing voltage SV3 of the third sensor 240C.

A temperature sensor 540 may measure the ambient temperature (e.g. temperatures of the first to third sensors 240A, 240B, and 240C), and may output a temperature detection signal Ts corresponding to the result of the measurement. The temperature sensor 540 may be, for example, a thermistor.

The resistance value of a resistor included in the temperature sensor 540 may vary depending on changes in the ambient temperature, and accordingly, the value of the temperature detection signal Ts may vary depending on changes in the ambient temperature. An equation or a look-up table relating to the relationship between the ambient temperature and the temperature detection signal Ts may be stored in the memory or the controller 830 or 780 through calibration.

Because the output values from the first to third sensors 240A, 240B, and 240C are also influenced by temperature, it is necessary to compensate for the output values from the first to third sensors 240A, 240B, and 240C according to the ambient temperature in order to accurately and reliably implement OIS feedback operation.

To this end, in an example, the controller 830 or 780 may compensate for the output value (or the data value corresponding to output) from each of the first to third sensors 240A, 240B, and 240C using the ambient temperature measured by the temperature sensor 540 and a temperature compensation algorithm or compensation equation. The temperature compensation algorithm or compensation equation may be stored in the controller 830 or 780 or the memory.

The camera device may further include a fourth sensor 240D, which corresponds to or faces the fourth magnet unit 130-4 in the optical-axis direction. The fourth sensor 240D may be disposed on the first board unit 255 (e.g. the first circuit board 250). In an example, the fourth sensor 240D may be disposed adjacent to any one corner of the first circuit board 250, on which the first to third sensors are not disposed. In an example, the fourth sensor 240D may be located so as to face the second sensor 240B in an oblique direction. In an example, the sensing voltage of the fourth sensor 240D may be used to detect X-axis movement and Y-axis movement of the OIS moving unit.

In another embodiment, the fourth sensor 240D may correspond to the first position sensor 170 of the AF moving unit 100.

In hand-tremor compensation, feedback OIS operation using a Hall sensor may be implemented in order to increase the accuracy of the position of the OIS moving unit. In general, a Hall sensor outputs an output value (or an output voltage) corresponding to a result of detecting the magnetic field of a magnet. The output value (or the output voltage) from the Hall sensor increases or decreases as the OIS moving unit moves. Use of the output value from the Hall sensor is effective for control of driving in the X-axis direction and the Y-axis direction, but makes an algorithm for control of rolling or rotation complicated.

The embodiment proposes a method of independently performing feedback control in each of the X-axis direction, the Y-axis direction, and the rolling direction (or the rotation direction) as the compensation directions.

That is, movement of the OIS moving unit in a direction perpendicular to the optical axis may be detected using the first and second sensors 240A and 240B, which are Hall sensors. Movement (or rotation) of the OIS moving unit in the rolling direction (or the rotation direction) may be detected using the third sensor 240C, which is a magnetic angle sensor.

In the embodiment, compensation for movement or shift in the X-axis and Y-axis directions is performed using the first and second sensing voltages SV1 and SV2 of the first and second sensors 240A and 240B, which are Hall sensors, based on the X-axis movement amount and the Y-axis movement amount of the camera device 10 received from the gyro sensor 820.

In addition, in the embodiment, rolling compensation for movement (or rotation) in the rolling direction (or the rotation direction) is performed using the third sensing voltage SV3 of the third sensor 240C, which is a TMR sensor, based on the rotation amount of the camera device 10 received from the gyro sensor 820. Accordingly, a control algorithm for hand-tremor compensation may be simplified, and thus, a control speed may be increased. The controller or the memory may be reduced in capacity and thus may be miniaturized, and as a result, the camera device may be reduced in size.

In addition, the camera device according to the embodiment may be included in an optical instrument for the purpose of forming an image of an object present in a space using reflection, refraction, absorption, interference, and diffraction, which are characteristics of light, for the purpose of increasing visibility, for the purpose of recording and reproduction of an image using a lens, or for the purpose of optical measurement or image propagation or transmission. For example, the optical instrument according to the embodiment may be a cellular phone, a mobile phone, a smartphone, a portable smart device, a digital camera, a laptop computer, a digital broadcasting terminal, a personal digital assistant (PDA), a portable multimedia player (PMP), a navigation device, etc., without being limited thereto, and may also be any of devices for capturing images or pictures.

Figure 20:
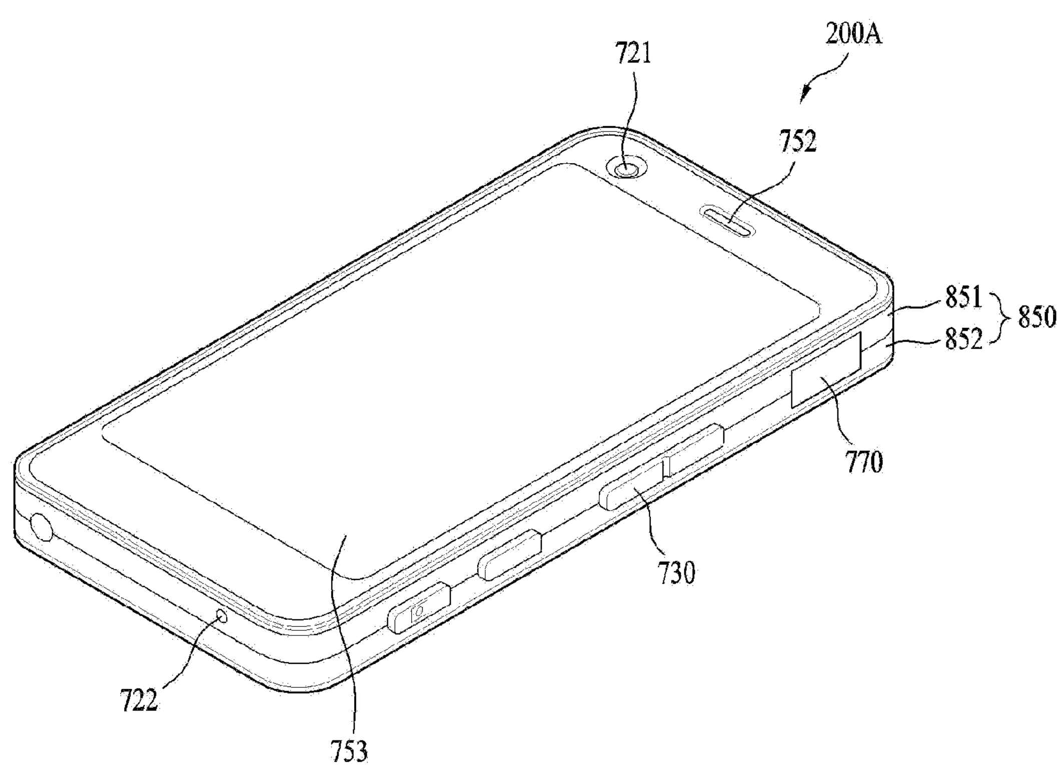
FIG. 20 is a perspective view of an optical instrument according to an embodiment.
Figure 21:
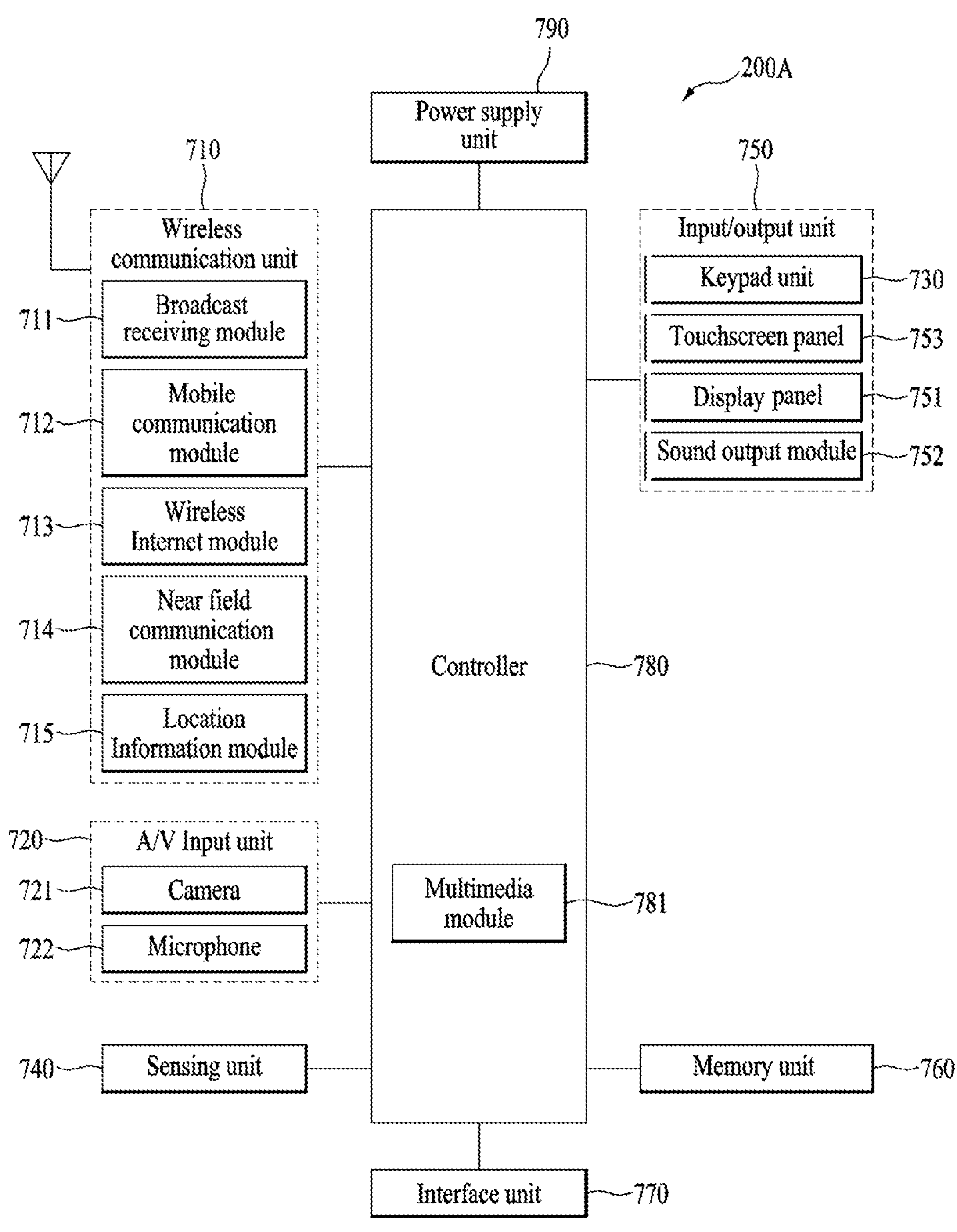
FIG. 21 is a configuration diagram of the optical instrument shown in FIG. 20.

FIG. 20 is a perspective view of a portable terminal 200A according to an embodiment, and FIG. 21 is a configuration diagram of the portable terminal shown in FIG. 20.

Referring to FIGS. 20 and 21, the portable terminal 200A (hereinafter referred to as a "terminal") may include a body 850, a wireless communication unit 710, an A/V input unit 720, a sensor unit 740, an input/output unit 750, a memory 760, an interface unit 770, a controller 780, and a power supply unit 790.

The body 850 shown in FIG. 20 may have a bar shape, without being limited thereto, and may be any of various types such as, for example, a slide type, a folder type, a swing type, or a swivel type, in which two or more sub-bodies are coupled so as to be movable relative to each other.

The body 850 may include a case (a casing, a housing, a cover, or the like) defining the external appearance thereof. In an example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the terminal 200A and a wireless communication system or between the terminal 200A and a network in which the terminal 200A is located. In an example, the wireless communication unit 710 may include a broadcast receiving module 711, a mobile communication module 712, a wireless Internet module 713, a nearfield communication module 714, and a location information module 715.

The audio/video (A/V) input unit 720 serves to input audio signals or video signals, and may include a camera 721 and a microphone 722.

The camera 721 may include the camera device according to the embodiment.

The sensor unit 740 may sense the current state of the terminal 200A, such as the open or closed state of the terminal 200A, the position of the terminal 200A, the presence or absence of a user's touch, the orientation of the terminal 200A, or the acceleration/deceleration of the terminal 200A, and may generate a sensing signal to control the operation of the terminal 200A. For example, when the terminal 200A is a slide-type phone, whether the slide-type phone is open or closed may be detected. In addition, the sensor serves to sense whether power is supplied from the power supply unit 790 or whether the interface unit 770 is coupled to an external device.

The input/output unit 750 serves to generate visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. In an example, the display module 751 may include at least one of a liquid crystal display, a thin-film transistor liquid crystal display, an organic light-emitting diode, a flexible display, or a 3D display.

The sound output module 752 may output audio data received from the wireless communication unit 710 in a call-signal reception mode, a call mode, a recording mode, a voice recognition mode, or a broadcast reception mode, or may output audio data stored in the memory 760.

The touchscreen panel 753 may convert variation in capacitance, caused by a user's touch on a specific region of a touchscreen, into electrical input signals.

The memory 760 may store programs for the processing and control of the controller 780, and may temporarily store input/output data (e.g. a phone book, messages, audio, still images, pictures, and moving images). For example, the memory 760 may store images captured by the camera 721, for example, pictures or moving images.

The interface unit 770 serves as a passage for connection between the terminal 200A and an external device. The interface unit 770 may receive data or power from the external device, and may transmit the same to respective components inside the terminal 200A, or may transmit data inside the terminal 200A to the external device. For example, the interface unit 770 may include a wired/wireless headset port, an external charger port, a wired/wireless data port, a memory card port, a port for connection of a device having an identification module, an audio input/output (I/O) port, a video input/output (I/O) port, and an earphone port.

The controller 780 may control the overall operation of the terminal 200A. For example, the controller 780 may perform control and processing related to voice calls, data communication, and video calls.

The controller 780 may include a multimedia module 781 for multimedia playback. The multimedia module 781 may be provided inside the controller 180, or may be provided separately from the controller 780.

The controller 780 may perform pattern recognition processing, by which writing or drawing input to the touchscreen is perceived as characters or images.

The power supply unit 790 may supply power required to operate the respective components upon receiving external power or internal power under the control of the controller 780.

The features, structures, effects, and the like described above in the embodiments are included in at least one embodiment of the present disclosure, but are not necessarily limited to only one embodiment. Furthermore, the features, structures, effects, and the like exemplified in the respective embodiments may be combined with other embodiments or modified by those skilled in the art. Therefore, content related to such combinations and modifications should be construed as falling within the scope of the present disclosure.

INDUSTRIAL APPLICABILITY

Embodiments may be used for a camera device capable of simplifying a control algorithm for hand-tremor compensation, miniaturizing a controller or a memory, and reducing the size thereof and an optical instrument including the same.

The invention claimed is:

1. A camera module comprising:

a fixed unit;

a first position sensor to detect a magnetic field of a sensing magnet in connection with performing a lens autofocus (AF) function;

a moving unit configured to perform a sensor-shift optical image stabilization (OIS) function, wherein the moving unit is moved in a first axis direction perpendicular to an optical axis and a second axis direction perpendicular to both the optical axis and the first axis direction and to be rotated about the optical axis along a plane including the first axis direction and the second axis direction in connection with the sensor-shift OIS function, and wherein the moving unit comprises a first board unit disposed so as to be spaced apart from the fixed unit and an image sensor disposed on the first board unit;

a driving unit comprising a magnet disposed in the fixed unit, and a coil disposed in the moving unit to move the moving unit; and first, second, and third magnetic sensors to detect a magnetic field corresponding to a position of the moving unit when performing the sensor-shift OIS function, wherein the magnet comprises a first magnet unit, a second magnet unit, and a third magnet unit, wherein the coil comprises a first coil unit corresponding to the first magnet unit, a second coil unit corresponding to the second coil unit, and a third coil unit corresponding to the third magnet unit, wherein the first to third coil units are disposed to face, respectively, the first to third magnet units in the optical direction, wherein the first magnetic sensor detects changes in the magnetic field of the first magnet unit corresponding to a movement of the moving unit in the first axis direction in connection with performing the sensor-shift OIS function, wherein the second magnetic sensor detects changes in the magnetic field of the second magnet unit corresponding to a movement of the moving unit in the second axis direction in connection with performing the sensor-shift OIS function, wherein the third magnetic sensor detects changes in the magnetic field of the third magnet unit corresponding to a rotation of the moving unit about the optical axis and around the plane in connection with performing the sensor-shift OIS function, and wherein each of the first magnetic sensor and the second magnetic sensor is a Hall sensor, and the third magnetic sensor is a tunnel magnetoresistance (TMR) sensor.

2. The camera module according to claim 1, wherein a graph of an output of the third magnetic sensor with respect to the rotation amount of the moving unit about the optical axis comprises a linear section.

3. The camera module according to claim 1, wherein a graph of an output of the first magnetic sensor with respect to the movement amount of the moving unit in the y-axis direction comprises a linear section, and a graph of an output of the second magnetic sensor with respect to the movement amount of the moving unit in the x-axis direction comprises a linear section.

4. The camera module according to claim 1, comprising a memory configured to store a data value about an output of the third sensor corresponding to the rotation amount of the moving unit.

5. The camera module according to claim 1, wherein the driving unit moves or rotates the moving unit using interaction between the coil and the magnet.

6. The camera module according to claim 5, wherein the magnet further comprises a fourth magnet unit, and the coil further comprises a fourth coil unit corresponding to the fourth magnet unit, and wherein the first to fourth coil units are disposed on four corners of the first board unit, and the first to fourth magnet units are disposed to face the first to fourth coil units, respectively.

7. The camera module according to claim 6, comprising a controller configured to supply a driving signal to at least one of the first to fourth coil units.

8. The camera module according to claim 7, wherein two coil units among the first to fourth coil units are connected to each other in series, and wherein the controller is configured to supply one driving signal to the two coil units connected to each other in series and is configured to supply an independent driving signal to each of another two remaining coil units among the first to fourth coil units.

9. The camera module according to claim 7, wherein the controller is configured to supply an independent driving signal to each of the first to fourth coil units.

10. The camera module according to claim 1, wherein the first magnet unit has a magnetization direction identical to a magnetization direction of the third magnet unit and perpendicular to a magnetization direction of the second magnet unit.

11. The camera module according to claim 1, wherein each of the first to third magnetic sensors comprises two input terminals and two output terminals, and any one of the two input terminals of each of the first to third magnetic sensors is commonly connected.

12. The camera module according to claim 1, comprising:

a support board configured to connect the fixed unit to the moving unit, wherein the fixed unit comprises a second board unit disposed under the first board unit, and wherein the support board comprises:

a body;

a connection portion interconnecting the body and the first board unit; and a terminal unit extending from the body toward the second board unit downwardly and comprising a plurality of terminals coupled and conductively connected to the second board unit.

13. The camera module according to claim 12, wherein the support board includes a flexible substrate.

14. The camera module according to claim 1, wherein the rotation of the moving unit detected by the third sensor is 0.5 degrees to 5 degrees.

15. An optical instrument comprising the camera module according to claim 1.

16. The camera module according to claim 1, wherein the moving unit comprises spacing member disposed on the first board unit, wherein the first coil unit, the second coil unit, and the third coil unit are disposed on the spacing member, wherein each of the first to third coil units comprises a central hole, wherein the spacing member comprises a hole corresponding to the central hole of the each of the first to third coils, and wherein each of the first to third magnetic sensors is disposed in the hole of the spacing member corresponding to the central hole of the each of the first to third coil units.

17. The camera module according to claim 16, wherein the spacing member comprises a pair of protrusions corresponding to each of the first to third coil units so that the central hole is coupled to the corresponding pair of protrusions, and wherein each of the first to third magnetic sensors overlaps a region of the central hole positioned between the corresponding pair of protrusions in a direction parallel to the optical axis.

18. The camera module according to claim 1, wherein the first to third coil units are disposed on respective corners of a single surface of the first board unit that faces the moving unit.

19. A camera module comprising:

a fixed unit;

a first position sensor to detect a magnetic field of a sensing magnet in connection with performing a lens autofocus (AF) function;

a moving unit configured to perform a sensor-shift optical image stabilization (OIS) function, wherein the moving unit is moved in a first axis direction perpendicular to an optical axis and a second axis direction perpendicular to both the optical axis and the first axis direction and to be rotated about the optical axis along a plane including the first axis direction and the second axis direction in connection with the sensor-shift OIS function, and the moving unit being disposed so as to be spaced apart from the fixed unit and comprising an image sensor;

a driving unit comprising a magnet disposed in the fixed unit and a coil disposed in the moving unit to move the moving unit;

a first Hall sensor, a second Hall sensor, and a rotation detection sensor to detect a magnetic field corresponding to a position of the moving unit when performing the sensor-shift OIS function, wherein the magnet comprises a first magnet unit, a second magnet unit, and a third magnet unit, wherein the coil comprises a first coil unit corresponding to the first magnet unit, a second coil unit corresponding to the second coil unit, and a third coil unit corresponding to the third magnet unit, wherein the first to third coil units are disposed to face, respectively, the first to third magnet units in the optical direction, wherein the first Hall sensor detects changes in the magnetic field of the first magnet unit corresponding to a movement of the moving unit in the first axis direction when performing the sensor-shift OIS function, wherein the second Hall sensor detects changes in the magnetic field of the second magnet unit corresponding to a movement of the moving unit in the second axis direction when performing the sensor-shift OIS function, the rotation detection sensor detects changes in the magnetic field of the third magnet unit corresponding to a rotation of the moving unit about the optical axis and around the plane when performing the sensor-shift OIS function, and wherein the rotation detection sensor is a tunnel magnetoresistance (TMR) sensor.

20. The camera module according to claim 19, wherein at least a portion of the rotation detection sensor is overlapped with the third magnet unit in a direction of the optical axis.

21. The camera module according to claim 19, wherein the moving unit comprises a first board unit disposed so as to be spaced apart from the fixed unit and a spacing member disposed on the first board unit, wherein each of the first to third coil units comprises a central hole, wherein the spacing member comprises a pair of protrusions corresponding to each of the first to third coil units so that the central hole is coupled to the corresponding pair of protrusions, and wherein each of the first Hall sensor, the second Hall sensor, and the rotation detection sensor overlaps a region of the central hole positioned between the corresponding pair of protrusions in a direction parallel to the optical axis.

22. A camera module comprising:

a fixed unit;

a moving unit, wherein the moving unit comprises a first board unit disposed so as to be spaced apart from the fixed unit and an image sensor disposed on the first board unit;

a support board configured to connect the moving unit to the fixed unit and to allow the moving unit to move in a first axis direction perpendicular to an optical axis, to move in a second axis direction perpendicular to both the optical axis and the first axis direction, and to rotate about the optical axis along a plane including the first axis direction and the second axis direction, wherein the support board comprises an elastic member to elastically support one or more lateral sides of the moving unit, and a body coupled to the first board unit and provided between the one or more lateral sides of the first board unit and the elastic member;

a driving unit comprising a magnet disposed in the fixed unit, and a coil disposed in the moving unit to move the moving unit; and first, second, and third magnetic sensors to detect a magnetic field corresponding to a position of the moving unit, wherein the magnet comprises a first magnet unit, a second magnet unit, and a third magnet unit, wherein the coil comprises a first coil unit corresponding to the first magnet unit, a second coil unit corresponding to the second coil unit, and a third coil unit corresponding to the third magnet unit, wherein the first to third coil units are disposed to face, respectively, the first to third magnet units in the optical direction, wherein the first magnetic sensor detects changes in the magnetic field of the first magnet unit corresponding to a movement of the moving unit in the first axis direction, wherein the second magnetic sensor detects changes in the magnetic field of the second magnet unit corresponding to a movement of the moving unit in the second axis direction, wherein the third magnetic sensor detects changes in the magnetic field of the third magnet unit corresponding to a rotation of the moving unit about the optical axis and around the plane, and wherein each of the first magnetic sensor and the second magnetic sensor is a Hall sensor, and the third magnetic sensor is a tunnel magnetoresistance (TMR) sensor.

* * * * *